US012245265B2

(12) United States Patent
Li et al.

(10) Patent No.: US 12,245,265 B2
(45) Date of Patent: Mar. 4, 2025

(54) APPARATUS, SYSTEM, METHOD AND COMPUTER-READABLE MEDIUM FOR PERFORMING CONTROL TO HANDLE INTER-UE PRIORITIZATION FOR NR V2X

(71) Applicant: InterDigital Patent Holdings, Inc., Wilmington, DE (US)

(72) Inventors: Yifan Li, Conshohocken, PA (US); Lakshmi R. Iyer, King of Prussia, PA (US); Qing Li, Princeton Junction, NJ (US); Patrick Svedman, Stockholm (SE); Pascal M. Adjakple, Great Neck, NY (US); Guodong Zhang, Woodbury, NY (US); Zhuo Chen, Claymont, DE (US); Allan Y. Tsai, Boonton, NJ (US); Mohamed Awadin, Plymouth Meeting, PA (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 337 days.

(21) Appl. No.: 17/441,757

(22) PCT Filed: Feb. 5, 2020

(86) PCT No.: PCT/US2020/016823
§ 371 (c)(1),
(2) Date: Sep. 22, 2021

(87) PCT Pub. No.: WO2020/197645
PCT Pub. Date: Oct. 1, 2020

(65) Prior Publication Data
US 2022/0174682 A1 Jun. 2, 2022

Related U.S. Application Data

(60) Provisional application No. 62/825,374, filed on Mar. 28, 2019.

(51) Int. Cl.
*H04W 72/56* (2023.01)
*H04W 72/0446* (2023.01)
(Continued)

(52) U.S. Cl.
CPC ....... *H04W 72/56* (2023.01); *H04W 72/0446* (2013.01); *H04W 72/1263* (2013.01); *H04W 72/20* (2023.01)

(58) Field of Classification Search
CPC ................. H04W 72/56; H04W 72/20; H04W 72/04446; H04W 72/1263
(Continued)

(56) References Cited

U.S. PATENT DOCUMENTS

2016/0183219 A1   6/2016  Kim et al.
2018/0316395 A1* 11/2018  Sundararajan ........ H04L 5/0053
2019/0253977 A1*  8/2019  Wang .................. H04W 52/383

FOREIGN PATENT DOCUMENTS

CN    107889157 A    4/2018
CN    116941294 A    10/2023

OTHER PUBLICATIONS

"Intel Corporation: ""Feature Lead Summary for NR-V2X AI—7.2.4.1.4 Resource Allocation Mechanism""", 3GPP Draft; R1-1903623-INTEL-NR V2X A1 7.2.4.1.4—Offline 2, 3rd Generation Partnership Project (3GPP), Mobile Competence Centre ; 650, Route Des Lucioles; F-06921 Sophia-Antipolis Cedex; Franc, vol. RAN WG1, No. Athens, Greece; Feb. 25, 2019-Mar. 1, 2019, Mar. 3, 2019 (Mar. 3, 2019), XP051690885,".

(Continued)

*Primary Examiner* — Hermon Asres
(74) *Attorney, Agent, or Firm* — Flaster Greenberg PC

(57) ABSTRACT

An electronic device that is configured to schedule transmission of data to at least one other electronic device via sidelink resources in a wireless communication network;
(Continued)

identify that the scheduled transmission of the data is preempted by another transmission occurring within at least a part of the sidelink resources; and control transmission of the data to at least one other electronic device based on the identifying.

14 Claims, 33 Drawing Sheets

(51) Int. Cl.
*H04W 72/1263* (2023.01)
*H04W 72/20* (2023.01)
(58) Field of Classification Search
USPC .......................................................... 370/329
See application file for complete search history.

(56) References Cited

OTHER PUBLICATIONS

Intel Corporation: "On Enhancements of NR/LTE Uu Interfaces for Sidelink Resource Allocation", 3GPP Draft; R1-1812494 INTEL-EV2X_LNUU_NSL, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018, Nov. 11, 2018, XP051554438.
Intel Corporation: "Sidelink control by NR and LTE Uu interfaces for V2X use cases", 3GPP Draft; R1-1900486 INTEL-EV2X_LNUU_NSL, 3rd Generation Partnership Project (3GPP), Mobile Competence Centre; 650, Route Des Lucioles ; F-06921 Sophia-Antipolis Cedex; France, vol. RAN WG1, No. Taipei, Taiwan; Jan. 21, 2019-Jan. 25, 2019, Jan. 20, 2019, XP051593399.
Intel Corporation: "Sidelink QoS Management and Congestion Control for NR V2X Communication", 3GPP Draft; R1-1900487 INTEL-EV2X QOS, 3rd Generation Partnership Project (3GPP), Mobile Competence Centre; 650, Route Des Lucioles; F-06921 Sophia-Antipolis Cedex; France, vol. RAN WG1, No. Taipei, Taiwan; Jan. 21, 2019-Jan. 25, 2019, Jan. 12, 2019, XP051576095.
Intel Corporation: "Support of Sidelink Unicast, Groupcast, and Broadcast Modes for NR V2X Communication", 3GPP Draft; R1-1811807 INTEL-EV2X_SL_UGB (Rev RI-1810772), 3rd Generation Partnership Project (3GPP), Mobile Competence Centre ; 650, Route Des Lucioles; F-06921 Sophia-Antipolis Cedex; France, vol. RAN WG1, No. Chengdu, China; Oct. 8, 2018-Oct. 12, 2018, Oct. 4, 2018, XP051519134.
Lenovo et al: "Discussion on resource allocation for NR sidelink Mode 1", 3GPP Draft; R1-1910145, 3rd Generation Partnership Project (3GPP), Mobile Competence Centre; 650, Route Des Lucioles ; F-06921 Sophia-Antipolis Cedex; France, vol. RAN WGl, No. Chongqing, China; Oct. 14, 2019-Oct. 20, 2019, Oct. 5, 2019, XP051808446.
CATT, "Corrections to the PSCCH decoding capability in TS 36.213", 3GPP TSG RAN WG1 Meeting #94, R1-1808367, Aug. 2018, pp. 3.
Third Generation Partnership Project, "Technical Specification Group Services and System Aspects; Study on enhancement of 3GPP Support for 5G V2X Services (Release 15)", 3GPP TR 22.886 V15.2.0, Jun. 2018, 58 pages.
Third Generation Partnership Project, "Technical Specification Group Services and System Aspects; Enhancement of 3GPP support for V2X scenarios; Stage 1 (Release 15)", 3GPP TS 22.186 V15.3.0, Jun. 2018, 16 pages.

* cited by examiner

A sidelink transmission preempted by a dynamically scheduled Uu transmission

UE detects the explicit preemption indication and retransmits per the scheduling DCI UE detects the explicit preemption indication and retransmission scheduling DCI jointly UE detects the implicit preemption indication via the retransmission scheduling DCI.

Procedure for detecting the preemption by Uu transmission and retransmitting broadcast on sidelink Joint indication of reducing the power and retransmission for a pre-empted sidelink transmission Separate indication of reducing the power and retransmission for a pre-empted sidelink transmission Procedure for detecting the power reduction indicator for a broadcast sidelink UE that has inter-UE collision with a scheduled Uu transmission Procedure for detecting the canceling indication for a broadcast sidelink UE that has inter-UE collision with a scheduled Uu transmission Procedure for Tx UE detecting the preemption for a unicast sidelink UE that has inter-UE collision with a scheduled Uu transmission Procedure for Rx UE detecting the preemption for a unicast sidelink UE that has inter-UE collision with a scheduled Uu transmission Procedure for Tx UE detecting the power reduction indicator for a unicast sidelink UE that has inter-UE collision with a scheduled Uu transmission Procedure for Rx UE detecting the power reduction indicator for a unicast sidelink UE that has inter-UE collision with a scheduled Uu transmission Procedure for Tx UE detecting the canceling indication for a unicast sidelink UE that has inter-UE collision with a scheduled Uu transmission Procedure for Rx UE detecting the canceling indication for a unicast sidelink UE that has inter-UE collision with a scheduled Uu transmission Procedure for Tx UE detecting the preemption for a groupcast sidelink UE that has inter-UE collision with a scheduled Uu transmission Procedure for Rx UE detecting the preemption for a groupcast sidelink UE that has inter-UE collision with a scheduled Uu transmission Procedure for Tx UE detecting the power reduction indicator for a groupcast sidelink UE that has inter-UE collision with a scheduled Uu transmission Procedure for Rx UE detecting the power reduction indicator for a groupcast sidelink UE that has inter-UE collision with a scheduled Uu transmission Procedure for Tx UE detecting the canceling indication for a groupcast sidelink UE that has inter-UE collision with a scheduled Uu transmission Procedure for Rx UE detecting the canceling indication for a groupcast sidelink UE that has inter-UE collision with a scheduled Uu transmission Procedure for detecting the canceling indicator for a UE with configured grant sidelink that has inter-UE collision with a scheduled Uu transmission Procedure for detecting the preemption for a UE with configured grant sidelink that has inter-UE collision with a scheduled Uu transmission An alternative procedure for detecting the preemption for a UE with configured grant sidelink that has inter-UE collision with a scheduled Uu transmission Example of sidelink transmission with 3 repetitions scheduled by gNB in NR V2X mode 1.

Example of sidelink transmission preempted during the repetition.

Example of sidelink transmission with 1st stage SCI and 2nd stage SCI simultaneously transmitted.

Inter-UE collision between two dynamically scheduled sidelink transmission.

Inter-UE collision between dynamically scheduled sidelink transmission and configured grant based sidelink.

APPARATUS, SYSTEM, METHOD AND COMPUTER-READABLE MEDIUM FOR PERFORMING CONTROL TO HANDLE INTER-UE PRIORITIZATION FOR NR V2X

CROSS REFERENCE TO RELATED APPLICATIONS

This application is the National Stage Application of International Patent Application No. PCT/US2020/016823, filed Feb. 5, 2020 which claims the benefit of U.S. Provisional Application No. 62/825,374, filed Mar. 28, 2019, which are incorporated herein by reference in their entireties.

FIELD

The present disclosure relates generally to wireless communications, and more particularly to wireless communications systems, devices, methods, and computer readable medium with computer-executable instructions for performing control to handle an inter-User Equipment (UE) collision between a dynamically scheduled or configured sidelink transmission and a dynamically scheduled very low latency or high priority downlink (DL) or uplink (UL) transmission, or an inter-UE collision between a dynamically scheduled or configured sidelink transmission and a dynamically scheduled very low latency or high priority sidelink transmission or inter-UE prioritization for New Radio (NR) Vehicle-to-Everything (V2X).

BACKGROUND

The "background" description provided herein is for the purpose of generally presenting the context of the disclosure. Work of the presently named inventors, to the extent it is described in this background section, as well as aspects of the description which cannot otherwise qualify as prior art at the time of filing, are neither expressly or impliedly admitted as prior art against the present invention.

For New Radio (NR) Vehicle-to-Everything (V2X) mode 1 shared carrier scenario, the gNB can allocate a sidelink transmission using dynamic scheduling, type 1 configured grant (CG), or type 2 configured grant (CG) on a shared carrier with the downlink (DL) and/or uplink (UL) transmissions on Uu interface. For example, the gNB can schedule a very low latency or high priority DL data transmission on the Uu interface for a UE, which can overlap with a sidelink transmission scheduled already or configured for another UE. In this case both transmissions can degrade or even fail. Therefore, mechanisms are disclosed herein to handle the inter-UE collision between a dynamically scheduled or configured sidelink transmission and a dynamically scheduled very low latency or high priority DL or UL transmission.

For NR V2X mode 1, the gNB can allocate a sidelink transmission using dynamic scheduling, type 1 configured grant, or type 2 configured grant. For example, the gNB can schedule a very low latency or high priority data transmission on sidelink for a UE, which can overlap a sidelink transmission scheduled already or configured for another UE. In this case, both transmissions can degrade or even fail. Therefore, mechanisms are disclosed herein to handle the inter-UE collision between a dynamically scheduled or configured sidelink transmission and a dynamically scheduled very low latency or high priority sidelink transmission.

SUMMARY

The present disclosure relates generally to wireless communications, and more particularly to wireless communications systems, devices, methods, and computer readable medium with computer-executable instructions for performing control to handle an inter-User Equipment (UE) collision between a dynamically scheduled or configured sidelink transmission and a dynamically scheduled very low latency or high priority downlink (DL) or uplink (UL) transmission, or an inter-UE collision between a dynamically scheduled or configured sidelink transmission and a dynamically scheduled very low latency or high priority sidelink transmission or inter-UE prioritization for New Radio (NR) Vehicle-to-Everything (V2X).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
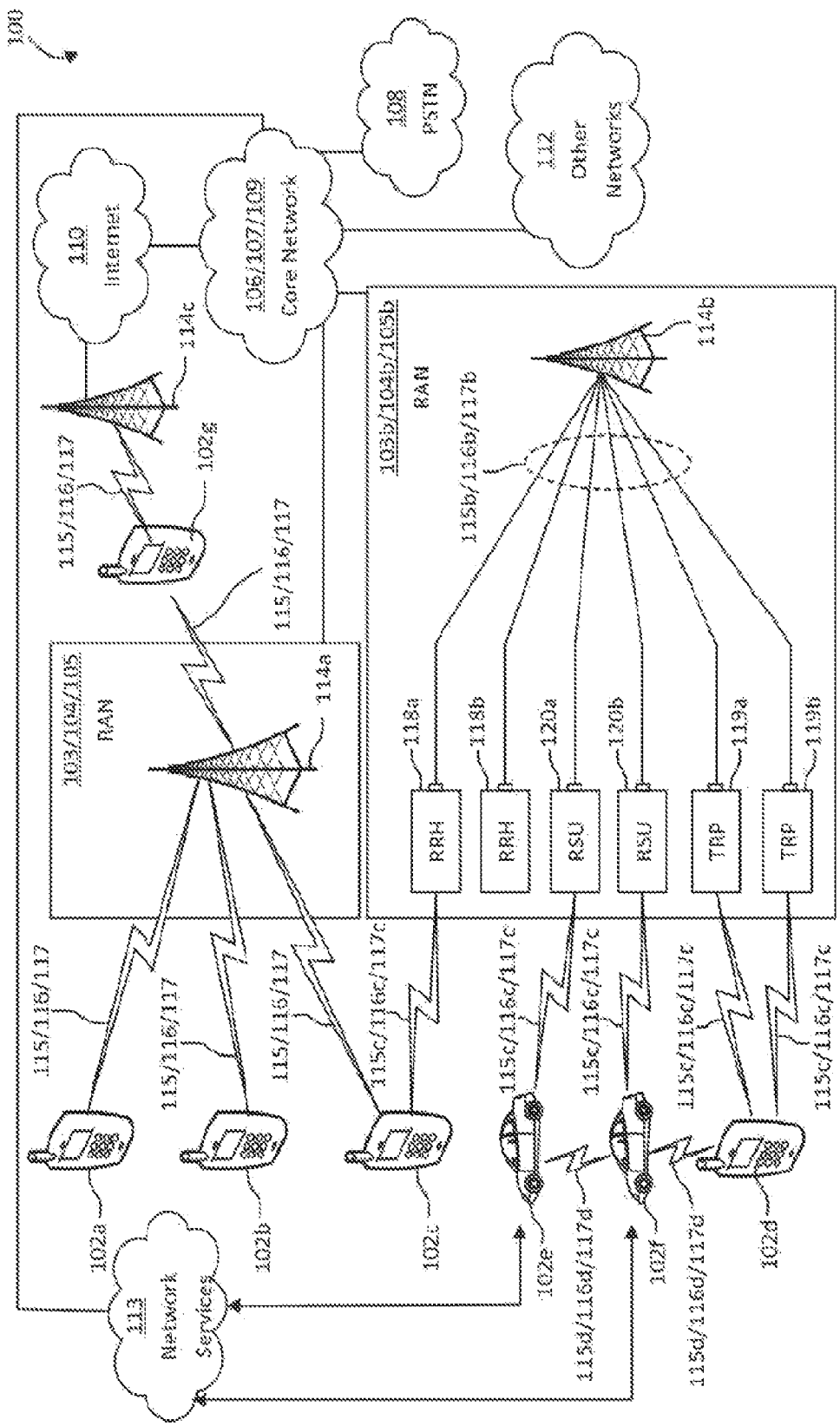
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which can include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that can appear in the below description. Unless otherwise specified, the acronyms used herein refer to the corresponding term listed below.

LIST OF ABBREVIATIONS

ACK—ACKnowledgment
BWP—Bandwidth Part
CBGFI—Code-block Group Flush Indicator
CE—Control Element
CRC—Cyclic Redundancy Check
DCI—Downlink Control Information
HARQ—Hybrid Automatic Repeat Request
IE—Information Element
LTE—Long Term Evolution
MAC—Medium Access Control
MIB—Master Information Block
NACK—Non-ACKnowledgment
NDI—New Data Indicator
NR—New Radio
PSCCH—Physical Sidelink Control Channel
PSSCH—Physical Sidelink Shared Channel
PRB—Physical Resource Block
RAN—Radio Access Network
RBG—Resource Block Group
RNTI—Radio Network Temporary Identifier
RRC—Radio Resource Control
SCI—Sidelink Control Information
SCS—Subcarrier Spacing
SFI—Slot Format Indicator
SI—System Information
SLIV—Starting and Length Indicator Value
SL—CI-Sidelink Cancellation Indication
UE—User Equipment
V2V—Vehicle-to-Vehicle
V2X—Vehicle-to-everything Example Communication System and Networks FIG. 1A illustrates an example communications system 100 in which the systems, methods, and apparatuses described and claimed herein can be used. The communications system 100 can include wireless transmit/receive units (WTRUs) 102a, 102b, 102c. 102d, 102e, 102f, and/or 102g, which generally or collectively can be referred to as WTRU 102 or WTRUs 102. The communications system 100 can include, a radio access network (RAN) 103/104/105/103b/104b/105b, a core network 106/107/109, a public switched telephone network (PSTN) 108, the Internet 110, other networks 112, and Network Services 113. 113. Network Services 113 can include, for example, a V2X server, V2X functions, a ProSe server, ProSe functions, IoT services, video streaming, and/or edge computing, etc.

It will be appreciated that the concepts disclosed herein can be used with any number of WTRUs, base stations, networks, and/or network elements. Each of the WTRUs 102 can be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU can comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 can also include a base station 114a and a base station 114b. In the example of FIG. 1A, each base stations 114a and 114b is depicted as a single element. In practice, the base stations 114a and 114b can include any number of interconnected base stations and/or network elements. Base stations 114a can be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b can be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b can be any type of device configured to wirelessly interface with at least one of the WTRUs 102. e.g., WTRU 102c, to facilitate access to one or more communication networks, such as the core network 106/107/109, the Internet 110, Network Services 113, and/or other networks 112.

TRPs 119a, 119b can be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b can be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b can be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a can be part of the RAN 103/104/105, which can also include other base stations and/or network elements (not shown), such as a Base Station Controller (BSC), a Radio Network Controller (RNC), relay nodes, etc. Similarly, the base station 114b can be part of the RAN 103b/104b/105b, which can also include other base stations and/or network elements (not shown), such as a BSC, a RNC, relay nodes, etc. The base station 114a can be configured to transmit and/or receive wireless signals within a particular geographic region, which can be referred to as a cell (not shown). Similarly, the base station 114b can be configured to transmit and/or receive wired and/or wireless signals within a particular geographic region, which can be referred to as a cell (not shown). The cell can further be divided into cell sectors. For example, the cell associated with the base station 114a can be divided into three sectors. Thus, for example, the base station 114a can include three transceivers, e.g., one for each sector of the cell. The base station 114a can employ Multiple-Input Multiple Output (MIMO) technology and, therefore, can utilize multiple transceivers for each sector of the cell, for instance.

The base station 114a can communicate with one or more of the WTRUs 102a. 102b, 102c, and 102g over an air interface 115/116/117, which can be any suitable wireless communication link (e.g., Radio Frequency (RF), microwave, infrared (IR), ultraviolet (UV), visible light. cmWave, mmWave, etc.). The air interface 115/116/117 can be established using any suitable Radio Access Technology (RAT).

The base station 114b can communicate with one or more of the RRHs 118a and 118b, TRPs 119a and 119b, and/or RSUs 120a and 120b, over a wired or air interface 115b/116b/117b, which can be any suitable wired (e.g., cable, optical fiber, etc.) or wireless communication link (e.g., RF, microwave, IR, UV, visible light. cmWave, mmWave, etc.). The air interface 115b/116b/117b can be established using any suitable RAT.

The RRHs 118a, 118b, TRPs 119a, 119b and/or RSUs 120a, 120b, can communicate with one or more of the WTRUs 102c, 102d, 102e, 102f over an air interface 115c/116c/117c, which can be any suitable wireless communication link (e.g., RF, microwave, IR, ultraviolet UV, visible light, cmWave, mmWave, etc.) The air interface 115c/116c/117c can be established using any suitable RAT.

The WTRUs 102 can communicate with one another over a direct air interface 115d/116d/117d, such as Sidelink communication which can be any suitable wireless communication link (e.g., RF, microwave, IR, ultraviolet UV, visible light, cmWave, mmWave, etc.) The air interface 115d/116d/117d can be established using any suitable RAT.

The communications system 100 can be a multiple access system and can employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, can implement a radio technology such as Universal Mobile Telecommunications System (UMTS) Terrestrial Radio Access (UTRA), which can establish the air interface 115/116/117 and/or 115c/116c/117c respectively using Wideband CDMA (WCDMA). WCDMA can include communication protocols such as High-Speed Packet Access (HSPA) and/or Evolved HSPA (HSPA+). HSPA can include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, can implement a radio technology such as Evolved UMTS Terrestrial Radio Access (E-UTRA), which can establish the air interface 115/116/117 or 115c/116c/117c respectively using Long Term Evolution (LTE) and/or LTE-Advanced (LTE-A), for example. The air interface 115/116/117 or 115c/116c/117c can implement 3GPP NR technology. The LTE and LTE-A technology can include LTE D2D and/or V2X technologies and interfaces (such as Sidelink communications, etc.) Similarly, the 3GPP NR technology can include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f can implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A can be a wireless router, Home Node B, Home eNode B, or access point, for example, and can utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, can implement a radio technology such as IEEE 802.11 to establish a Wireless Local Area Network (WLAN). Similarly, the base station 114c and the WTRUs 102, e.g., WTRU 102d, can implement a radio technology such as IEEE 802.15 to establish a wireless personal area network (WPAN). The base station 114c and the WTRUs 102, e.g., WRTU 102e, can utilize a cellular-based RAT (e.g., WCDMA, CDMA2000, GSM, LTE, LTE-A, NR, etc.) to establish a picocell or femtocell. As shown in FIG. 1A, the base station 114c can have a direct connection to the Internet 110. Thus, the base station 114c cannot be required to access the Internet 110 via the core network 106/107/109.

The RAN 103/104/105 and/or RAN 103b/104b/105b can be in communication with the core network 106/107/109, which can be any type of network configured to provide voice, data, messaging, authorization and authentication, applications, and/or Voice Over Internet Protocol (VoIP) services to one or more of the WTRUs 102. For example, the core network 106/107/109 can provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 can be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which can be utilizing an E-UTRA radio technology, the core network 106/107/109 can also be in communication with another RAN (not shown) employing a GSM or NR radio technology.

The core network 106/107/109 can also serve as a gateway for the WTRUs 102 to access the PSTN 108, the Internet 110, and/or other networks 112. The PSTN 108 can include circuit-switched telephone networks that provide Plain Old Telephone Service (POTS). The Internet 110 can include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 can include wired or wireless communications networks owned and/or operated by other service providers. For example, the networks 112 can include any type of packet data network (e.g., an IEEE 802.3 Ethernet network) or another core network connected to one or more RANs, which can employ the same RAT as the RAN 103/104/105 and/or RAN 103b/104b/105b or a different RAT.

Some or all of the WTRUs 102a, 102b, 102c, 102d, 102e, and 102f in the communications system 100 can include multi-mode capabilities, e.g., the WTRUs 102a, 102b, 102c, 102d, 102e, and 102f can include multiple transceivers for communicating with different wireless networks over different wireless links. For example, the WTRU 102g shown in FIG. 1A can be configured to communicate with the base station 114a, which can employ a cellular-based radio technology, and with the base station 114c, which can employ an IEEE 802 radio technology.

Although not shown in FIG. 1A, it will be appreciated that a User Equipment can make a wired connection to a gateway. The gateway can be a Residential Gateway (RG). The RG can provide connectivity to a Core Network 106/107/109. It will be appreciated that many of the solutions contained herein can equally apply to UEs that are WTRUs and UEs that use a wired connection to connect to a network. For example, the solutions that apply to the wireless interfaces 115, 116, 117 and 115c/116c/117c can equally apply to a wired connection.

Figure 1B:
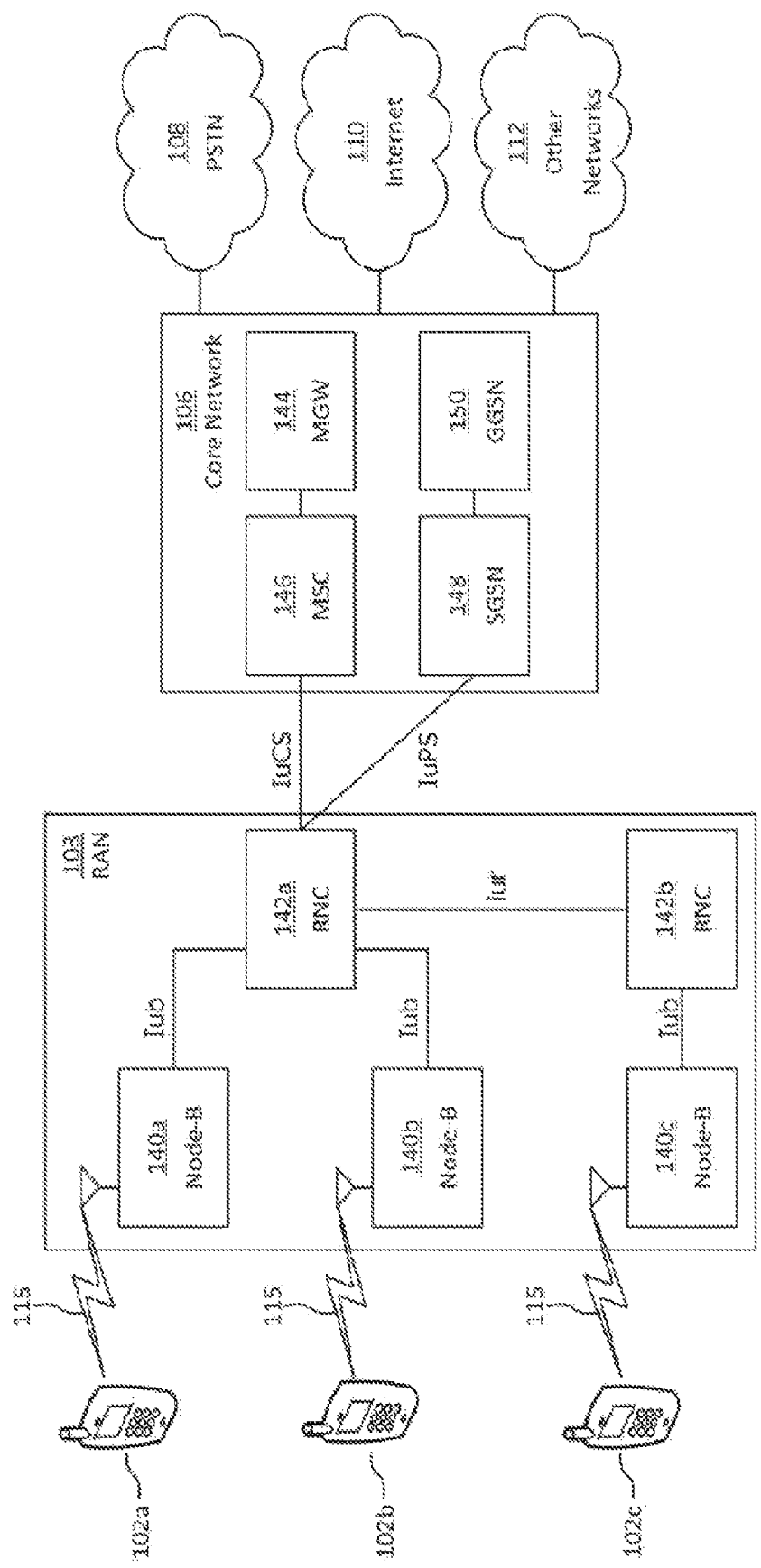
FIG. 1B is a system diagram of an example apparatus or device configured for wireless communications.

FIG. 1B is a system diagram of an example RAN 103 and core network 106. As noted above, the RAN 103 can employ a UTRA radio technology to communicate with the WTRUs 102a, 102b, and 102c over the air interface 115. The RAN 103 can also be in communication with the core network 106. As shown in FIG. 1B, the RAN 103 can include Node-Bs 140a, 140b, and 140c, which can each include one or more transceivers for communicating with the WTRUs 102a, 102b, and 102c over the air interface 115. The Node-Bs 140a, 140b, and 140c can each be associated with a particular cell (not shown) within the RAN 103. The RAN 103 can also include RNCs 142a, 142b. It will be appreciated that the RAN 103 can include any number of Node-Bs and Radio Network Controllers (RNCs.)

As shown in FIG. 1B, the Node-Bs 140a, 140b can be in communication with the RNC 142a. Additionally, the Node-B 140c can be in communication with the RNC 142b. The Node-Bs 140a, 140b, and 140c can communicate with the respective RNCs 142a and 142b via an Iub interface. The RNCs 142a and 142b can be in communication with one another via an Iur interface. Each of the RNCs 142a and 142b can be configured to control the respective Node-Bs 140a, 140b, and 140c to which it is connected. In addition, each of the RNCs 142a and 142b can be configured to carry out or support other functionality, such as outer loop power control, load control, admission control, packet scheduling, handover control, macro-diversity, security functions, data encryption, and the like.

The core network 106 shown in FIG. 1B can include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements can be owned and/or operated by an entity other than the core network operator.

The RNC 142a in the RAN 103 can be connected to the MSC 146 in the core network 106 via an IuCS interface. The MSC 146 can be connected to the MGW 144. The MSC 146 and the MGW 144 can provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 can also be connected to the SGSN 148 in the core network 106 via an IuPS interface. The SGSN 148 can be connected to the GGSN 150. The SGSN 148 and the GGSN 150 can provide the WTRUs 102a, 102b, and 102c with access to packet-switched networks, such as the Internet 110, to facilitate communications between and the WTRUs 102a, 102b, and 102c, and IP-enabled devices.

The core network 106 can also be connected to the other networks 112, which can include other wired or wireless networks that are owned and/or operated by other service providers.

Figure 1C:
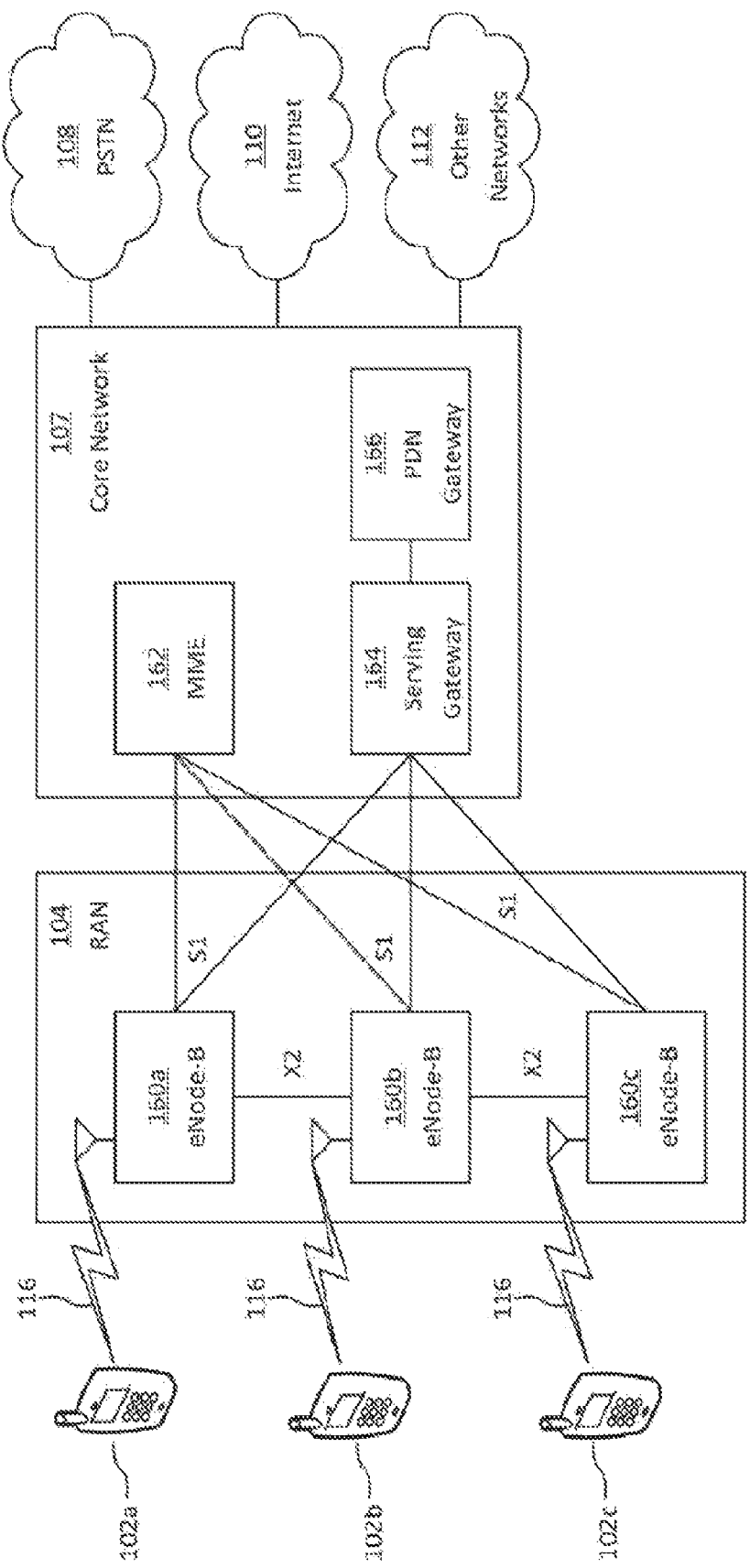
FIG. 1C is a system diagram that shows an example of a Radio Access Network (RAN) architecture and a core network architecture.

FIG. 1C is a system diagram of an example RAN 104 and core network 107. As noted above, the RAN 104 can employ an E-UTRA radio technology to communicate with the WTRUs 102a, 102b, and 102c over the air interface 116. The RAN 104 can also be in communication with the core network 107.

The RAN 104 can include eNode-Bs 160a, 160b, and 160c, though it will be appreciated that the RAN 104 can include any number of eNode-Bs. The eNode-Bs 160a, 160b, and 160c can each include one or more transceivers for communicating with the WTRUs 102a, 102b, and 102c over the air interface 116. For example, the eNode-Bs 160a, 160b, and 160c can implement MIMO technology. Thus, the eNode-B 160a, for example, can use multiple antennas to transmit wireless signals to, and receive wireless signals from, the WTRU 102a.

Each of the eNode-Bs 160a, 160b, and 160c can be associated with a particular cell (not shown) and can be configured to handle radio resource management decisions, handover decisions, scheduling of users in the uplink and/or downlink, and the like. As shown in FIG. 1C, the eNode-Bs 160a, 160b, and 160c can communicate with one another over an X2 interface.

The core network 107 shown in FIG. 1C can include a Mobility Management Gateway (MME) 162, a serving gateway 164, and a Packet Data Network (PDN) gateway 166. While each of the foregoing elements are depicted as part of the core network 107, it will be appreciated that any one of these elements can be owned and/or operated by an entity other than the core network operator.

The MME 162 can be connected to each of the eNode-Bs 160a, 160b, and 160c in the RAN 104 via an Si interface and can serve as a control node. For example, the MME 162 can be responsible for authenticating users of the WTRUs 102a, 102b, and 102c, bearer activation/deactivation, selecting a particular serving gateway during an initial attach of the WTRUs 102a, 102b, and 102c, and the like. The MME 162 can also provide a control plane function for switching between the RAN 104 and other RANs (not shown) that employ other radio technologies, such as GSM or WCDMA.

The serving gateway 164 can be connected to each of the eNode-Bs 160a, 160b, and 160c in the RAN 104 via the Si interface. The serving gateway 164 can generally route and forward user data packets to/from the WTRUs 102a, 102b, and 102c. The serving gateway 164 can also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 can also be connected to the PDN gateway 166, which can provide the WTRUs 102a, 102b, and 102c with access to packet-switched networks, such as the Internet 110, to facilitate communications between the WTRUs 102a, 102b, 102c, and IP-enabled devices.

The core network 107 can facilitate communications with other networks. For example, the core network 107 can provide the WTRUs 102a, 102b, and 102c with access to circuit-switched networks, such as the PSTN 108, to facilitate communications between the WTRUs 102a, 102b, and 102c and traditional land-line communications devices. For example, the core network 107 can include, or can communicate with, an IP gateway (e.g., an IP Multimedia Subsystem (IMS) server) that serves as an interface between the core network 107 and the PSTN 108. In addition, the core network 107 can provide the WTRUs 102a, 102b, and 102c with access to the networks 112, which can include other wired or wireless networks that are owned and/or operated by other service providers.

Figure 1D:
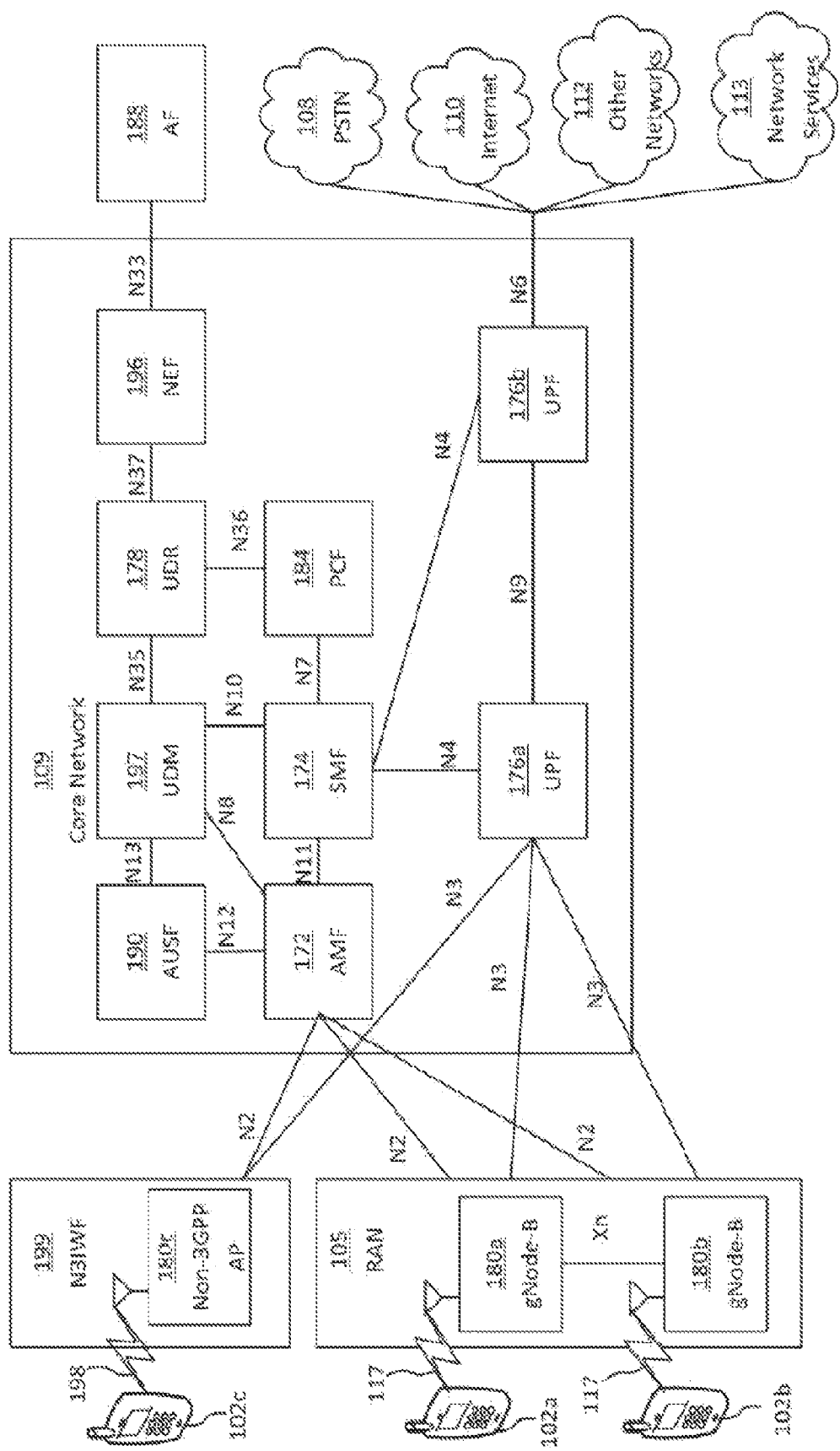
FIG. 1D is a system diagram that shows an example of a Radio Access Network (RAN) architecture and a core network architecture.

FIG. 1D is a system diagram of an example RAN 105 and core network 109. The RAN 105 can employ an NR radio technology to communicate with the WTRUs 102a and 102b over the air interface 117. The RAN 105 can also be in communication with the core network 109. A Non-3GPP Interworking Function (N3IWF) 199 can employ a non-3GPP radio technology to communicate with the WTRU 102c over the air interface 198. The N3IWF 199 can also be in communication with the core network 109.

The RAN 105 can include gNode-Bs 180a and 180b. It will be appreciated that the RAN 105 can include any number of gNode-Bs. The gNode-Bs 180a and 180b can each include one or more transceivers for communicating with the WTRUs 102a and 102b over the air interface 117. When integrated access and backhaul connection are used, the same air interface can be used between the WTRUs and gNode-Bs, which can be the core network 109 via one or multiple gNBs. The gNode-Bs 180a and 180b can implement MIMO, MU-MIMO, and/or digital beamforming technology. Thus, the gNode-B 180a, for example, can use multiple antennas to transmit wireless signals to, and receive wireless signals from, the WTRU 102a. It should be appreciated that the RAN 105 can employ of other types of base stations such as an eNode-B. It will also be appreciated the RAN 105 can employ more than one type of base station. For example, the RAN can employ eNode-Bs and gNode-Bs.

The N3IWF 199 can include a non-3GPP Access Point 180c. It will be appreciated that the N3IWF 199 can include any number of non-3GPP Access Points. The non-3GPP Access Point 180c can include one or more transceivers for communicating with the WTRUs 102c over the air interface 198. The non-3GPP Access Point 180c can use the 802.11 protocol to communicate with the WTRU 102c over the air interface 198.

Each of the gNode-Bs 180a and 180b can be associated with a particular cell (not shown) and can be configured to handle radio resource management decisions, handover decisions, scheduling of users in the uplink and/or downlink, and the like. As shown in FIG. 1D, the gNode-B s 180a and 180b can communicate with one another over an Xn interface, for example.

The core network 109 shown in FIG. 1D can be a 5G core network (5GC). The core network 109 can offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities can be logical entities that are implemented in the form of computer-executable instructions (software) stored in a memory of, and executing on a processor of, an apparatus configured for wireless and/or network communications or a computer system, such as system 90 illustrated in Figure x1G.

In the example of FIG. 1D, the 5G Core Network 109 can include an access and mobility management function (AMF) 172, a Session Management Function (SMF) 174, User Plane Functions (UPFs) 176a and 176b. a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements can be owned and/or operated by an entity other than the core network operator. It will also be appreciated that a 5G core network cannot consist of all of these elements, can consist of additional elements, and can consist of multiple instances of each of these elements. FIG. 1D shows that network functions directly connect to one another, however, it should be appreciated that they can communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service can be achieved via a direct connection between network functions, an exchange of messaging on a message bus, calling a software function, etc.

The AMF 172 can be connected to the RAN 105 via an N2 interface and can serve as a control node. For example, the AMF 172 can be responsible for registration management, connection management, reachability management, access authentication, access authorization. The AMF can be responsible forwarding user plane tunnel configuration information to the RAN 105 via the N2 interface. The AMF 172 can receive the user plane tunnel configuration information from the SMF via an N11 interface. The AMF 172 can generally route and forward NAS packets to/from the WTRUs 102a, 102b, and 102c via an N1 interface. The N1 interface is not shown in FIG. 1D.

The SMF 174 can be connected to the AMF 172 via an N11 interface. Similarly, the SMF can be connected to the PCF 184 via an N7 interface, and to the UPFs 176a and 176b via an N4 interface. The SMF 174 can serve as a control node. For example, the SMF 174 can be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b can provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b can also provide the WTRUs 102a, 102b, and 102c with access to other types of packet data networks. For example, Other Networks 112 can be Ethernet Networks or any type of network that exchanges packets of data. The UPF 176a and UPF 176b can receive traffic steering rules from the SMF 174 via the N4 interface. The UPF 176a and UPF 176b can provide access to a packet data network by connecting a packet data network with an N6 interface or by connecting to each other and to other UPFs via an N9 interface. In addition to providing access to packet data networks, the UPF 176 can be responsible packet routing and forwarding, policy rule enforcement, quality of service handling for user plane traffic, downlink packet buffering.

The AMF 172 can also be connected to the N3IWF 199, for example, via an N2 interface. The N3IWF facilitates a connection between the WTRU 102c and the 5G core network 170, for example, via radio interface technologies that are not defined by 3GPP. The AMF can interact with the N3IWF 199 in the same, or similar, manner that it interacts with the RAN 105.

The PCF 184 can be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 can provide policy rules to control plane nodes such as the AMF 172 and SMF 174, allowing the control plane nodes to enforce these rules. The PCF 184, can send policies to the AMF 172 for the WTRUs 102a, 102b, and 102c so that the AMF can deliver the policies to the WTRUs 102a, 102b, and 102c via an N1 interface. Policies can then be enforced, or applied, at the WTRUs 102a, 102b, and 102c.

The UDR 178 can act as a repository for authentication credentials and subscription information. The UDR can connect to network functions, so that network function can add to, read from, and modify the data that is in the repository. For example, the UDR 178 can connect to the PCF 184 via an N36 interface. Similarly, the UDR 178 can connect to the NEF 196 via an N37 interface, and the UDR 178 can connect to the UDM 197 via an N35 interface.

The UDM 197 can serve as an interface between the UDR 178 and other network functions. The UDM 197 can authorize network functions to access of the UDR 178. For example, the UDM 197 can connect to the AMF 172 via an N8 interface, the UDM 197 can connect to the SMF 174 via an N10 interface. Similarly, the UDM 197 can connect to the AUSF 190 via an N13 interface. The UDR 178 and UDM 197 can be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure can occur on the N33 API interface. The NEF can connect to an AF 188 via an N33 interface and it can connect to other network functions in order to expose the capabilities and services of the 5G core network 109.

Application Functions 188 can interact with network functions in the 5G Core Network 109. Interaction between the Application Functions 188 and network functions can be via a direct interface or can occur via the NEF 196. The Application Functions 188 can be considered part of the 5G Core Network 109 or can be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c can connect to an AMF 172, via an N1 interface. The AMF can be logically part of one or more slices. The AMF can coordinate the connection or communication of WTRU 102a, 102b, or 102c with one or more UPF 176a and 176b, SMF 174, and other network functions. Each of the UPFs 176a and 176b, SMF 174, and other network functions can be part of the same slice or different slices. When they are part of different slices, they can be isolated from each other in the sense that they can utilize different computing resources, security credentials, etc.

The core network 109 can facilitate communications with other networks. For example, the core network 109 can include, or can communicate with, an IP gateway, such as an IP Multimedia Subsystem (IMS) server, that serves as an interface between the 5G core network 109 and a PSTN 108. For example, the core network 109 can include, or communicate with a short message service (SMS) service center that facilities communication via the short message service. For example, the 5G core network 109 can facilitate the exchange of non-IP data packets between the WTRUs 102a, 102b, and 102c and servers or applications functions 188. In addition, the core network 170 can provide the WTRUs 102a, 102b, and 102c with access to the networks 112, which can include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities can be identified by other names and certain entities or functions can be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein can be embodied or implemented in any similar communication system, whether presently defined or defined in the future.

Figure 1E:
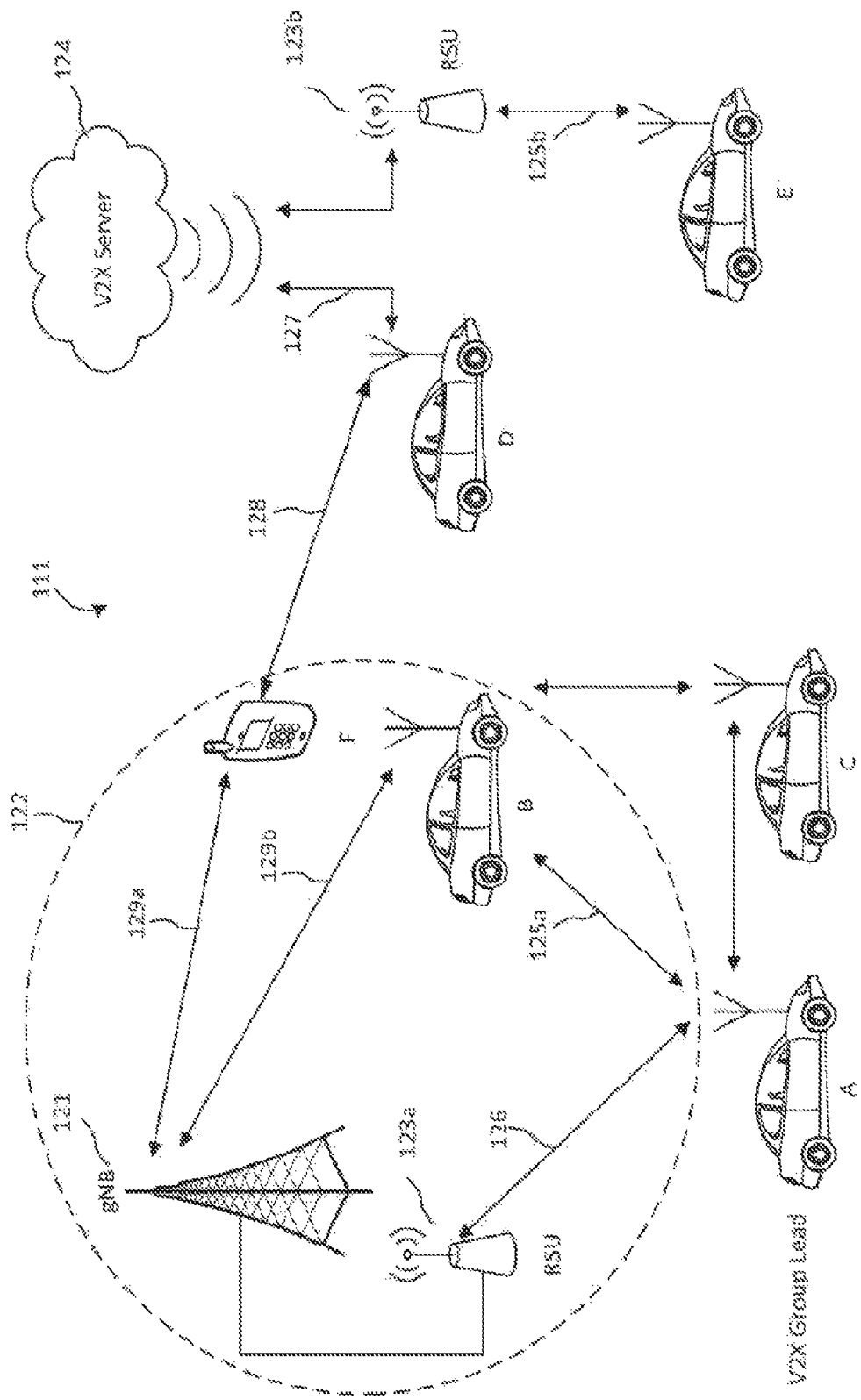
FIG. 1E is a system diagram that shows an example of a Radio Access Network (RAN) architecture and a core network architecture.

FIG. 1E illustrates an example communications system 111 in which the systems, methods, apparatuses described herein can be used. Communications system 111 can include Wireless Transmit/Receive Units (WTRUs) A, B, C, D, E, F, a base station gNB 121, a V2X server 124, and Road Side Units (RSUs) 123a and 123b. In practice. the concepts presented herein can be applied to any number of WTRUs, base station gNBs, V2X networks, and/or other network elements. One or several or all WTRUs A, B, C, D, E, and F can be out of range of the access network coverage 122. WTRUs A, B, and C form a V2X group, among which WTRU A is the group lead and WTRUs B and C are group members.

WTRUs A, B, C, D, E, F can communicate with each other over a Uu interface 129b via the gNB 121 if they are under the access network coverage (only B and F are shown under the network coverage in FIG. 1E). WTRUs A, B, C, D, E, F can communicate with each other directly via a Sidelink (PC5 or NR PC5) interface 125a, 125b, 128, if they are under or out of the access network coverage (e.g., A, C, WTRUs A, B, C. D, E, F can communicate with each other D and E are shown out of the network coverage in FIG. 1E).

WTRUs A, B, C, D, E, and F can communicate with RSU 123a or 123b via a Vehicle-to-Network (V2N) 126 or Sidelink interface 125b. WTRUs A, B, C, D, E, and F can communicate to a V2X Server 124 via a Vehicle-to-Infrastructure (V2I) interface 127. WTRUs A, B, C, D, E, and F can communicate to another UE via a Vehicle-to-Person (V2P) interface 128.

Figure 1F:
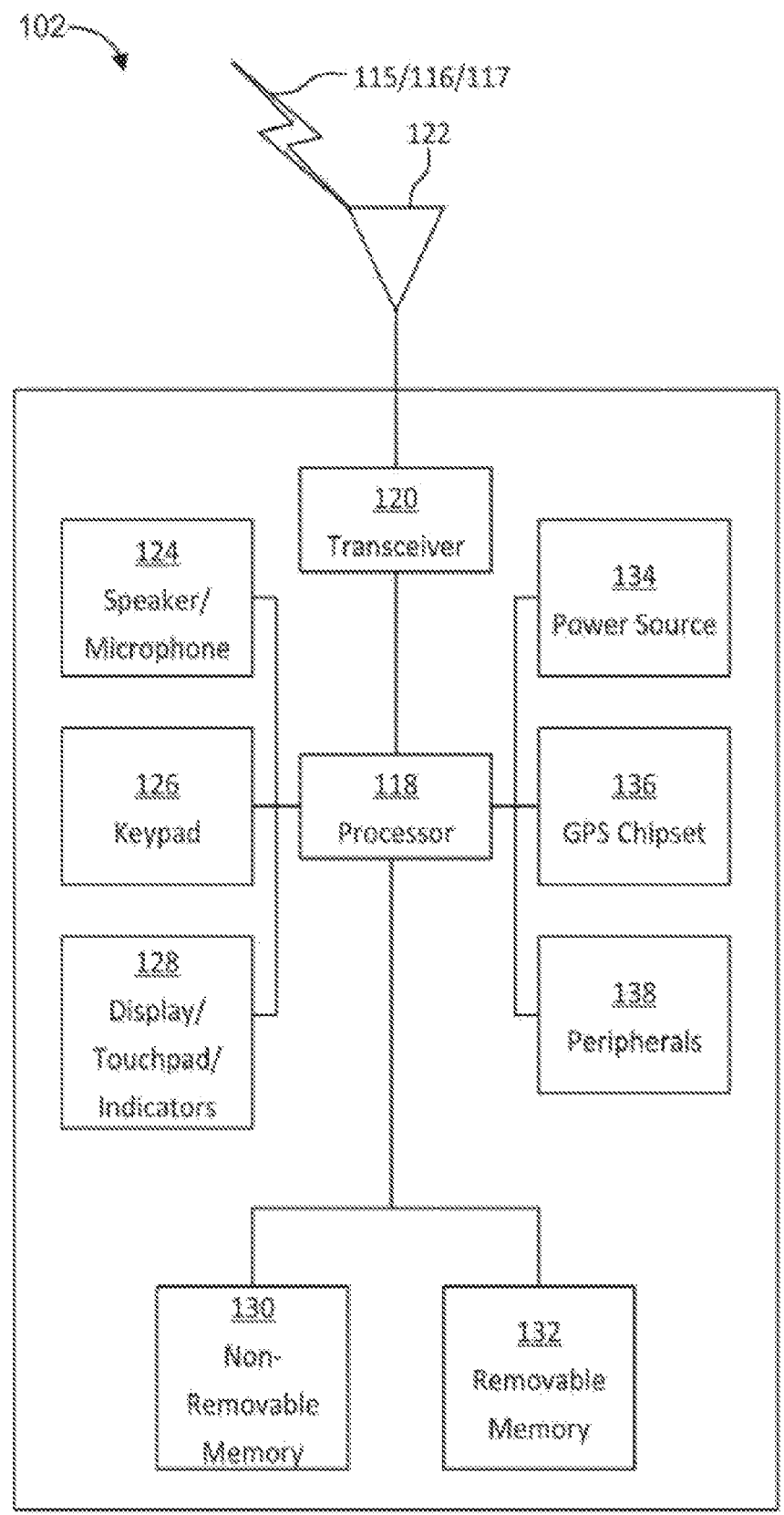
FIG. 1F is a system diagram that shows an example of a computing system used in a communication network.

FIG. 1F is a block diagram of an example apparatus or device WTRU 102 that can be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 can include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 can include any sub-combination of the foregoing elements. Also, the base stations 114a and 114b, and/or the nodes that base stations 114a and 114b can represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, can include some or all of the elements depicted in FIG. 1F and described herein.

The processor 118 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 can perform signal coding, data processing, power control, input/output processing, and/or any other functionality that enables the WTRU 102 to operate in a wireless environment. The processor 118 can be coupled to the transceiver 120, which can be coupled to the transmit/receive element 122. While FIG. 1F depicts the processor 118 and the transceiver 120 as separate components, it will be appreciated that the processor 118 and the transceiver 120 can be integrated together in an electronic package or chip.

The transmit/receive element 122 of a UE can be configured to transmit signals to, or receive signals from, a base station (e.g., the base station 114a of FIG. 1A) over the air interface 115/116/117 or another UE over the air interface 115d/116d/117d. For example, the transmit/receive element 122 can be an antenna configured to transmit and/or receive RF signals. The transmit/receive element 122 can be an emitter/detector configured to transmit and/or receive IR, UV, or visible light signals, for example. The transmit/receive element 122 can be configured to transmit and receive both RF and light signals. It will be appreciated that the transmit/receive element 122 can be configured to transmit and/or receive any combination of wireless or wired signals.

In addition, although the transmit/receive element 122 is depicted in FIG. 1F as a single element, the WTRU 102 can include any number of transmit/receive elements 122. More specifically, the WTRU 102 can employ MIMO technology. Thus, the WTRU 102 can include two or more transmit/receive elements 122 (e.g., multiple antennas) for transmitting and receiving wireless signals over the air interface 115/116/117.

The transceiver 120 can be configured to modulate the signals that are to be transmitted by the transmit/receive element 122 and to demodulate the signals that are received by the transmit/receive element 122. As noted above, the WTRU 102 can have multi-mode capabilities. Thus, the transceiver 120 can include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 can be coupled to, and can receive user input data from, the speaker/microphone 124, the keypad 126, and/or the display/touchpad/indicators 128 (e.g., a liquid crystal display (LCD) display unit or organic light-emitting diode (OLED) display unit. The processor 118 can also output user data to the speaker/microphone 124, the keypad 126, and/or the display/touchpad/indicators 128. In addition, the processor 118 can access information from, and store data in, any type of suitable memory, such as the non-removable memory 130 and/or the removable memory 132. The non-removable memory 130 can include random-access memory (RAM), read-only memory (ROM), a hard disk, or any other type of memory storage device. The removable memory 132 can include a subscriber identity module (SIM) card, a memory stick, a secure digital (SD) memory card, and the like. The processor 118 can access information from, and store data in, memory that is not physically located on the WTRU 102, such as on a server that is hosted in the cloud or in an edge computing platform or in a home computer (not shown).

The processor 118 can receive power from the power source 134, and can be configured to distribute and/or control the power to the other components in the WTRU 102. The power source 134 can be any suitable device for powering the WTRU 102. For example, the power source 134 can include one or more dry cell batteries, solar cells, fuel cells, and the like.

The processor 118 can also be coupled to the GPS chipset 136, which can be configured to provide location information (e.g., longitude and latitude) regarding the current location of the WTRU 102. In addition to, or in lieu of, the information from the GPS chipset 136, the WTRU 102 can receive location information over the air interface 115/116/117 from a base station (e.g., base stations 114a, 114b) and/or determine its location based on the timing of the signals being received from two or more nearby base stations. It will be appreciated that the WTRU 102 can acquire location information by way of any suitable location-determination method.

The processor 118 can further be coupled to other peripherals 138, which can include one or more software and/or hardware modules that provide additional features, functionality, and/or wired or wireless connectivity. For example, the peripherals 138 can include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 can be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 can connect to other components, modules, or systems of such apparatuses or devices via one or more interconnect interfaces, such as an interconnect interface that can comprise one of the peripherals 138.

Figure 1G:
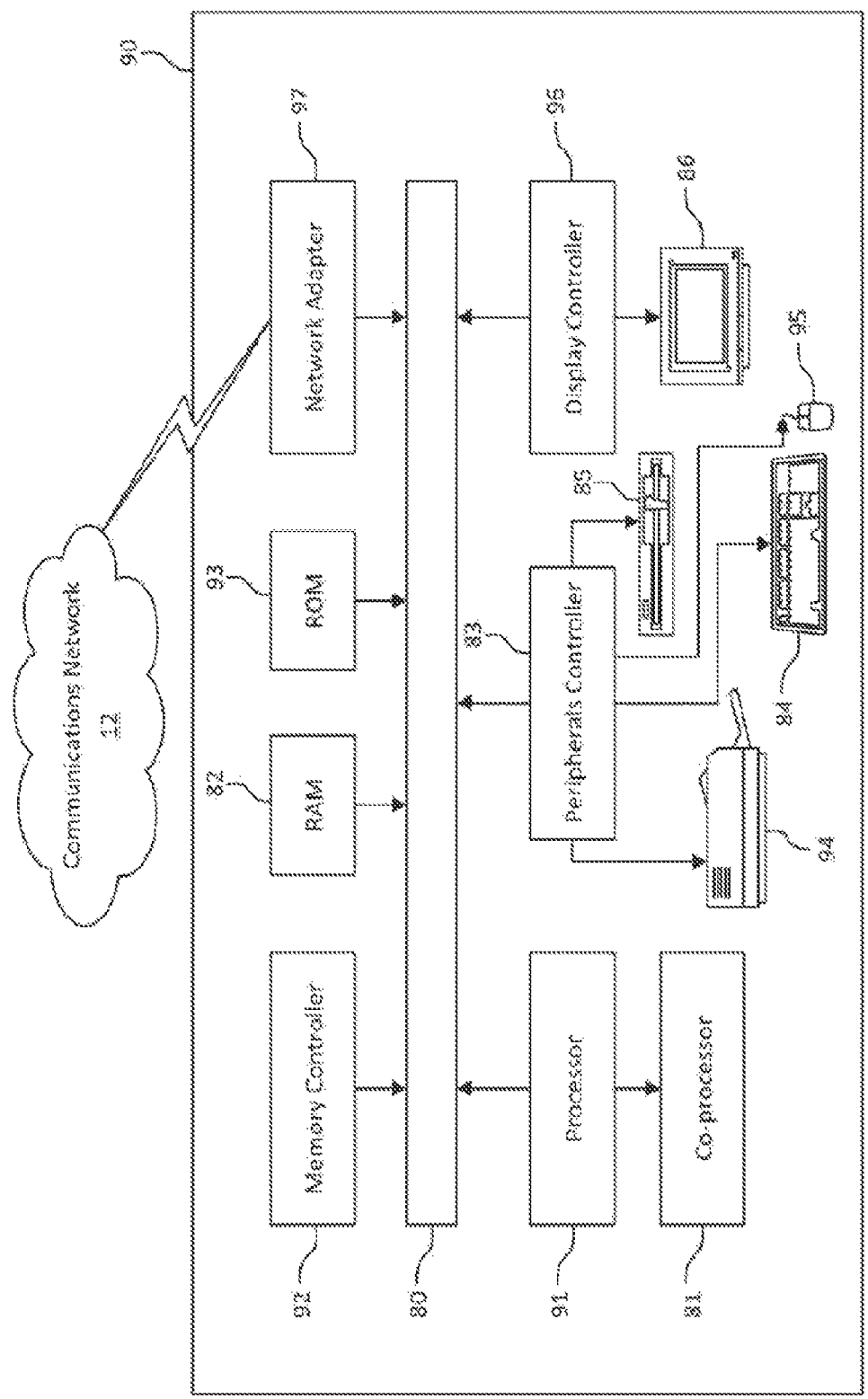
FIG. 1G is a system diagram that shows an example 3GPP architecture.

FIG. 1G is a block diagram of an exemplary computing system 90 in which one or more apparatuses of the communications networks illustrated in FIGS. 1A, 1C, 1D and 1E can be embodied, such as certain nodes or functional entities in the RAN 103/104/105, Core Network 106/107/109, PSTN 108, Internet 110, Other Networks 112, or Network Services 113. Computing system 90 can comprise a computer or server and can be controlled primarily by computer readable instructions, which can be in the form of software, wherever, or by whatever means such software is stored or accessed. Such computer readable instructions can be executed within a processor 91, to cause computing system 90 to do work. The processor 91 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 can perform signal coding, data processing, power control, input/output processing, and/or any other functionality that enables the computing system 90 to operate in a communications network. Coprocessor 81 is an optional processor, distinct from main processor 91, that can perform additional functions or assist processor 91. Processor 91 and/or coprocessor 81 can receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 can be controlled by memory controller 92. Memory controller 92 can provide an address translation function that translates virtual addresses into physical addresses as instructions are executed. Memory controller 92 can also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 can contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output can include text, graphics, animated graphics, and video. The visual output can be provided in the form of a graphical user interface (GUI). Display 86 can be implemented with a CRT-based video display, an LCD-based flat-panel display, gas plasma-based flat-panel display, or a touch-panel. Display controller 96 includes electronic components required to generate a video signal that is sent to display 86.

Further, computing system 90 can contain communication circuitry, such as for example a wireless or wired network adapter 97, that can be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, can be used to perform the transmitting and receiving steps of certain apparatuses, nodes, or functional entities described herein.

It is understood that any or all of the apparatuses, systems, methods and processes described herein can be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein can be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Use Cases for 5G V2X

As Vehicle-to-everything (V2X) applications are making significant progress, transmission of short messages about vehicles' own status data for basic safety can be extended with transmission of larger messages containing raw sensor data, vehicles' intention data, coordination, confirmation of future maneuver, etc. For these advanced applications, the expected requirements to meet the needed data rate, latency, reliability, communication range and speed are made more stringent.

For enhanced V2X (eV2X) services, 3GPP has identified 25 use cases and the related requirements in TR 22.886.

A set of the normative requirements are specified in TS 22.186 with the use cases categorized into four use case groups: vehicles platooning, extended sensors, advanced driving and remote driving.

The detailed description of performance requirements for each use case group specified in TS 22.186.

Uu-Based Sidelink Control for V2X in NR

In NR V2X, sidelink resource allocation modes 1 and mode 2 are agreed. In mode 1, the base station schedules the sidelink resources used by the UE for sidelink transmission. The UE can use the allocated resources to perform broadcast, groupcast, or unicast on the sidelink. In mode 2, UE determines the sidelink resources used for sidelink transmission within the sidelink resources configured by the base station or pre-configured sidelink resources.

Mode 1 supports the gNB to assign the sidelink resources through the Uu interface for both dedicated sidelink carrier and shared licensed carrier between the Uu transmission and sidelink transmission. When the carried is shared between the Uu transmission and sidelink transmission, the Uu transmission and the sidelink transmission can occur in the same frame but in different slots, or the Uu transmission and the sidelink transmission can occur in the same slot. In subsequent sections, a carrier on which Uu transmission and sidelink transmission is multiplexed is called a shared carrier.

In mode 1, the gNB can dynamically allocate the resources used for sidelink transmission, or the gNB can allocate the resources used for sidelink transmission through the type 1 configured grant, or through the type 2 configured grant.

Inter-UE Multiplexing in NR

Downlink transmissions will collide when some of the time and frequency resources of two or more downlink transmissions overlap. gNB makes such scheduling in some scenarios, e.g., if there is an urgent data need to be sent with very low latency and no unscheduled resources are available. In NR, when this happens, the gNB will discard the low priority transmission and transmit the high priority data. Then the gNB will send the preemption indication to indicate the preempted UE(s) to flush their buffer(s).

DCI format 2_1 is used for notifying a UE the PRB(s) and OFDM symbol(s) within a slot, for which the UE can assume no transmission is intended for it. Within one DCI, it can carry multiple preemption indications, where each preemption indication is 14 bits. The interpretation of the bitmap is configurable. E.g., each bit represents one OFDM symbol in the time domain and the full bandwidth part, or two OFDM symbols in the time domain and one half of the bandwidth part.

Similar to the downlink, two scheduled uplink transmissions can also collide in some scenarios. When uplink transmission colliding happens, the scheduled low priority uplink transmission can affect the performance of the scheduled high priority uplink transmission. To handle this problem, the gNB can send a cancellation indicator to cancel the scheduled low priority uplink transmission or the gNB can use power-based mechanism to reduce the impact of the scheduled low priority uplink transmission.

For NR V2X mode 1 shared carrier scenario, the gNB can allocate a sidelink transmission using dynamic scheduling, type 1 configured grant, or type 2 configured grant on a shared carrier with the downlink (DL) and/or uplink (UL) transmissions on Uu interface. For example, the gNB can schedule a very low latency or high priority DL data transmission on the Uu interface for a UE, which can overlap with a sidelink transmission scheduled already or configured for another UE. In this case both transmissions can degrade or even fail. Therefore, mechanisms need to be introduced to handle the inter-UE collision between a dynamically scheduled or configured sidelink transmission and a dynamically scheduled very low latency or high priority DL or UL transmission.

For NR V2X mode 1, the gNB can allocate a sidelink transmission using dynamic scheduling, type 1 configured grant, or type 2 configured grant. For example, the gNB can schedule a very low latency or high priority data transmission on sidelink for a UE, which can overlap a sidelink transmission scheduled already or configured for another UE. In this case, both transmissions can degrade or even fail. Therefore, mechanisms need to be introduced to handle the inter-UE collision between a dynamically scheduled or configured sidelink transmission and a dynamically scheduled very low latency or high priority sidelink transmission.

Disclosure Solutions include:

The disclosure includes solutions for handling the inter-UE collision in NR V2X are disclosed for the following use cases:

Inter-UE collision between dynamically scheduled broadcast sidelink and dynamically scheduled Uu transmission.

Inter-UE collision between dynamically scheduled unicast sidelink and dynamically scheduled Uu transmission.

Inter-UE collision between dynamically scheduled groupcast sidelink and dynamically scheduled Uu transmission.

Inter-UE collision between configured grant based broadcast sidelink and dynamically scheduled Uu transmission.

Inter-UE collision between configured grant based unicast sidelink and dynamically scheduled Uu transmission.

Inter-UE collision between configured grant based groupcast sidelink and dynamically scheduled Uu transmission.

Inter-UE collision between dynamically scheduled sidelink and another dynamically scheduled sidelink.

Inter-UE collision between configured grant based sidelink and dynamically scheduled sidelink.

Disclosed inter-UE collision handling mechanisms include:

Reduce the transmit power of the preempted transmission.

Reduce the transmitter and/or receiver antenna gain of the preempted transmission.

Increase the transmit power of the transmission that is going to preempt other transmission.

Increase the transmitter and/or receiver antenna gain of the transmission that is going to preempt other transmission.

Preempted the antenna panels of the preempted transmission.

Cancel the transmission of the preempted transmission.

This disclosure includes the following solutions:

Configuration and signaling for a UE to monitor and decode the Sidelink Cancellation Indication (SL-CI).

Mechanism of handling the inter-UE collision for sidelink transmission with repetitions.

Prioritization rule for simultaneous sidelink and uplink transmissions.

Dynamically Scheduled Uu Transmission Preempts the Sidelink Transmission

Figure 2:
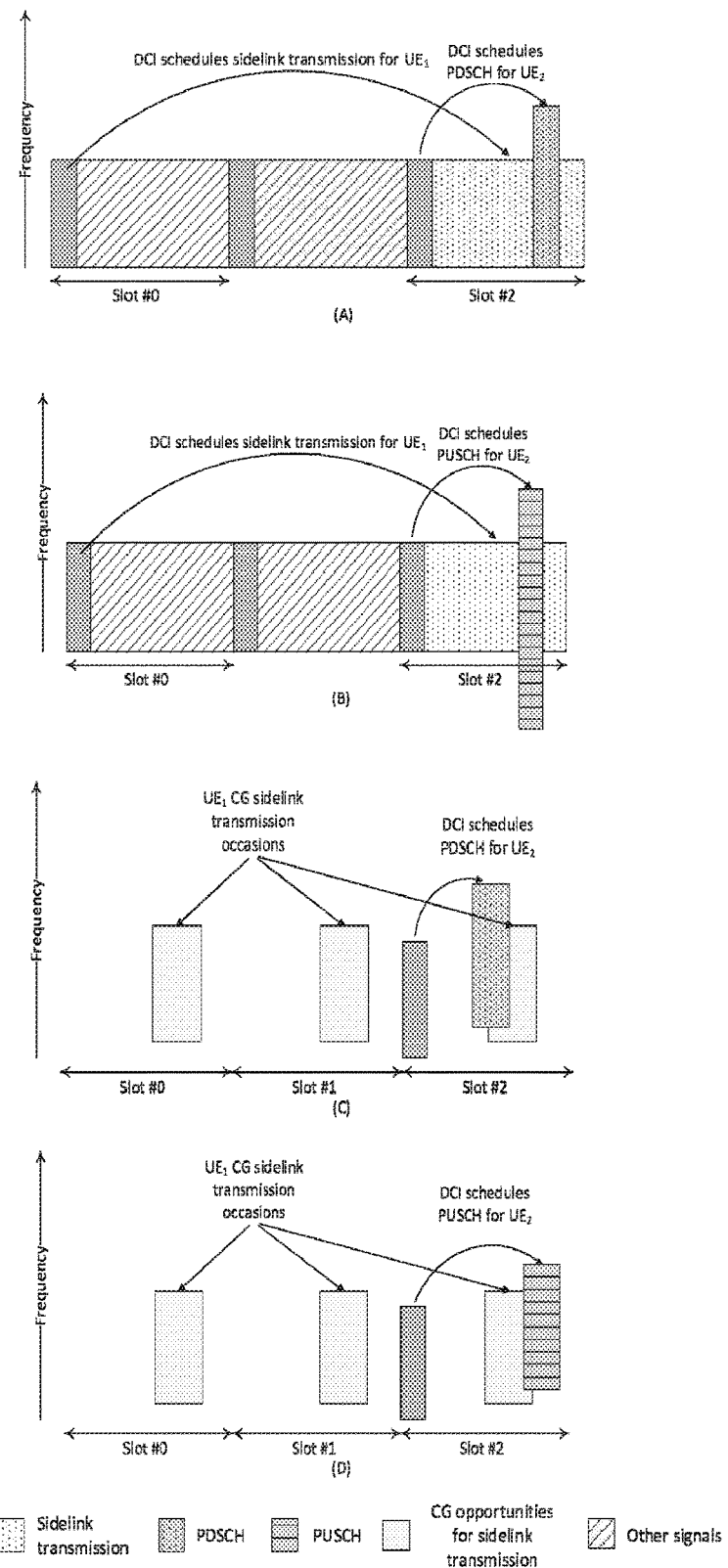
FIG. 2 shows a sidelink transmission preempted by a dynamically scheduled Uu transmission in accordance with an exemplary embodiment.

In NR V2X model, the Uu interface and sidelink can operate on a shared carrier. gNB can schedule the DL or UL transmissions on the Uu interface and transmissions on sidelink based on the system status. In some scenarios, the resources scheduled for very low latency or high priority DL or UL transmissions on Uu (e.g. PDSCH and/or PUSCH) can be partially or fully overlapped in time and/or frequency with the resources allocated to the sidelink transmission with following alternatives as shown in FIG. 2.

Case A: Dynamically scheduled downlink transmission on the Uu interface (e.g. PDSCH) can be overlapped/collided with the dynamically scheduled sidelink transmission.

Case B: Dynamically scheduled uplink transmission on the Uu interface (e.g. PUSCH) can be overlapped/collided with the dynamically scheduled sidelink transmission.

Case C: Dynamically scheduled downlink transmission on the Uu interface (e.g. PDSCH) can be overlapped/collided with a configured grant sidelink transmission.

Case D: Dynamically scheduled uplink transmission on the Uu interface (e.g. PUSCH) can be overlapped/collided with a configured grant sidelink transmission.

The sidelink transmission shown in FIG. 2 can be broadcast, groupcast, or unicast, or any combination of the prior. In this example, the Uu transmission can have a higher priority or low latency requirement comparing to the sidelink transmission. To guarantee the transmission/reception of the higher priority data to/from Uu transmission, the sidelink transmission can be preempted.

Dynamically Scheduled Broadcast Sidelink Transmission Preempted by a Dynamically Scheduled Uu Transmission In this section, solutions are described for the case that a dynamically scheduled Uu transmission collides with a dynamically scheduled broadcast sidelink transmission. In broadcast scenario, the Tx UE will not receive ACK/NACK feedback from Rx UE(s). The Uu transmission herein can be a downlink transmission or can be an uplink transmission.

Assume UE1 is dynamically scheduled by the gNB to transmit a broadcast transmission on the sidelink; and assume UE2 is dynamically scheduled by the gNB with a transmission or reception (e.g. PDSCH or PUSCH) on the Uu interface, where some or all of the resources allocated to UE2 are overlapped in time and frequency with the resources allocated to the UE1. To handle the inter-UE collision, we disclose the broadcast sidelink transmission can be preempted with the following alternatives:

Uu Transmission Preemption with Higher Power

In a first alternative, the UE1 will perform the broadcast sidelink transmission regardless whether it received a preemption or not.

To guarantee the transmission/reception of the higher priority data to/from UE2, the Uu transmission can be performed with a higher power level compared to the power level used for no inter-UE collision scenario. For example, if it is a downlink transmission, the gNB can increase the transmit power and/or beamforming antenna gains; if it is an uplink transmission, UE2 can be indicated to increase the transmit power. The transmission power command (TPC) field in the scheduling DCI can be used to indicate UE2 to increase the transmit power; or one bit field in the scheduling DCI can be used to indicate UE2 whether it is preempting other transmissions or the selection of a particular codeword in a codebook for codebook-based UL transmission can indicate an increased transmit power, if UE2 is preempting other transmissions, it can perform the transmission with the maximum power or by applying a pre-defined/pre-configured transmit power offset; or UE2 can be indicated with the priority level of the scheduled uplink transmission through the scheduling DCI, each priority level can be associated with pre-define/pre-configured transmit power level and/or offset, UE2 will set the transmit power level correspondingly based on the indicated priority level.

After UE1 performs the broadcast sidelink transmission, it can monitor a Uu downlink signals/channels (e.g. PDCCH) potentially carrying an indicator, in order to determine whether its transmission is preempted or not before flushing its transmission buffer. A UE can be configured by the Radio Resource Control (RRC) with the information of the preemption monitoring occasion, e.g., the monitoring periodicity, at symbols and/or slots. If UE1 fails to detect that the transmission is preempted, it will flush its buffer; if UE1 detects that the transmission is preempted, it can keep the buffer and prepare for retransmission.

Figure 3:
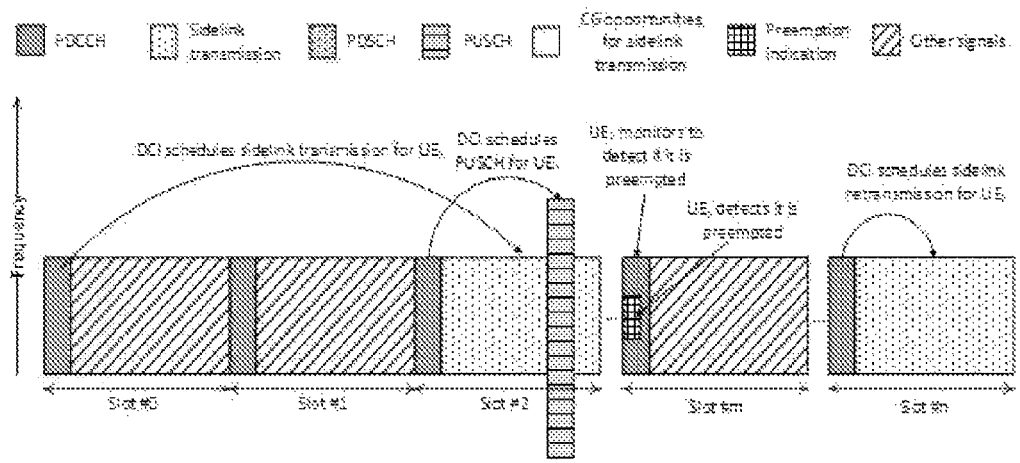
FIG. 3. shows a UE detecting an explicit preemption indication and preforming retransmission in accordance with an exemplary embodiment.
Figure 4:
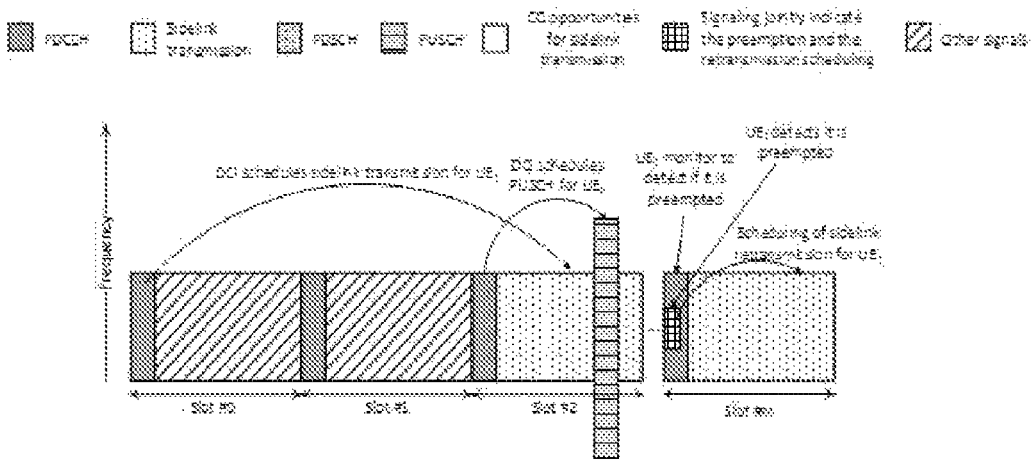
FIG. 4 shows a UE detecting a signaling jointly indicating explicit preemption indication and retransmission scheduling in accordance with an exemplary embodiment.
Figure 5:
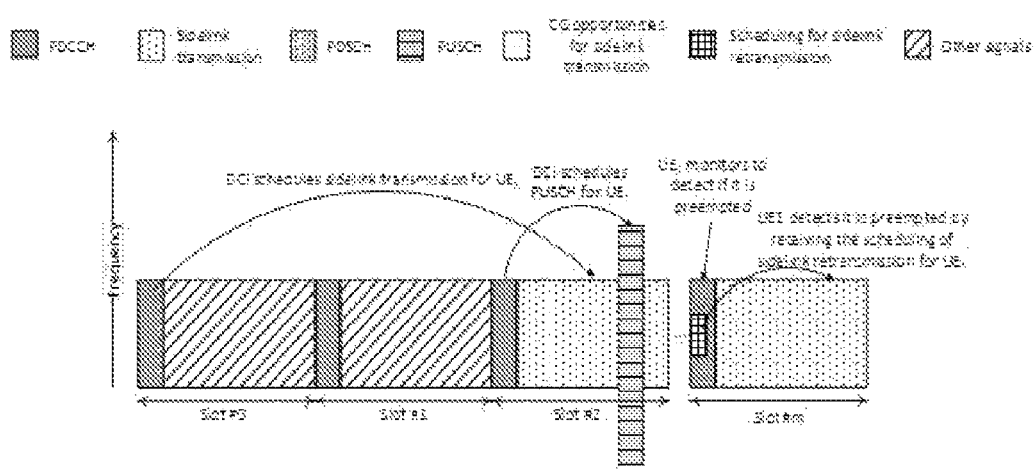
FIG. 5 shows a UE detecting an implicit preemption indication via a retransmission scheduling DCI in accordance with an exemplary embodiment.

UE1 can detect that the transmission is preempted if a preemption indication is detected. The preemption indication can be UE-specific, or group-specific. The indication can be carried in a sequence, or a preamble, or a reference signal, or a DCI. When UE-specific indication is used, a UE will be configured with UE-specific configuration. When group-specific indication is used, multiple UEs will be configured with the same group-specific configuration. For a UE configured with group-specific indication, it can skip the next monitoring occasion if it is not schedule with transmission between two monitoring occasion. Then UE1 can receive a separate scheduling DCI to schedule the retransmission as shown in FIG. 3. Or UE1 can detect the transmission is preempted by detecting a signaling jointly indicating the preemption and the resources used for retransmission as shown in FIG. 4. Or the preemption indication can be implicitly indicated by the scheduling of the retransmission, e.g., when UE1 receives the scheduling of the retransmission for the broadcast sidelink transmission, it determines the initial broadcast sidelink transmission is preempted as shown in FIG. 5. The scheduling of the retransmission can be intra slot scheduling as shown in the figure or can be cross slots scheduling, e.g., depends on the latency requirement.

For a UE receiving a retransmission of the broadcast message, the UE can do soft combining with retransmission(s) of multiple message receptions to improve the probability of successfully decoding the data. If the UE uses the preempted transmission to do the soft combining, it can degrade the combined decoding Preemption indication(s) can be sent to the receiver UEs to inform not to soft combine the preempted transmission with other transmission(s). For example, after detecting the preemption from the gNB, the UE1 can broadcast the preemption to the receiver UEs, e.g., through code-block group flush indicator (CBGFI) field in the sidelink control information (SCI) for the retransmission. For example, UE1 can set the bits in the CBGFI bitmap to '1' for the preempted code-block groups (CBGs). Or through the new data indicator (NDI) field in the SCI for the retransmission. For example, if the retransmission is due to preemption, UE1 can toggle the value in the NDI field in the SCI for retransmission. if the retransmission is not due to preemption, UE1 will not toggle the value in the NDI field. Or, when UE1 performs the retransmission, it can retransmit with a different RV from the initial transmission, e.g., RV0 for the initial transmission and RV2 for the retransmission. Or when UE1 performs the retransmission, it can retransmit with a different HARQ ID, e.g., HARQ ID 1 for initial transmission and HARQ ID 4 for retransmission. By doing this, the Rx UEs will treat the retransmission as a new transmission and not try to combine it with the initial transmission.

A UE is preconfigured or indicated to know which transmissions can be soft-combined. Example signaling to indicate such information is specified herein. How the UE does soft-combining and whether the UE must do the soft-combining is up to the particular UE implementation. Typically, UEs will do combining whenever it is possible to improve the performance.

When UE1 performs the retransmission, it can retransmit the whole TB or it can only retransmit a subset of the TB, e.g., preempted symbols, physical resource blocks (PRBs) or CBGs.

Figure 6:
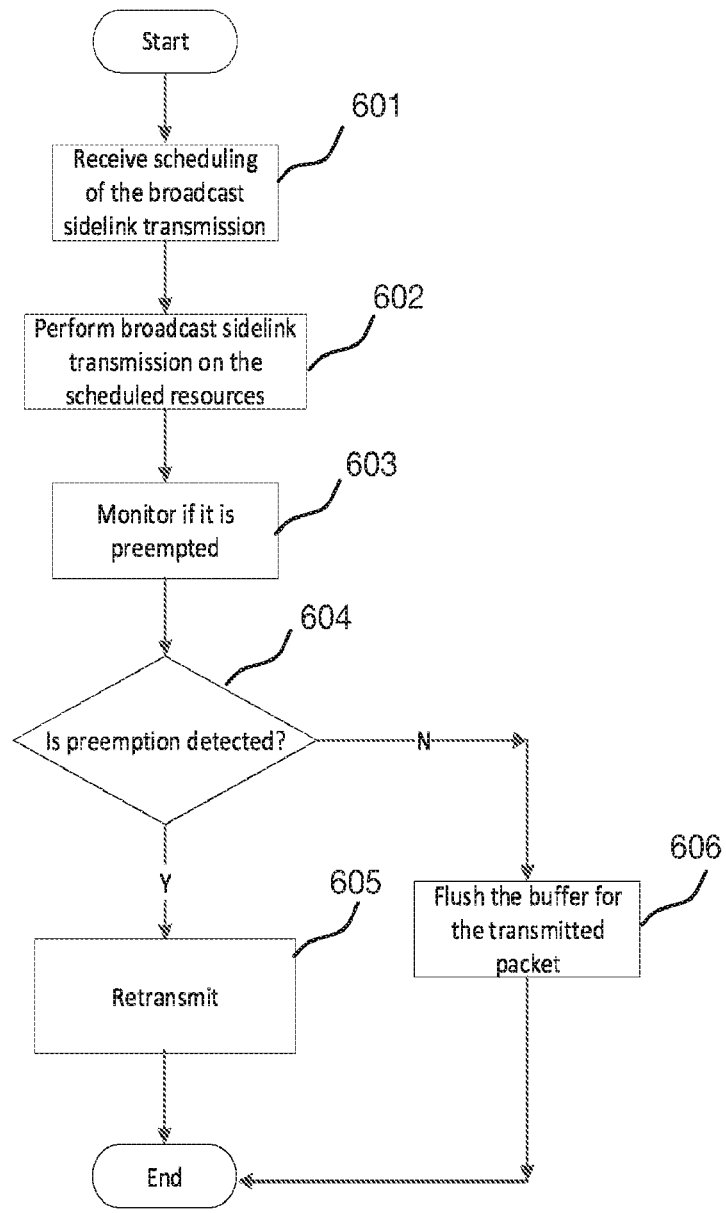
FIG. 6 shows a method for detecting the preemption by Uu transmission and retransmitting a broadcast signal on a sidelink in accordance with an exemplary embodiment.

An example of the disclosed procedure for detecting the preemption is shown in FIG. 6 for a sidelink UE that has inter-UE collision with a scheduled Uu transmission. UE receives scheduling of the broadcast sidelink transmission (601). The UE performs broadcast sidelink transmission on the scheduled resources (602). In another case, the receiving UEs can also receive the preemption indication from the gNB. The UE monitors for preemption indication (603) of preemption by a Uu transmission. When preemption is detected (604) the UE will retransmit (605) broadcast on sidelink. When preemption is not detected the UE will flush the buffer for the transmitted packet (606).

Low Priority SL Transmission Preempted with Adjusted Transmission Control Parameters In a second alternative, UE1 can monitor to detect if it is preempted before performing the broadcast sidelink transmission. If preemption occurs, an indication can be sent by the gNB indicating UE1 to adjust the transmission control parameters, e.g., TX power, MCS, transmission layers configuration such as diversity scheme, beamforming/MIMO scheme, CB Gs adaption etc. One example is a UE can reduce transmit power (even to zero) on the whole transmission or on parts of the transmission, e.g. on data REs but not DMRS REs. For example, by detecting the indication, UE1 will overwrite the old TPC and transmit the scheduled broadcast sidelink transmission with the new transmit power.

The new transmit power level or offset can be dynamically indicated to the UE; or the UE can be indicated to switch to a pre-configured low power level or offset. The indication can be signaled through DCI. reference signal, preamble or sequence.

In one case, the UE can be indicated to reduce the power level for all the allocated resources regardless whether it is fully overlapped or partially overlapped with the collided Uu transmission. In this example, the UE can be signaled with one value to indicate the new transmit power, e.g., the UE can be indicated to reduce the transmit power by an offset equal to a certain number of dBs; or the UE can be indicated with the absolute transmit power level it needs to change to. For example, a UE can be configured with multiple sequences, where each sequence is associated with one value. The UE can determine the new transmit power based on which sequence and/or preamble that was detected.

Or, when reference signal such as DMRS, CSI-RS is used to indicate the power reduction, a UE can be configured with different reference signal time and frequency configurations, where each configuration is associated with one value. The UE can determine the new transmit power based on which time and frequency resources the UE detects the reference signal.

Or a UE can be configured with one reference signal (DMRS or CSI-RS) time and frequency configuration, but different reference signal sequences. For example, a UE can be configured with 4 different sequence initializers used to generate the reference signal sequence, where each initializer is associated with one value as shown in Table 1. The UE can figure out the indicated power control command based on the detected sequence of the reference signal.

TABLE 1

Example Initializer Values Configured to a UE for Determining the Associated Power Control Commands

| Initializer Value | Associated power control command |
|---|---|
| $N_{ID,1}^{nSCID}$ | Reduce the power by $k_1$ dB (e.g., 0 dB) or set the power to $p_1$ dBm |
| $N_{ID,2}^{nSCID}$ | Reduce the power by $k_2$ dB (e.g., 3 dB) or set the power to $p_2$ dBm |
| $N_{ID,3}^{nSCID}$ | Reduce the power by $k_3$ dB (e.g., 6 dB) or set the power to $p_3$ dBm |
| $N_{ID,4}^{nSCID}$ | Reduce the power by $k_4$ dB (e.g., 9 dB) or set the power to $p_4$ dBm |

Or a UE can be indicated by the gNB with the power control command through the UE-specific DCI or through group common DCI. A UE can be configured by the RRC with the information of the monitoring occasion, e.g., the monitoring periodicity, symbols and/or slots to be monitored etc. Or a UE can only monitor the slot that contains the allocated resources.

In another case, the UE can be indicated to reduce the power level for part of the allocated resources, e.g., reduce the power level for some symbols and/or PRBs, e.g. the overlapped symbols and/or PRBs. A UE-specific DCI can be used to indicate the power control command and the time domain resources and/or frequency domain resources the UE need to apply the power control command to and in some cases which slot the PI applies to. For example, a new DCI format can be introduced with CRC scrambled with a UE specific RNTI e.g., RNTIp. Such DCI can carry a power control command field indicating the power adjustment; a field to indicate the time domain resources that the UE can consider them are preempted and apply the power adjustment to, e.g., a 14 bits bitmap with each bit representing one symbol or a 7 bits bitmap with each bit representing two symbols in the slot; and/or a field to indicate the frequency resources that the UE can consider them are preempted and apply the power adjustment to, e.g., through bitmap. When a UE detects a DCI scrambled with the configured RNTIp in its monitoring occasion, the UE can figure out it is preempted and determine the power adjustment, the preempted time domain resources and/or frequency domain resources. Besides to introduce a new DCI format, the indication can be indicated through existing DCI format, e.g., DCI format 0_1. When a UE detects the DCI format 0_1 with some fields set to some pre-defined values, the UE can determine this DCI is intended to indicate the power control command due to inter-UE collision and figure out the power to be adjusted and the preempted time and/or resources.

Or, group common DCI can be used to indicate the power control command and the time domain resources and/or frequency domain resources the UE need to apply the power control command to. For example, a new DCI format can be introduced with CRC scrambled with a group specific RNTI e.g., RNTIpg which can be configured to a group of UEs. Such DCI can carry multiple power control command fields indicating the power adjustment for each UE within the group; a field to indicate the time domain resources that the UE can consider them are preempted and apply the power adjustment to, e.g., a 14 bits bitmap with each bit representing one symbol or a 7 bits bitmap with each bit representing two symbols in the slot; and/or a field to indicate the frequency resources that the UE can consider them are preempted and apply the power adjustment to, e.g., through bitmap. Each UE can be configured with its power control command bits in the group common DCI through RRC message when forming the group. When a UE detects a DCI scrambled with the configured RNTIpg in its monitoring occasion, the UE can figure out it is preempted and determine the power adjustment in the configured bits, the preempted time domain resources and/or frequency domain resources.

Or, sequence, preamble, reference signal can be used to indicate the power control command and the time domain resources and/or frequency domain resources the UE need to apply the power control command to. Due to more information need to be carried, more sequences, preambles or reference signal initializers can be configured for different hypotheses. The UE can perform blind cross correlation for more possibilities to detect and figure out the information correspondingly.

After the UE1 performs the broadcast sidelink transmission with the reduced power level, UE1 can perform retransmission. UE1 can retransmit the whole TB or it can only retransmit the part reduce power is applied, e.g., overlapped symbols, PRBs or CBGs.

Figure 7:
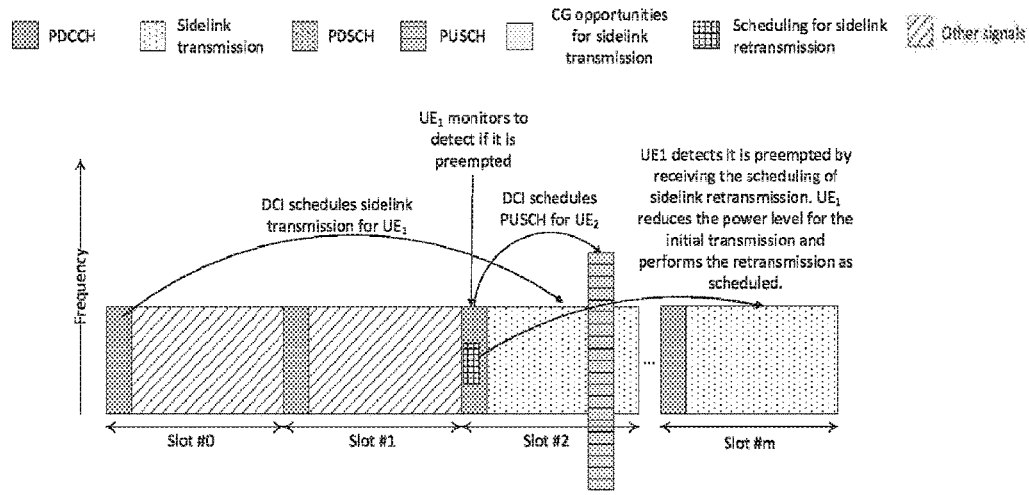
FIG. 7 shows a joint indication of reducing power and retransmission for a preempted sidelink in accordance with an exemplary embodiment.

In one case, the scheduling of the retransmission can be jointly indicated with the indication for reducing the power as shown in FIG. 7. For example, UE1 can receive the retransmission scheduling before it performs the scheduled initial transmission e.g., through DCI format 0_1. In this case, UE1 can determine that the scheduled initial transmission is preempted. UE1 will transmit the preempted initial transmission with reduced power level and perform the retransmission as it is scheduled.

Figure 8:
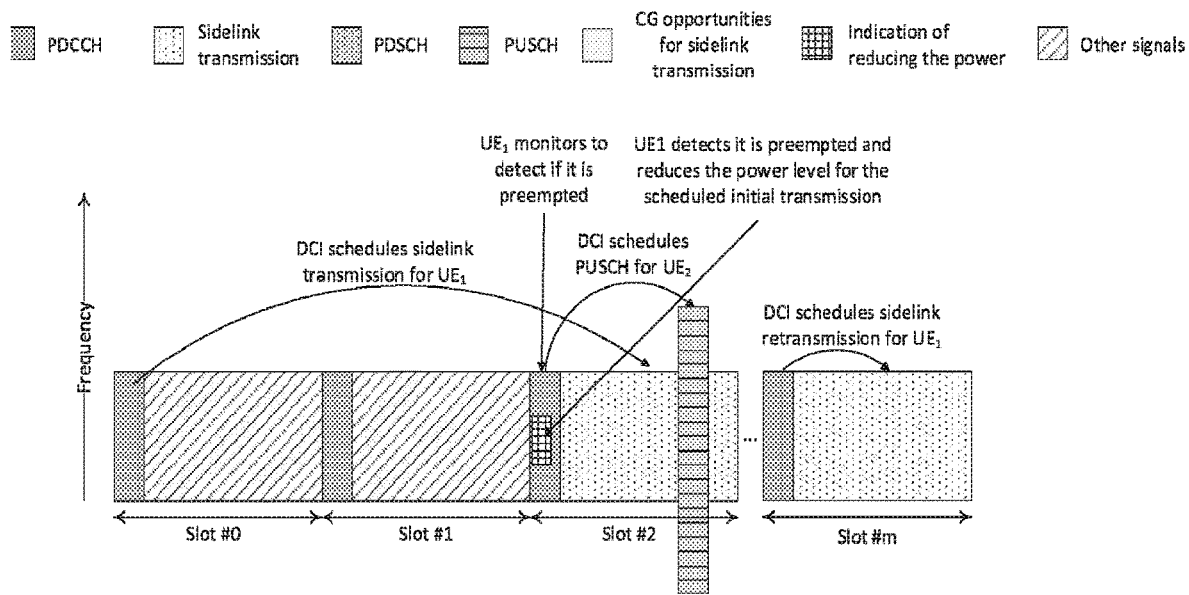
FIG. 8 shows a separate indication of reducing power and retransmission for a preempted sidelink transmission in accordance with an exemplary embodiment.

Or, in another case, the scheduling of the retransmission can be separately indicated from the indication for reducing the power as shown in FIG. 8. UE1 can first monitor to detect whether it is preempted. If a UE detects the power reducing indication, e.g., sequence, preamble, reference signal or DCI as disclosed, the UE determines it is preempted and reduce the transmission power. Then the UE can monitor the scheduling of the retransmission and perform retransmission as scheduled.

Also, an indication can be sent to the receiver UEs to inform not to soft combine the preempted data or all the received data in the initial transmission. The solution disclosed in Uu transmission pre-emption with higher power alternative can also apply here.

Figure 9:
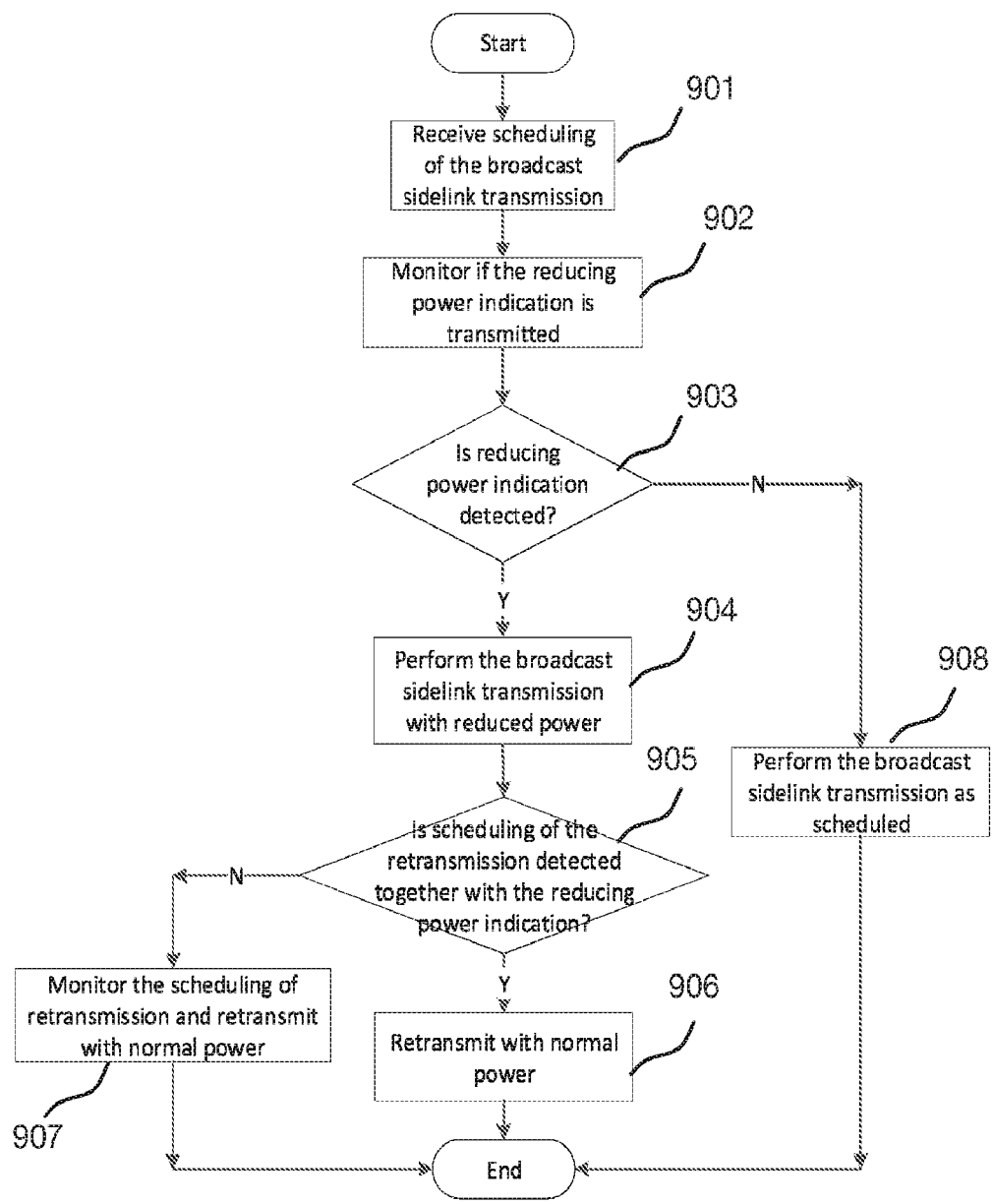
FIG. 9 shows a method for detecting a power reduction indicator for a broadcast sidelink UE that has inter-UE collision with a scheduled Uu transmission in accordance with an exemplary embodiment.

An example of the disclosed procedure for detecting the power reduction indicator is shown in FIG. 9 for a sidelink UE that has inter-UE collision with a scheduled Uu transmission. UE receives scheduling of the broadcast sidelink transmission (901). The UE monitors to detect whether the reducing power indication was transmitted (902). When the UE detects the reducing power indication (903) it performs the broadcast sidelink transmission with reduced power (904). If it does not detect the reducing power indication (903) it performs the broadcast sidelink transmission as scheduled (908). The UE determines if scheduling of the retransmission is detected together with the detection of the reducing power indication (905). If yes, the UE transits with normal power (906). If not, the UE monitors the scheduling of retransmission and retransmits with normal power (907).

Low Priority SL Transmission Preempted with Canceling Indicator

In a third alternative, UE1 can monitor to detect if it is preempted before performing the broadcast sidelink transmission. If preemption occurs, a canceling indication, e.g., SL-CI (sidelink cancellation indication), can be sent by the gNB indicating UE1 to cancel the scheduled transmission. By detecting this indication, UE1 will not perform the whole or part of the scheduled transmission. If a canceling indication is detected, PHY can send an indication to the upper layer, e.g., MAC of the cancellation.

In one case, the UE can be indicated to cancel the transmission on all the allocated resources regardless whether it is fully overlapped or partially overlapped with the collided Uu transmission, e.g., the UE can cancel the transmission of the whole TB. Similar to detecting the power reduction indicator, the UE can detect the cancelling indication by receiving a UE-specific DCI; or receiving a group common DCI; or detecting a pre-configured reference signal; or detecting a pre-configured preamble; or detecting a pre-configured sequence, e.g., a new reference signal carried by some REs from a physical signal. When multiple panels are sued for the transmission, a UE can be indicated to cancel the transmission on one or more panels. For example, if a UE is scheduled to broadcast through the panel in the front bumper targeting to the front and the panel in the back bumper targeting to the back, the UE can be indicated to not use the panel in the front bumper to broadcast since it is preempted, e.g., the DCI indicting the power reduction indicator can carry a the panel index field to indicate the UE which panels are preempted.

In another case, the UE can be indicated to cancel the transmission on part of the allocated resources, e.g., cancel the transmission on the overlapped symbols and/or PRBs, or cancel the transmission of the CBG that overlaps with the canceled resources. Similar to detecting the power reduction indicator, UE specific DCI or Group common DCI can be used. For example, a new DCI format can be introduced with CRC scrambled with a group specific RNTI e.g., RNTIpg which can be configured to a group of UEs. Such DCI can carry a field to indicate the time domain resources that the UE can consider them are preempted and cancel the transmission, e.g., a 14 bits bitmap with each bit representing one symbol or a 7 bits bitmap with each bit representing two symbols in the slot; and/or a field to indicate the frequency resources that the UE can consider them are preempted and cancel the transmission, e.g., through bitmap.

When a UE detects a DCI scrambled with the configured RNTIpg in its monitoring occasion, the UE can figure out it is preempted and cancel the transmission on the indicated time and/or frequency resources.

Or, sequence, preamble, reference signal can be used to indicate the time domain resources and/or frequency domain resources the UE need to cancel the scheduled transmission. For example, a UE can be configured with k different sequence initializers through RRC used to generate the reference signal sequence, where each initializer is associated with some configurable time domain and/or frequency domain resources. An example is shown in Table 2, where each initializer is representing different time domain resources (assuming symbol 0 is the first symbol in a slot). A UE can be configured with all the initializers shown in the table or a UE can be configured with a subset of the initializers listed. Based on the detected sequence of the reference signal through blind cross correlating, the UE can figure out the time domain and/or frequency domain resources that the UE needs to cancel its transmission.

TABLE 2

Different Initializer Values Configured to a UE for Determining
the Resources on which the Transmission Need to be Canceled

| Initializer Value | Associated time domain and/or frequency domain resources |
|---|---|
| $N_{ID,1}^{nSCID}$ | Symbol 0 and symbol 1 |
| $N_{ID,2}^{nSCID}$ | Symbol 2 and symbol 3 |
| ... | ... |
| $N_{ID,7}^{nSCID}$ | Symbol 12 and symbol 13 |
| $N_{ID,8}^{nSCID}$ | Symbol 0, symbol 1, symbol 2 and symbol 3 |
| $N_{ID,9}^{nSCID}$ | Symbol 2, symbol 3, symbol 4 and symbol 5 |
| ... | ... |
| $N_{ID,13}^{nSCID}$ | Symbol 10, symbol 11, symbol 12 and symbol 13 |
| $N_{ID,14}^{nSCID}$ | Symbol 0 to symbol 6 |
| $N_{ID,15}^{nSCID}$ | Symbol 7 to symbol 13 |
| $N_{ID,15}^{nSCID}$ | Symbol 0 to symbol 13 |

After the UE1 cancels the scheduled broadcast sidelink transmission. UE1 can retransmit the whole TB or it can only retransmit the canceled part, e.g., overlapped symbols, PRB s or CBGs.

Similar concepts disclosed in the power reduction indicator as shown in FIG. 7 and FIG. 8 can apply here. The scheduling of the retransmission can be jointly indicated with the canceling indication. Or The scheduling of the retransmission can be separately indicated from the canceling indication. For example, the canceling indication can be signaled through the group common DCI before the scheduled transmission, e.g., DCI with CRC scramble with RNTIpg; and the retransmission can be scheduled by the UE-specific DCI after the cancelation occurs, e.g., DCI with CRC scramble with C-SL-RNTI.

Also, an indication can be sent to the receiver UEs to inform not to soft combine the preempted data or all the received data in the initial transmission. The solution disclosed in Uu transmission pre-emption with higher power alternative can also apply here.

Figure 10:
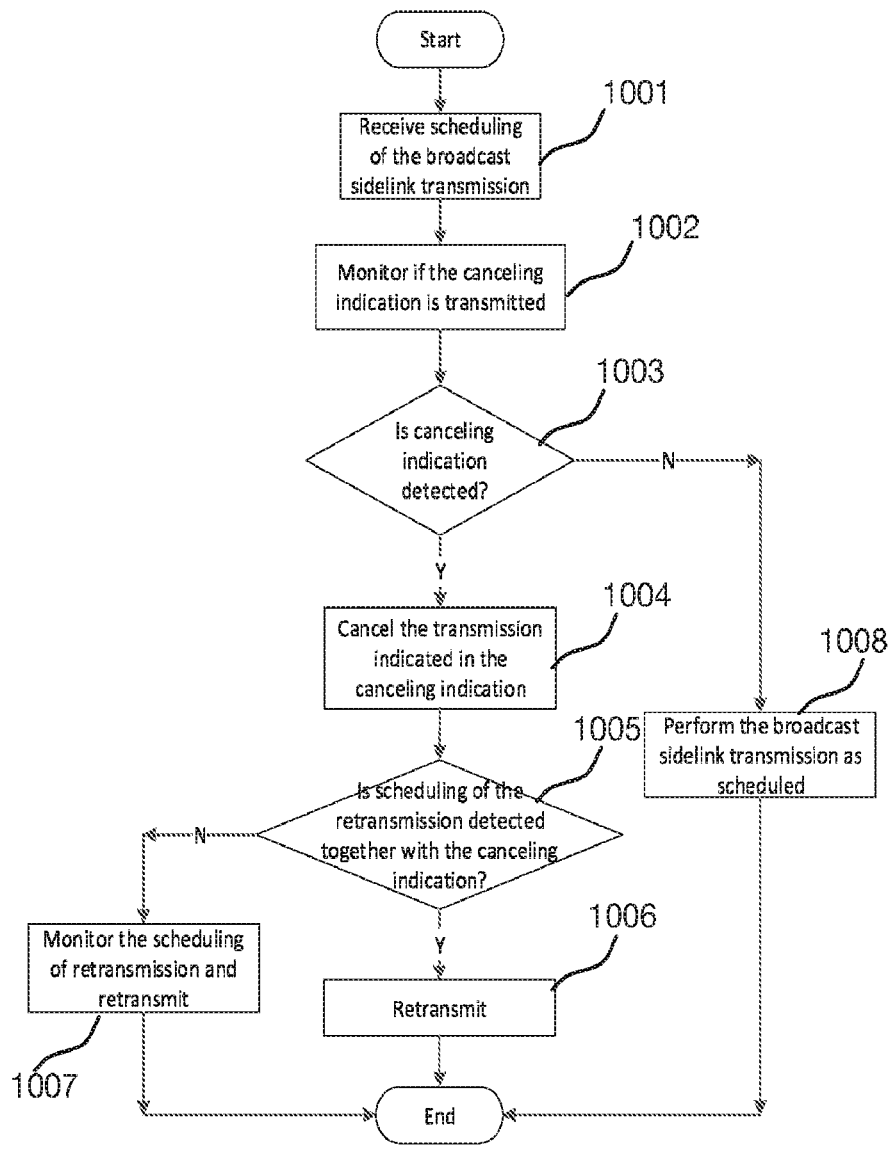
FIG. 10 shows a method of detecting a canceling indication for a broadcast sidelink UE that has inter-UE collision with a scheduled Uu transmission in accordance with an exemplary embodiment.

An example of the disclosed procedure for detecting the canceling indication is shown in FIG. 10 for a sidelink UE that has inter-UE collision with a scheduled Uu transmission. The UE receives scheduling of the broadcast sidelink transmission (1001) and monitors if the canceling indication was transmitted (1002). The UE monitors for the canceling indication (1002) and determines whether it detected the canceling indication (1003). If no detection, it performs the broadcast sidelink transmission as scheduled (1008). If the UE detected the canceling indication, it cancels the transmission indicated in the canceling indication (1004). The UE determines whether scheduling of the retransmission was detected together with the canceling indication (1005) and if yes, the UE retransmits (1006) and if not, the UE monitors the scheduling of retransmission and retransmits (1007).

Dynamically Scheduled Unicast Sidelink Transmission Preempted by Dynamically Scheduled Uu Transmission This section outlines a solution for the case that dynamically scheduled Uu transmission collides with the dynamically scheduled unicast sidelink transmission. In unicast scenario, the Tx UE will receive ACK/NACK feedback from Rx UE. The Uu transmission herein can be a downlink transmission or can be an uplink transmission.

Assume UE1 is dynamically scheduled by the gNB to transmit a unicast transmission on the sidelink as the Tx UE; UE2 is the Rx UE that will receive the unicast sidelink from UE1; and assume UE3 is dynamically scheduled by the gNB with a transmission or reception (e.g. PDSCH or PUSCH) on the Uu interface, where some or all of the resources allocated to UE3 are overlapped in time with the resources allocated to the UE1. To handle the inter-UE collision, we disclose the unicast sidelink transmission can be preempted with the following alternatives.

Uu Transmission Preemption with Higher Power

In a first alternative, UE1 will perform the unicast sidelink transmission regardless it received a preemption or not.

To guarantee the transmission/reception of the UE3, the Uu transmission can be performed with a higher power level comparing to the power level used for no inter-UE collision scenario with the similar solutions presented in the dynamic scheduled broadcast sidelink case.

For the Tx UE, after UE1 performs the unicast sidelink transmission, it will monitor the feedback sent by the UE2 though the PSFCH, e.g., ACK/NACK. UE1 can also monitor an indication sent by the gNB to determine if its transmission is preempted where the configuration of the monitoring occasion can be configured by RRC.

In one case, UE1 can receive ACK from UE2 and not detect the preemption indication from gNB. Then UE1 can determine the transmission is succeeded and it can flush its buffer.

In another case, UE1 can receive ACK from UE2 and detect the preemption indication from gNB. Then UE1 can determine although it is preempted, the transmission is still succeeded, and it can flush its buffer.

In yet another case, UE1 can receive NACK from UE2 and detect the preemption indication from gNB. Then UE1 can determine the transmission is failed due to preemption. UE1 can perform retransmission and send the information of the preemption to UE2 to indicate UE2 to flush its buffer correspondingly. The solution disclosed in Uu transmission pre-emption with higher power alternative in broadcast scenario can also apply here.

In yet another case, UE1 can receive NACK from UE2 and detect the preemption indication from gNB, where the gNB can send the preemption indication to both the Tx UE and Rx UE. Then UE1 can determine the transmission is failed due to preemption. UE1 can perform retransmission without sending the information of the preemption to UE2.

In yet another case, UE1 can receive NACK and the information of preemption from UE2, e.g., through the CBGFI field in the SFCI. For example, UE2 can receive the preemption indication from gNB. It can flush the buffer correspondingly. UE2 can send a bitmap in the SFCI to UE1 to indicate the preempted resources. When UE1 receives such information, UE1 can determine the transmission is failed due to preemption. Then UE1 can perform retransmission.

When inter-UE collision happens, on one hand, gNB can allocate the resources for retransmission to UE1 without receiving the feedback form UE1. UE1 can determine whether to perform the retransmission based on the feedback from Rx UE. For example, if ACK is received from UE2. UE1 can ignore the retransmission scheduling; or if NACK is received from UE2, UE1 can perform the retransmission using the allocated resources. Or, on the other hand, gNB can allocate the resources for retransmission based on the feedback from UE1. UE1 can send an indication, e.g., SR, BSR, to gNB to indicated if a retransmission needs to be scheduled based on the feedback from the Rx UE. For example, when UE1 receives ACK from UE2, UE1 can indicate to the gNB that no retransmission needs to be scheduled. When UE1 receives NACK from UE2. UE1 can indicate to the gNB that a retransmission needs to be scheduled. The indication can be explicit, e.g., sending indication 'A' means retransmission is needed, and sending indication 'B' means retransmission is not needed; or the indication can be implicit, e.g., sending indication 'C' means retransmission is needed, and not sending indication 'C' means retransmission is not needed.

When UE1 does perform retransmission, it can retransmit the whole TB or it can only retransmit a subset of the TB, e.g., preempted symbols, PRBs or CBGs.

Figure 11:
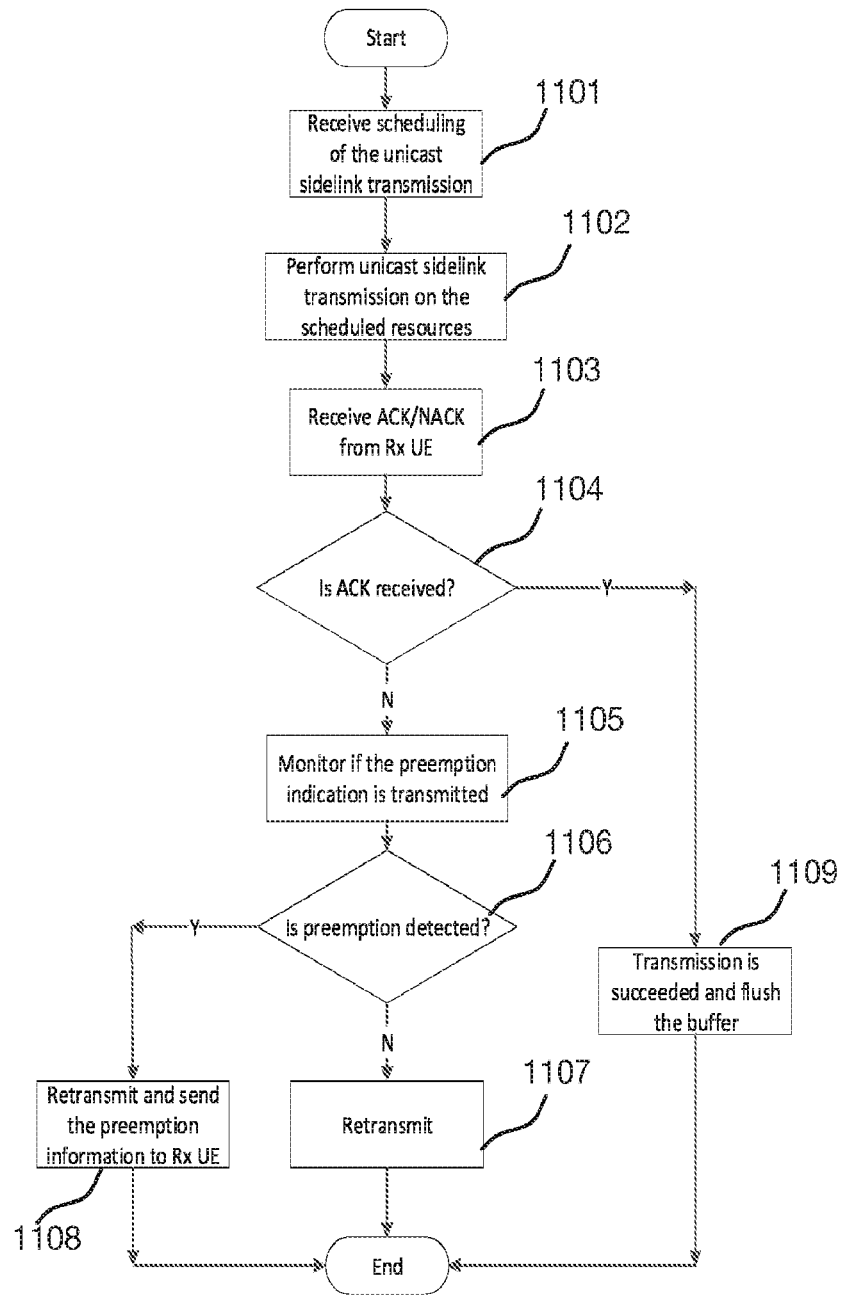
FIG. 11 shows a method for a transmitting UE detecting a preemption for a unicast sidelink UE that has inter-UE collision with a scheduled Uu transmission in accordance with an exemplary embodiment.

An example of the disclosed procedure for Tx UE detecting the preemption is shown in FIG. 11 for a sidelink UE that has inter-UE collision with a scheduled Uu transmission. The UE receives scheduling of a unicast sidelink transmission (1101). The UE performs unicast sidelink transmission on scheduled resources. (1102). The UE monitors for an ACK or NACK from the Rx UE (1103). The UE determines if it received an ACK or NACK from the Rx UE (1104). The UE monitors for a preemption indication (1105) which was transmitted. The UE determines if it detected the preemption (1106). If it detected the preemption, the UE retransmits and sends the preemption information to the Rx UE (1108). If not, the Tx UE retransmits (1107). If the Tx UE did receive an ACK or NACK then it transmits and flushes its buffer (1109).

For the Rx UE, UE2 can try to decode the transmitted data and send feedback to UE1. When UE2 can't decode the data, it can send NACK to UE1.

In one case, UE2 can receive the retransmission but not receive any preemption indication. UE2 can soft combine the received retransmission with the data in the buffer for the same HARQ processing ID.

In another case UE2 can receive the retransmission and receive preemption indication from the UE1. UE2 can flush its buffer and decode the retransmission. If the initial transmission is partially preempted, the UE can only flush the buffer for the preempted part. For example, the UE can soft combine the retransmission with a first part of the soft buffer but not with a second part of the soft buffer, which can correspond to preempted resources, so the UE can flush the second part of the soft buffer.

In yet another case UE2 can receive the retransmission from UE1 and receive preemption indication from the gNB. UE2 can flush its buffer and decode the retransmission.

In yet another case UE2 can receive preemption indication from the gNB before sending the HARQ feedback to UE1. UE2 can flush its buffer and send the preemption information along with the HARQ feedback.

Figure 12:
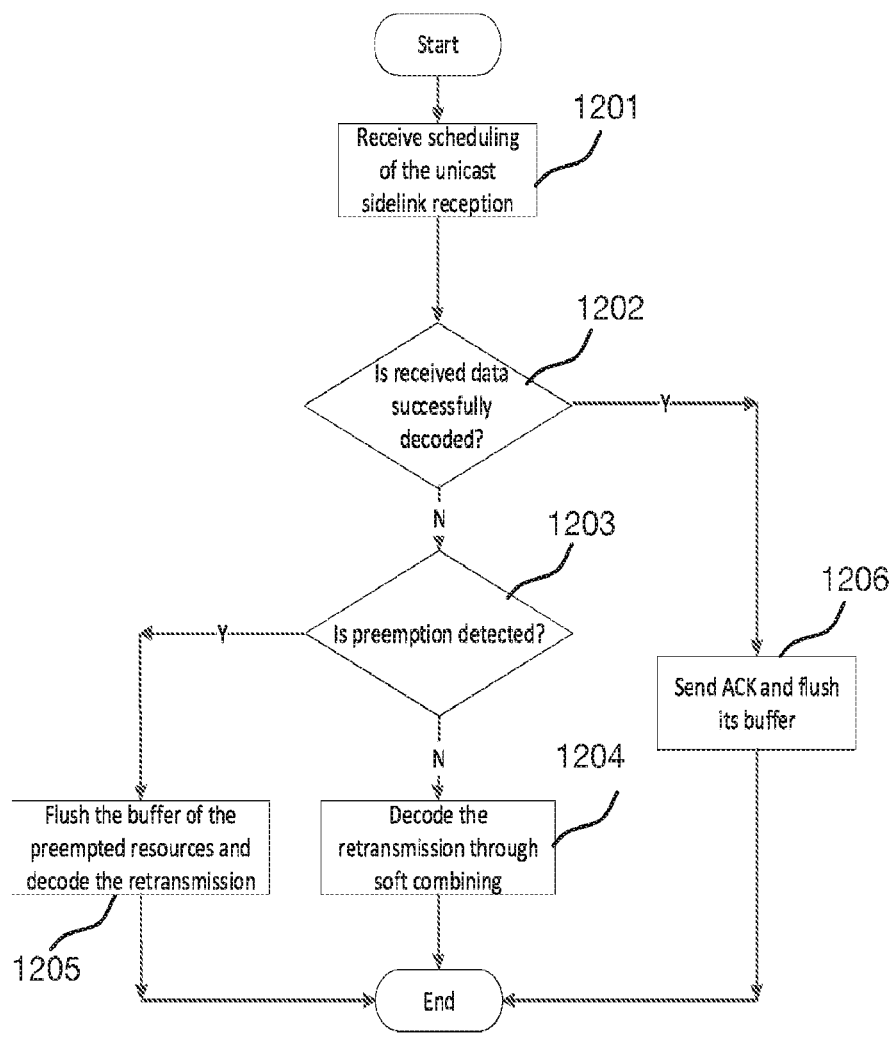
FIG. 12 shows a procedure for a receiving UE detecting a preemption for a unicast sidelink UE that has inter-UE collision with a scheduled Uu transmission in accordance with an exemplary embodiment.

An example of the disclosed procedure for Rx UE detecting the preemption is shown in FIG. 12 for a sidelink UE that has inter-UE collision with a scheduled Uu transmission. A Rx UE receives scheduling of a unicast sidelink preemption (1201). The UE determines if it received data was successfully decoded (1202). If yes, the UE sends an ACK and flushes its buffer (1206). If not, the Rx UE determines if preemption was detected (1203). If yes, it flushes its buffer of the resources indicated as preempted and decodes a retransmission (1205). If not, the Rx UE decodes the retransmission through soft combining (1204).

For the scheduling of the retransmission, the solutions disclosed for dynamically scheduled broadcast as shown in FIG. 3, FIG. 4, and FIG. 5 can also apply here.

Low Priority SL Transmission Preempted with Adjusted Transmission Control Parameters In a second alternative, an indication can be sent by gNB indicating UE1 to adjust the transmission control parameters before UE1 performs the scheduled initial unicast transmission. The concepts of how to send the power reduction indicator that disclosed for dynamically scheduled broadcast sidelink can also apply here. The gNB can send the power reduction indicator to Tx UE only, or the gNB can send the power reduction indicator to both Tx UE and Rx UE. For the scheduling of the retransmission, the solutions presented for dynamically scheduled broadcast as shown in FIG. 7 and FIG. 8 can also apply here.

For the Tx UE, after detecting the power reduction indicator, UE1 can overwrite the old TPC and transmit the scheduled unicast sidelink with the new transmit power. Then, it will monitor the feedback sent by the UE2 though the PSFCH, e.g., ACK/NACK.

The Tx UE behavior, retransmission allocation methods disclosed in Uu transmission pre-emption with higher power alternative can also apply here.

Figure 13:
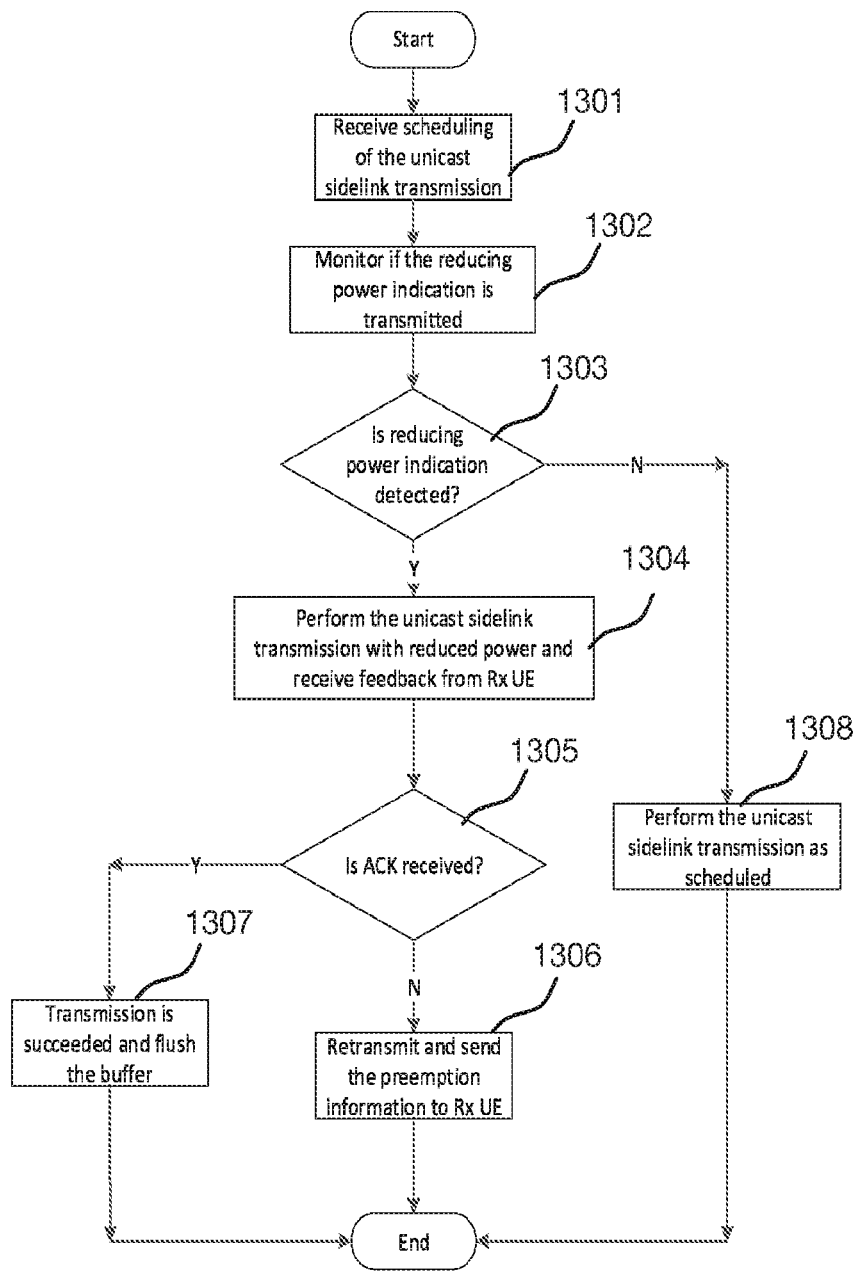
FIG. 13 shows a method for a transmitting UE detecting a power reduction indicator for a unicast sidelink UE that has inter-UE collision with a scheduled Uu transmission in accordance with an exemplary embodiment.

An example of the disclosed procedure for Tx UE detecting the power reduction indicator is shown in FIG. 13 for a sidelink UE that has inter-UE collision with a scheduled Uu transmission. The UE receives scheduling of a unicast sidelink transmission (1301). The UE monitors whether a reducing power indication was transmitted (1302). The UE determines if the reducing power indication was detected (1303). If yes, the UE performs the unicast sidelink transmission with reduced power and receives feedback from a Rx UE (1304). The UE determines if it received an ACK (1305). If yes, it transmits and flushes its buffer (1307). If not, the UE retransmits and sends the preemption information to the Rx UE (1306). If the Tx UE did not detect receiving the reducing power indication, then it preforms the unicast sidelink transmission as scheduled (1308).

For the Rx UE, UE2 can try to decode the transmitted data and send feedback to UE1. When UE2 can't decode the data, it can send NACK to UE1.

The Rx UE behavior disclosed in Uu transmission preemption with higher power alternative can also apply here.

Figure 14:
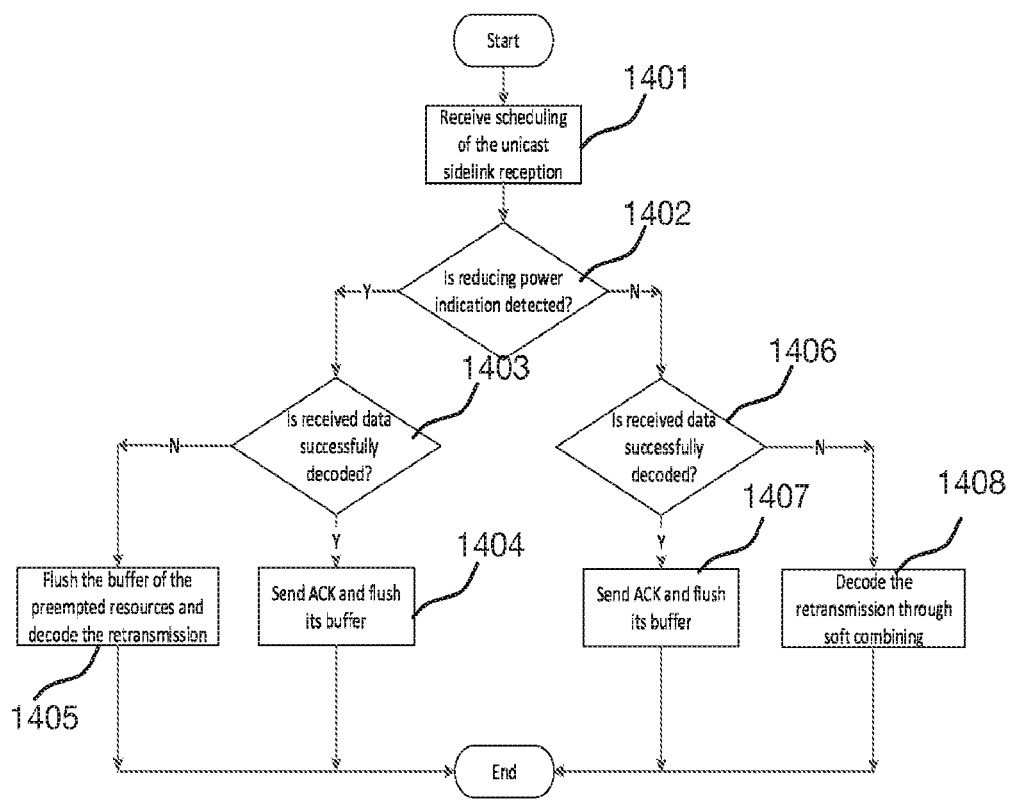
FIG. 14 shows a procedure for a receiving UE detecting the power reduction indicator for a unicast sidelink UE that has inter-UE collision with a scheduled Uu transmission in accordance with an exemplary embodiment.

An example of the disclosed procedure for Rx UE detecting the power reduction indicator is shown in FIG. 14 for a sidelink UE that has inter-UE collision with a scheduled Uu transmission. A Rx UE receives scheduling of a unicast sidelink transmission (1401). The UE determines if it detected a reducing power indication (1402). If yes, it determines if received data was successfully decoded (1403). If yes, it sends an ACK and flushes its buffer (1404). If not, it flushes the buffer of the preempted resources and decodes the retransmission (1405). If the UE did not detect the reducing power indication, then the UE determines if received data was successfully decoded (1406). If yes, it sends and Ack and flushes its buffer (1407). If not, the UE decodes the retransmission through soft combining (1408).

Low Priority SL Transmission Preempted with Canceling Indicator

In a third alternative, UE1 can monitor to detect if it is preempted before performing the unicast sidelink transmission. If preemption occurs, a canceling indication can be sent by the gNB indicating UE1 to cancel the scheduled transmission.

The solutions of how to send the canceling indication disclosed for dynamically scheduled broadcast sidelink can also apply here. The gNB can send the canceling indication to Tx UE only, or the gNB can send the canceling indication to both Tx UE and Rx UE. For the scheduling of the retransmission, the solutions presented for dynamically scheduled broadcast as shown in FIG. 7 and FIG. 8 can also apply here.

For the Tx UE, by detecting the canceling indication, UE1 will not perform the whole or part of the scheduling transmission as it is indicated and will do retransmission later.

In one case, UE1 can do retransmission and send the information of the preemption to UE2 to indicate UE2 to flush the buffer correspondingly. The solution disclosed in Uu transmission pre-emption with higher power alternative can also apply here.

In another case, where the gNB can send the canceling indication to both the Tx UE and Rx UE. UE1 can do retransmission without sending the information of the preemption.

In yet another case, if UE1 detects the canceling indication before sending the SCI, e.g., the 1st stage, for the scheduled sidelink transmission, UE1 cannot send the SCI, e.g., both the 1st stage SCI and the 2nd stage SCI, to UE2. Or, if the SCI, e.g., the 1st stage SCI, is already transmitted when canceling indication is detected, UE1 can send another indication to UE2 for ignoring the sidelink transmission indicated by the previous SCI. The indication can be a reference signal, or a preamble, or a sequence, or an SCI, e.g., using the preemption indication field in the 2nd stage SCI.

The example provided for the above case can be applied when there is a time gap between the transmission of the 1st stage SCI and the 2nd stage SCI. In another example, the 1st stage SCI and the 2nd stage SCI can be transmitted without any time gap between them, e.g., the 1st stage SCI and the 2nd stage SCI can be FDM-ed and transmit together with the data; or the 1st stage SCI and the 2nd stage SCI can be transmitted in contiguous symbols, etc. In this case, a Tx UE e.g., UE1, cannot be able to detect the canceling indication for the initial transmission and cancel it. However, the Tx UE can monitor and detect the canceling indication for the reserved retransmissions, e.g., repetition or HARQ based retransmission; or the canceling indication for the reserved periodic transmission. UE1 can send another indication to UE2 for ignoring the sidelink transmission, e.g., reserved retransmission or reserved periodic transmission, indicated by the previous SCI. Such indication, e.g., preemption indication field, can be carried by the 1st stage SCI or can be carried by the 2nd stage SCI.

For example, the preemption indication field in the 2nd stage SCI can be a one-bit field, where '1' indicating the scheduled sidelink transmission is preempted; and '0' indicating the scheduled sidelink transmission is not preempted, and vice versa.

When the Tx UE detects that of the scheduled sidelink transmission on PSSCH is preempted by other transmission, in one example, the Tx UE can drop the transmission of the PSSCH. The Tx UE can only transmit the 2nd stage SCI (or the symbols carrying the 2nd stage SCI) and set the preemption indication field to be '1'. When the Rx UE decodes the received 2nd stage SCI and determines the preemption indication field is set to be '1', the Rx UE can figure out the associated PSSCH transmission is preempted and not soft combine it with other transmissions of the same TB.

In another example, the Tx UE can drop both the transmission of the 2nd stage SCI and the transmission of the associated PSSCH. When the Rx UE fails to decode the 2nd stage SCI which is supposed to be transmitted in the resources indicated by the 1st stage SCI, the Rx UE will not be able to decode the associated PSSCH and will not soft combine it with other transmissions of the same TB.

In yet another example, the Tx UE can drop both the transmission of the 2nd stage SCI and the transmission of the associated PSSCH, and transmit an indication using the resource supposed to transmit the 2nd stage SCI which is indicated by the 1st stage SCI. The indication can be a pre-configured reference signal, or a pre-configured preamble, or a pre-configured sequence. For example, the Rx UE can be configured with the value of the initializer, e.g., $c_{init,CI}$. When the Rx UE detects the pre-configured reference signal/sequence is transmitted on the resource supposed to transmit the 2nd stage SCI, the Rx UE can determine the associated PSSCH is failed and not soft combine it with other transmissions of the same TB.

When the Tx UE detects the transmission of the 2nd stage SCI is preempted by other transmission, the Tx UE can drop both the transmission of the 2nd stage SCI and the transmission of the associated PSSCH.

The solution disclosed here for unicast sidelink transmission can be also applied to the case of broadcast sidelink transmission and groupcast sidelink transmission.

When UE1 does perform retransmission, it can retransmit the whole TB or it can only retransmit a subset of the TB, e.g., preempted symbols, PRBs and/or CBGs.

Figure 15:
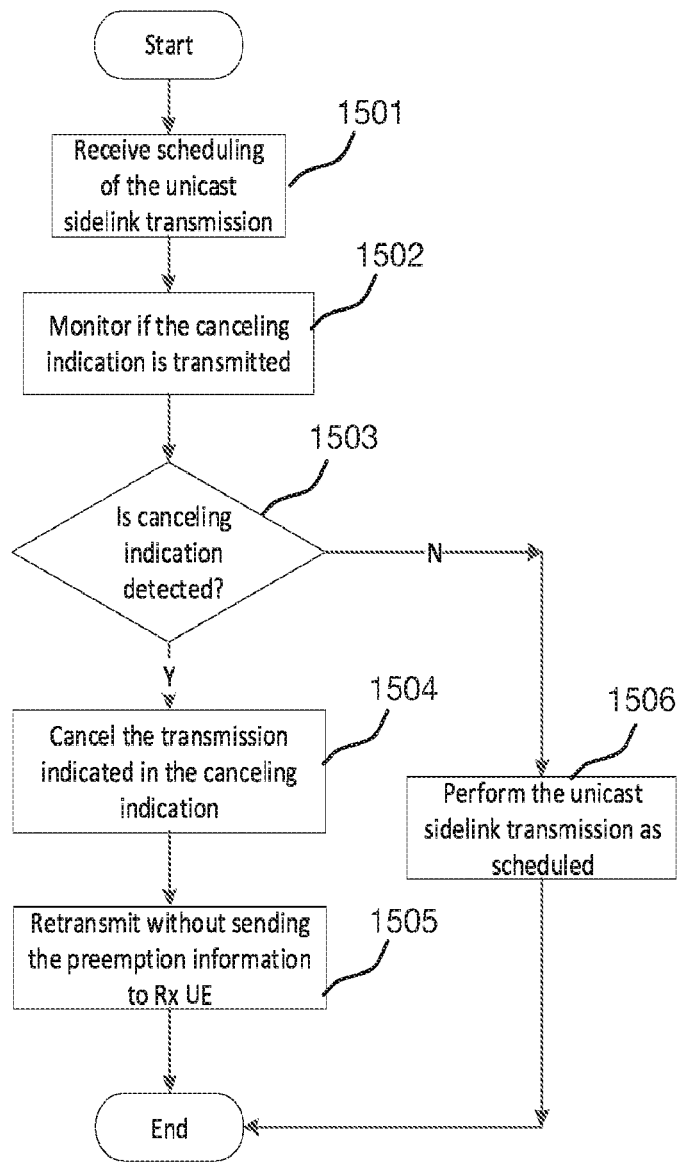
FIG. 15 shows a method for a transmitting UE detecting a canceling indication for a unicast sidelink UE that has inter-UE collision with a scheduled Uu transmission in accordance with an exemplary embodiment.

An example of the disclosed procedure for Tx UE detecting the canceling indication is shown in FIG. 15 for a sidelink UE that has inter-UE collision with a scheduled Uu transmission. A Tx UE receives scheduling of a unicast sidelink transmission (1501). The UE monitors for a canceling indication (1502). The UE determines whether it detected the canceling indication (1503). If not, the UE performs unicast sidelink transmission as scheduled (1506). If yes, the UE cancels transmission that was indicated in the cancelling indication (1504). The UE retransmits without sending preemption information to the Rx UE (1505).

For the Rx UE, in one case, UE2 can receive the canceling indication from the gNB. Depending on the time receiving the canceling indication, UE2 can ignore the scheduled sidelink transmission or can flush the buffer of the canceled resources when decoding the retransmission.

In another case, UE2 can receive the retransmission and receive preemption indication from UE1. UE2 can flush its buffer and decode the retransmission.

In yet another case, UE2 can receive an indication from the UE1 to ignore the scheduled sidelink transmission because it has been canceled by the gNB. UE2 can ignore the previously received SCI and not try to decode the data. Or the indication from the UE1 can indicated some of the resources in the scheduled sidelink transmission are preempted. UE2 can flush its buffer and decode the retransmission.

Figure 16:
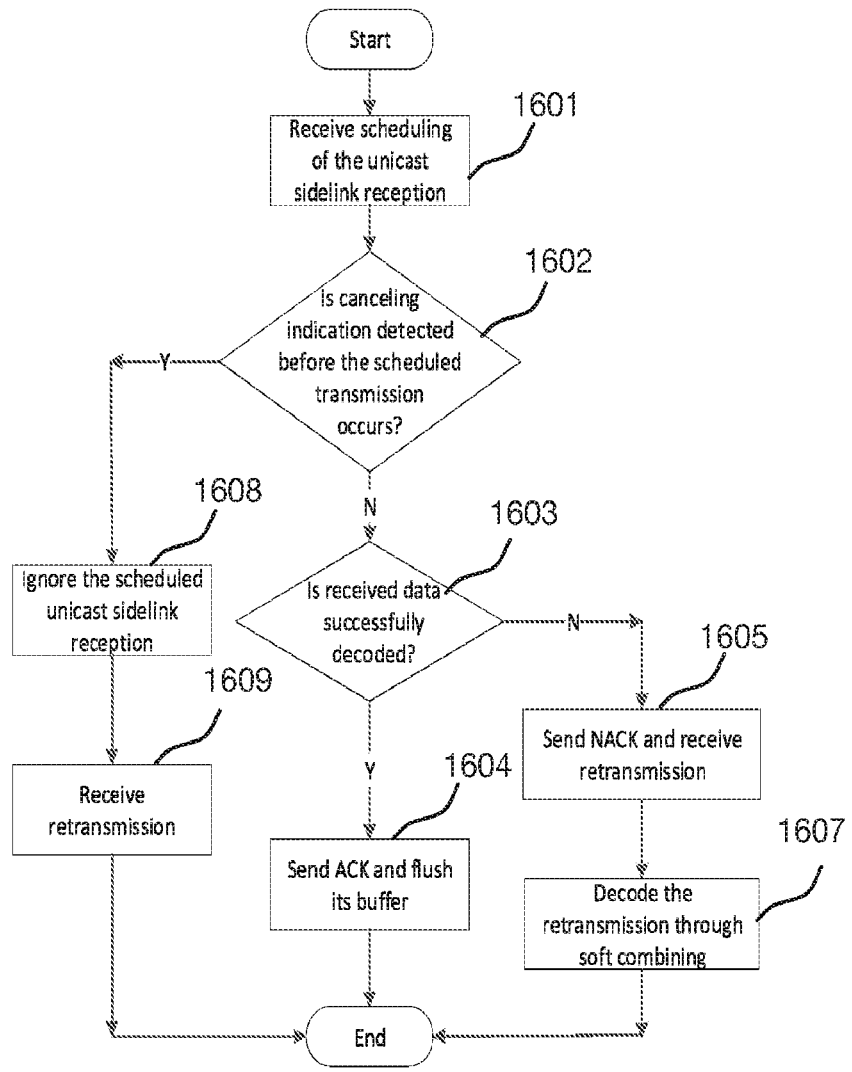
FIG. 16 shows a procedure for a receiving UE detecting a canceling indication for a unicast sidelink UE that has an inter-UE collision with a scheduled Uu transmission in accordance with an exemplary embodiment.

An example of the disclosed procedure for Rx UE detecting the canceling indication is shown in FIG. 16 for a sidelink UE that has inter-UE collision with a scheduled Uu transmission. The Rx UE receives scheduling of a unicast sidelink transmission (1601). The UE determines if canceling indication was detected before a scheduled transmission occurred (1602). If not, the Rx UE determines if received data was successfully decoded (1603). If yes, the UE sends an ACK and flushes its buffer (1604). If not, the UE sends a NACK and receives retransmission (1605). The UE then decodes the retransmission through soft combining (1607). If the canceling indication was detected before scheduled transmission occurred (1602) then the Rx UE ignores the scheduled unicast sidelink reception (1608) and receives retransmission (1609).

Dynamically Scheduled Groupcast Sidelink Transmission Preempted by Dynamically Scheduled Uu Transmission In this section, a solution is disclosed for the case that dynamically scheduled Uu transmission collides with the dynamically scheduled groupcast sidelink transmission. In groupcast scenario, a Tx UE need to transmit data to multiple Rx UEs and receive ACK/NACK from all or some of the Rx UEs. Since the channels between the Tx and Rx UE can be different for the Rx UEs within the group, for one groupcast transmission, some Rx UEs can decode it successfully, whereas some other Rx UEs can fail to decode it. The Uu transmission herein can be a downlink transmission or can be an uplink transmission.

Assume UE1 is dynamically scheduled by the gNB to transmit a groupcast transmission on the sidelink as the Tx UE; UE2,1, UE2,2, . . . , UE2,k are the Rx UEs that will receive the groupcast sidelink from UE1; and assume UE3 is dynamically scheduled by the gNB with a transmission or reception (e.g. PDSCH or PUSCH) on the Uu interface, where some or all of the resources allocated to UE3 are overlapped in time with the resources allocated to UE1. To handle the inter-UE collision, the groupcast sidelink transmission can be preempted with the following alternatives Uu Transmission Preemption with Higher Power In a first alternative, UE1 will perform the groupcast sidelink transmission regardless it received a preemption or not.

To maintain performance of the transmission/reception of data to/from the higher priority data to/from UE3, the Uu transmission can be performed with a higher power level comparing to the power level used for no inter-UE collision scenario with the similar solutions presented in the dynamically scheduled broadcast sidelink case.

For the Tx UE, after UE1 performs the groupcast sidelink transmission, it will monitor the feedback sent by the Rx UEs though the PSFCH, e.g., ACK/NACK. UE1 can also monitor an indication sent by the gNB to determine if its transmission is preempted where the configuration of the monitoring occasion can be configured by RRC.

When UE1 sends the groupcast message, one beam can be used to groupcast the message to all the Rx UEs.

The Tx UE behaviors disclosed in Uu transmission preemption with higher power alternative can also apply here with the feedback sent by the scheduled Rx UEs.

When UE1 sends the groupcast message, multiple beams can be used to groupcast the message to the Rx UEs in different directions where the different beams are time, frequency and/or spatially multiplexed. UE1 can monitor and detect if it is preempted for each beam separately through explicit signaling or implicit signaling. For example, a bit map can be used to indicate which beams are preempted. Or, if the beams are TDM-ed and/or FDM-ed, the UE can determine the preemption based on the preempted time and frequency resources. The procedure and behaviors disclosed for groupcast using one beam can also apply here.

When UE1 performs retransmission, it can retransmit the whole TB or it can only retransmit a subset of the TB, e.g., preempted symbols, PRBs or CBGs. When multiple beams are used in groupcasting, UE1 can retransmit the groupcast message on all the beams or it can retransmit the groupcast message on the beams that got preempted.

When inter-UE collision happens, gNB can allocate the resources for retransmission to UE1 without receiving the feedback from UE1. Or, gNB can allocate the resources for retransmission based on the feedback from UE1. Same solutions presented in the alternative of detecting preempting after the initial transmission for unicast can also apply here.

Figure 17:
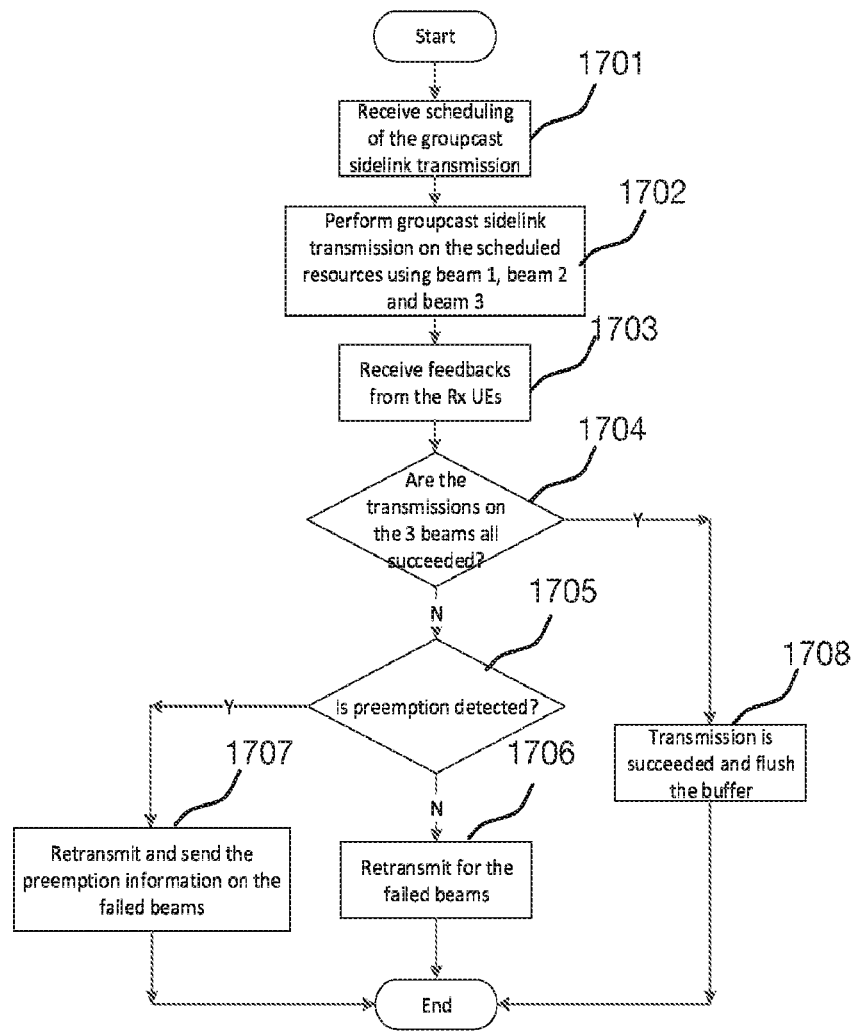
FIG. 17 shows a procedure for a transmitting UE detecting a preemption for a groupcast sidelink UE that has inter-UE collision with a scheduled Uu transmission in accordance with an exemplary embodiment.

An example of the disclosed procedure for Tx UE detecting the preemption indication is shown in FIG. 17 for a sidelink UE that has inter-UE collision with a scheduled Uu transmission. The Tx UE receives scheduling of a groupcast sidelink transmission (1701). The Tx UE performs groupcast sidelink transmission on the scheduled resources using beam 1, beam 2, and beam 3 (1702). The Tx UE receives feedback from Rx UEs (1703). The Tx UE determines if the transmissions made on the three beams succeeded (1704). If yes, the Tx UE has its transmission succeeded and flushes its buffer (1708). If not the Tx UE determines if it detected preemption (1705). If not, the Tx UE retransmits its transmission for the failed beams (1706). If yes, the Tx UE retransmits and sends the preemption information on the failed beams (1707).

For Rx UEs that successfully decodes the groupcast massage, the Rx UEs can ignore the subsequent scheduling of the retransmission for the failed UEs.

For the Rx UEs that failed to decode the message, the disclosed Rx UE behavior for Uu transmission pre-emption with higher power in unicast scenario can also apply here.

Figure 18:
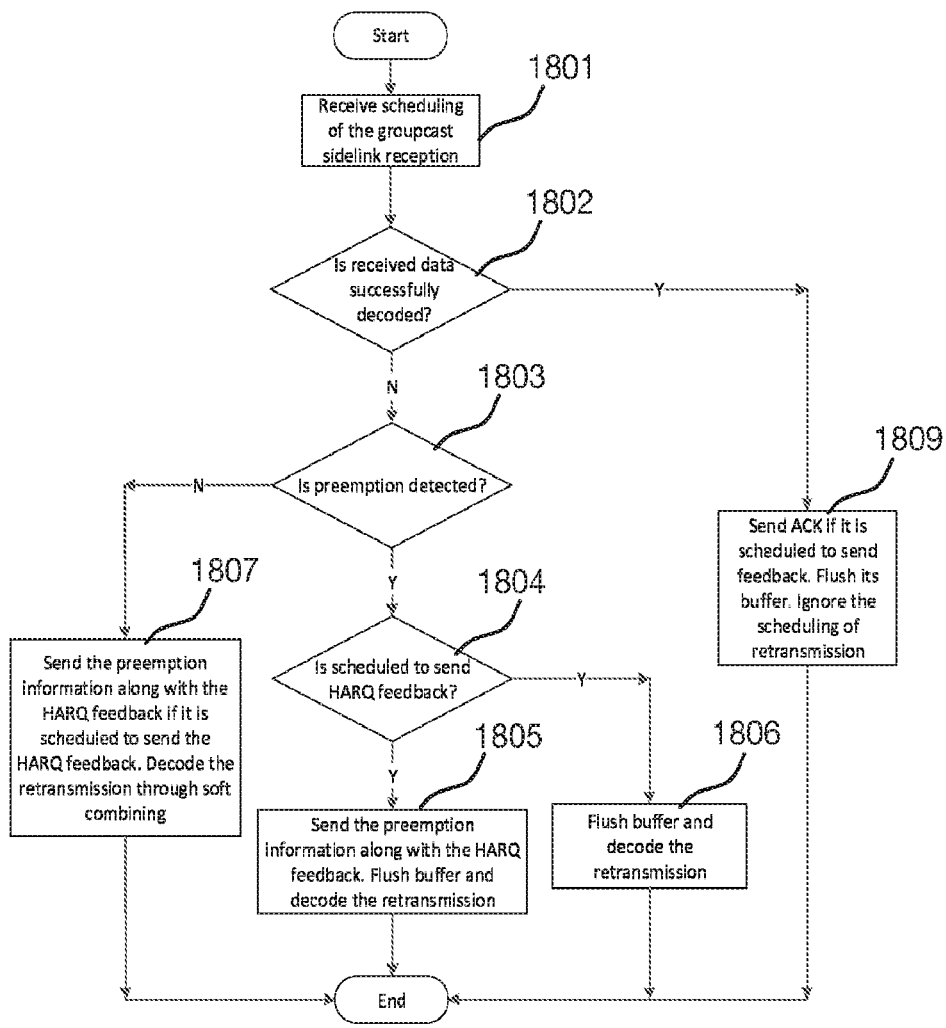
FIG. 18 shows a procedure for a receiving UE detecting preemption for a groupcast sidelink UE that has inter-UE collision with a schedule Uu transmission in accordance with an exemplary embodiment.

An example of the disclosed procedure for Rx UE detecting the preemption is shown in FIG. 18 for a sidelink UE that has inter-UE collision with a scheduled Uu transmission. The Rx UE receives scheduling of a groupcast sidelink reception (1801). The Rx UE determines if its received data was successfully decoded (1802). If yes, the UE sends an ACK if it is scheduled to send feedback, and flushes its buffer, and ignores the scheduling of retransmission (1809). If not, the UE determines if it detected preemption (1803). If not, it sends the preemption information along with HARQ feedback if it is scheduled to send the AHRQ feedback, and decodes the retransmission through soft combining (1807). If the UE did detect preemption (1803) the UE determines if it is scheduled to send HARQ feedback (1804). If yes, the Rx UE sends the preemption information along with the HARQ feedback, flushes its buffer, and decodes the retransmission (1805). If the Rx UE determined it is not scheduled to send HARQ feedback (1804) then the Rx UE flushes its buffer and decodes the retransmission (1806).

For the scheduling of the retransmission, the solutions presented for dynamically scheduled broadcast as shown in FIG. 3, FIG. 4, and FIG. 5 can also apply here.

Low Priority SL Transmission Preempted with Adjusted Transmission Control Parameters In a second alternative, an indication can be sent by gNB indicating UE1 to adjust the transmission control parameters before UE1 performs the scheduled initial groupcast transmission. The solutions of how to send the power reduction indicator that disclosed for dynamically scheduled broadcast sidelink can also apply here. The gNB can send the power reduction indicator to Tx UE only, or the gNB can send the power reduction indicator to both Tx UE and Rx UEs. For the scheduling of the retransmission, the solutions presented for dynamically scheduled broadcast as shown in FIG. 7 and FIG. 8 can also apply here.

The Tx UE behavior disclosed in Uu transmission preemption with higher power alternative in groupcast scenario can also apply here.

When multiple beams are used to groupcast the message to the Rx UEs in different directions. UE1 can monitor and detect if it is preempted for each beam separately. Assume 3 beams are used in the groupcast. For example, if beam 1 is preempted while beam 2 and beam 3 are not, UE1 can only reduce the transmission power on beam 1. The procedure and behaviors disclosed for groupcast using one beam can also apply here.

Figure 19:
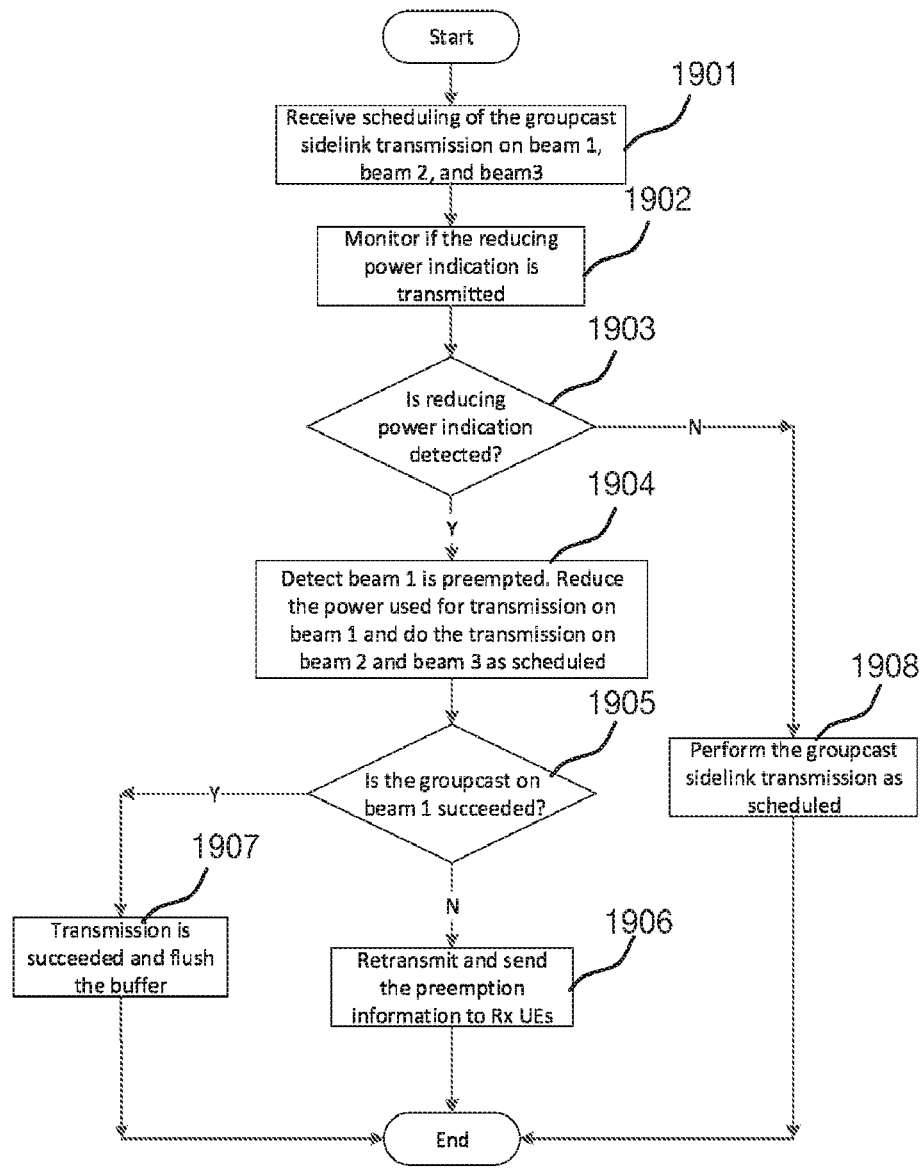
FIG. 19 shows a procedure for a transmitting UE detecting a power reduction indicator for a groupcast sidelink UE that has inter-UE collision with a scheduled Uu transmission in accordance with an exemplary embodiment.

An example of the disclosed procedure for Tx UE detecting the power reduction indicator is shown in FIG. 19 for a sidelink UE that has inter-UE collision with a scheduled Uu transmission. The Tx UE receives scheduling of a groupcast sidelink transmission on beam 1 beam 2, and beam 3 (1901). The UE monitors if the reducing power transmission is transmitted (1902). The UE determines whether it detected the reducing power indication (1903). If not, the UE performs the group cast sidelink transmission as scheduled (1908). If yes, and the UE detects beam 1 is preempted, the UE reduces power used for transmission on beam 1 and does the transmission on beam 2 and beam 3 as scheduled (1904). The Tx UE determines if the groupcast on beam 1 succeeded (1905). If yes, the UE sends transmission and flushes its buffer (1907). If not, the UE retransmits and sends the preemption information to the Rx UEs (1906).

The Rx UE behaviors disclosed in Uu transmission preemption with higher power alternative can also apply here.

Figure 20:
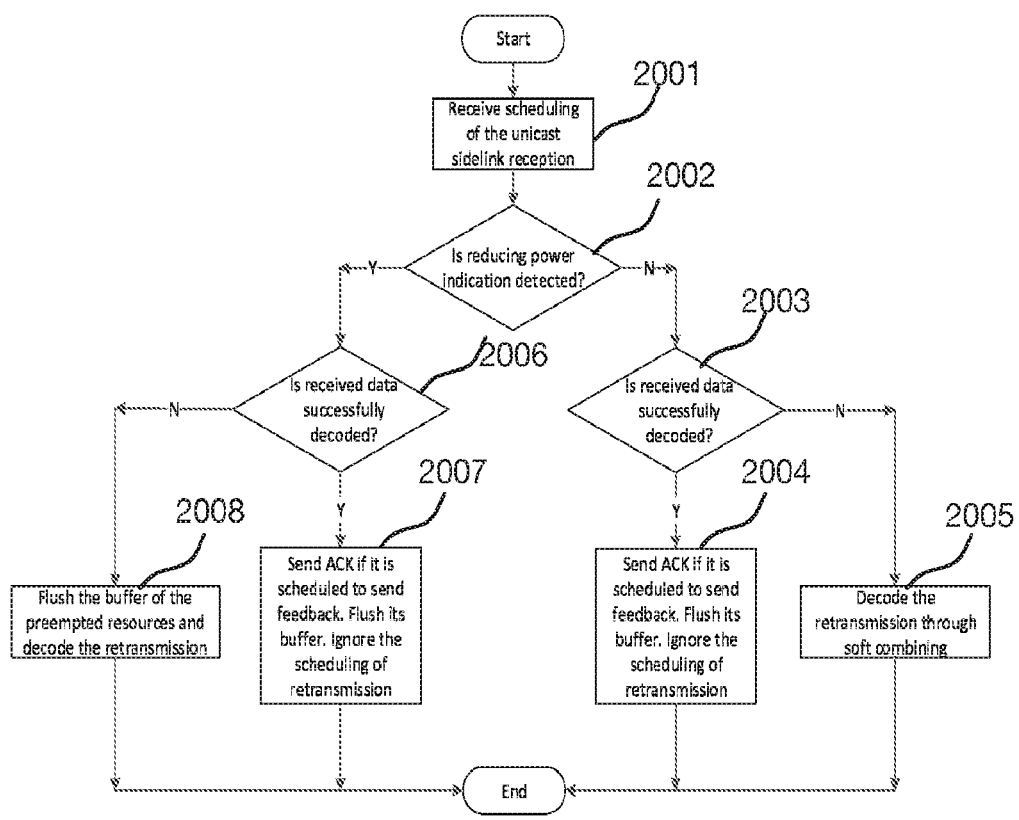
FIG. 20 shows a procedure for a receiving UE detecting a power reduction indicator for a groupcast sidelink UE that has inter-UE collision with a scheduled Uu transmission in accordance with an exemplary embodiment.

An example of the disclosed procedure for Rx UE detecting the power reduction indicator is shown in FIG. 20 for a sidelink UE that has inter-UE collision with a scheduled Uu transmission. The Rx UE receives scheduling of a unicast sidelink transmission reception (2001). The UE determines if it detected a reduced power indication (2002). If no, the UE determines if its received data was successfully decoded (2003). If not, the UE decodes retransmission through soft combining (2005). If yes, the UE sends an ACK if it is scheduled to send an ACK, flushes its buffer, and ignores the scheduling of retransmission (2004). If the Rx UE determined (2002) reducing power indication was not detected, then the Rx UE determines if received data was successfully decoded (2006). If yes, the Rx UE sends an ACK if it is scheduled to send an ACK, flushes its buffer, and ignores the scheduling of retransmission (2007). If not, the Rx UE flushes its buffer of the preempted resources and decodes the retransmission (2008).

Low Priority SL Transmission Preempted with Adjusted Transmission Control Parameters Canceling Indicator In a third alternative, UE1 can monitor to detect if it is preempted before performing the groupcast sidelink transmission. If preemption occurs, a canceling indication can be sent by the gNB indicating UE1 to cancel the scheduled transmission and in some cases indicating preemption also to the SL-receiving UEs.

The solutions of how to send the canceling indication that disclosed for dynamically scheduled broadcast sidelink can also apply here. The gNB can send the canceling indication to Tx UE only, or the gNB can send the canceling indication to both Tx UE and Rx UE. For the scheduling of the retransmission, the solutions presented for dynamically scheduled broadcast as shown in FIG. 7 and FIG. 8 can also apply here.

For the Tx UE, by detecting the canceling indication, UE1 will not perform the whole or part of the scheduling transmission as it is indicated and will do retransmission later.

When UE1 sends the groupcast message, one beam can be used to groupcast the message to all the Rx UEs.

The Tx UE behavior disclosed in Uu transmission preemption with higher power alternative in groupcast scenario can also apply here.

Beyond the disclosed Tx UE behaviors, if UE1 detects the canceling indication before sending the SCI for the scheduled sidelink transmission, UE1 cannot send the SCI to Rx UEs. Or, if the SCI is already transmitted when canceling indication is detected, UE1 can send another indication to receiver UEs for ignoring the sidelink transmission indicated by the previous SCI.

When UE1 sends the groupcast message, multiple beams can be used to groupcast the message to the Rx UEs in different directions. UE1 can monitor and detect if it is preempted for each beam separately. Assume 3 beams are used in the groupcast. For example, if beam 1 is preempted while beam 2 and beam 3 are not, UE1 can only cancel the transmission on beam 1. The procedure and behaviors disclosed for groupcast using one beam can also apply here.

Figure 21:
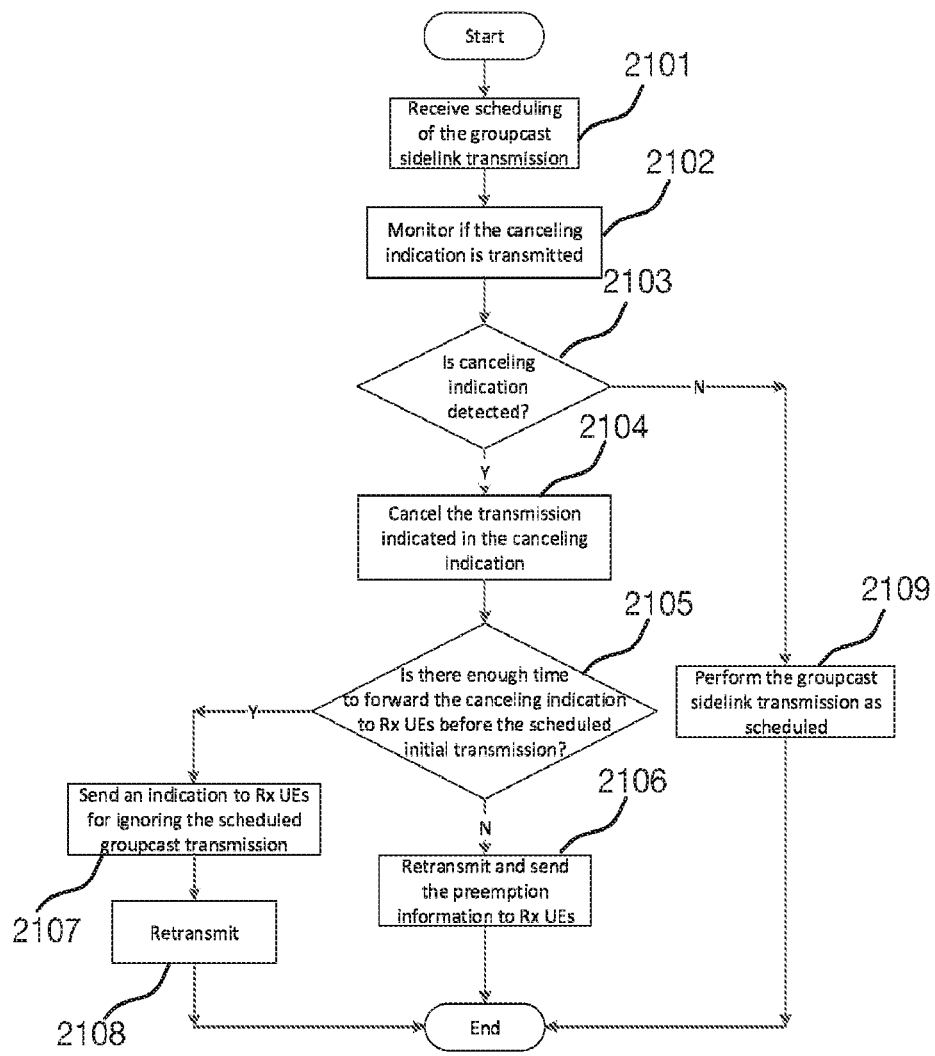
FIG. 21 shows a procedure for a transmitting UE detecting a canceling indication for a groupcast sidelink UE that has inter-UE collision with a scheduled Uu transmission in accordance with an exemplary embodiment.

An example of the disclosed procedure for Tx UE detecting the canceling indication is shown in FIG. 21 for a sidelink UE that has inter-UE collision with a scheduled Uu transmission. The Tx UE receives scheduling of a groupcast sidelink transmission (2101). The UE monitors if a canceling indication was transmitted (2102). The UE determines if it detected the canceling indication (2103). If not, the UE performs the groupcast sidelink transmission as scheduled (2109). If yes, the UE cancels the transmission indicated in the canceling indication (2104). The UE determines if there is enough time to forward the canceling indication to the Rx UE before the scheduled initial transmission (2105). If not, the Tx UE retransmits and sends the preemption information to the Rx UE (2106). If yes, the Tx UE sends the indication to the Rx UEs for ignoring the scheduled groupcast transmission (2107) and it retransmits (2108).

For Rx UEs, in one case, the Rx UEs can receive the canceling indication from the gNB and can ignore the scheduled sidelink transmission or can flush the buffer of the canceled resources when decoding the retransmission.

In another case, the Rx UEs can receive the retransmission and receive preemption indication from the UE1. The Rx UEs can flush the buffer and decode the retransmission.

In yet another case, the Rx UEs can receive an indication from the UE1 to ignore the scheduled sidelink transmission due to it is canceled by the gNB. the Rx UEs can ignore the previously received the SCI and not try to decode the data. Or the indication from the UE1 can indicate some of the resources in the scheduled sidelink transmission are preempted. The Rx UEs can flush the buffer and decode the retransmission.

Figure 22:
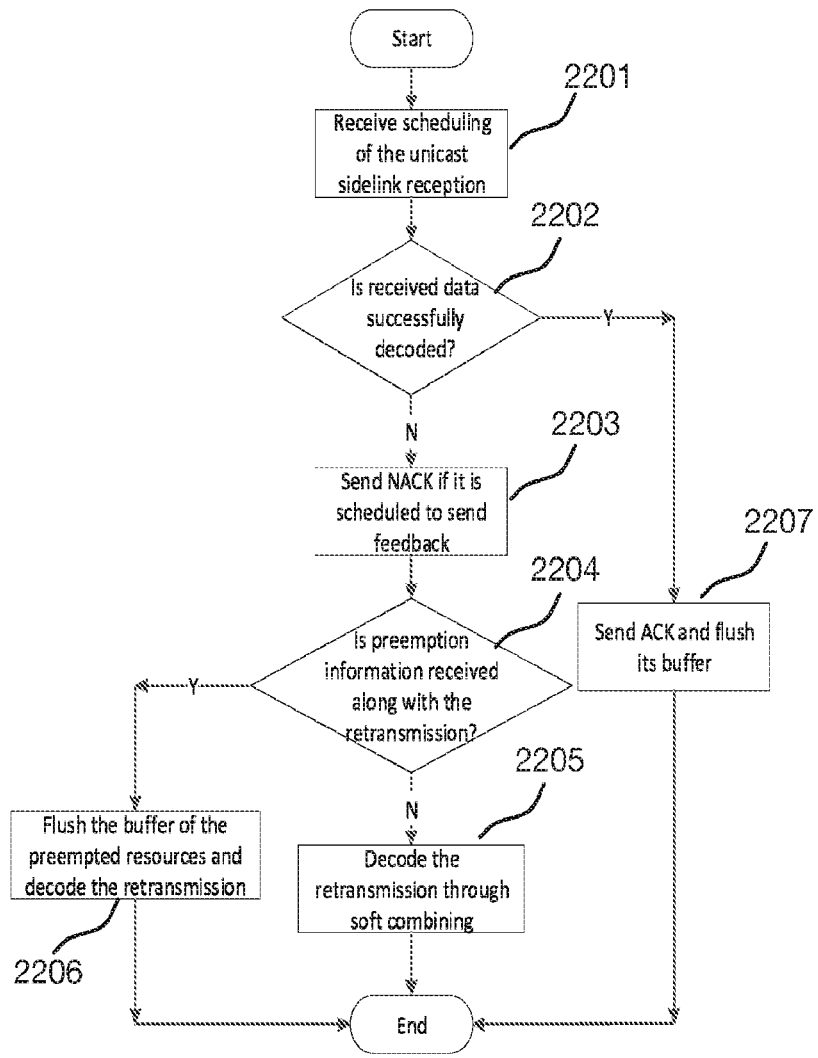
FIG. 22 shows a procedure for a receiving UE detecting a canceling indication for a groupcast sidelink UE that has inter-UE collision with a scheduled Uu transmission in accordance with an exemplary embodiment.

An example of the disclosed procedure for Rx UE detecting the canceling indication is shown in FIG. 22 for a sidelink UE that has inter-UE collision with a scheduled Uu transmission. The Rx UE receives scheduling of a unicast sidelink reception (2201). The UE determines if its received data was successfully decoded (2202). If yes, the UE sends an ACK and flushes its buffer (2207). If not, the UE sends a NACK if it is scheduled to send feedback (2203). The UE determines if it received preemption information along with the retransmission (2204). If not, the UE decodes the retransmission through soft combining (2205). If yes, the Rx UE flushes its buffer of the preempted resources and decodes the retransmission (2206).

Configured Grant-Based Sidelink Transmission Preempted by Uu Transmission

In this section, solutions are disclosed for the case that configured grant based sidelink transmission is preempted by the dynamically scheduled Uu transmission. The Uu transmission herein can be a downlink transmission or can be an uplink transmission.

When a UE is allocated with resources through configured grant for sidelink transmission. The allocated resources can be dedicated to this UE. For example, the time and frequency resources are only configured to one UE as the configured grant. Meanwhile, gNB will not schedule any other SL transmission or Uu transmission on these resources. Or the allocated resources can be shared with other UEs. For example, gNB can schedule another high priority Uu transmission or SL transmission on these resources as needed. The same time and frequency resources can be allocated to multiple UE as configured grants as well. If the allocated resources are dedicated to a UE, the UE need not worry about the inter-UE collision. However, when the allocated resources are shared with other UEs, a UE can experience inter-UE collision when the UE performs sidelink transmission using the configured grant resources.

For example, in configured grant type 1, an RRC parameter can be carried by the RRC configuration of configured grant to indicate the UE if the configured grant is shared with other UEs or it is dedicated to itself. E.g., RRC parameter ConfiguredGrantShared with possible value 'Yes' and 'No' can be used; or RRC parameter ConfiguredGrantSharingStatus with possible value 'Shared' and 'Dedicated' can be used.

In configured grant type 2, such indication can be indicated by RRC or by activation DCI. When RRC is used, the solutions presented for configured grant type 1 also apply to configured grant type 2. Or when activation DCI is used, a new field can be introduced in the activation DCI for this purpose. An example of the sharing status indicator field is shown in Table 3. Or one bit can be used in this field with '0' indicating the activated resources are dedicated to the UE; and '1' indicating the activated resources are shared with other transmissions.

In various embodiments here, the sidelink configured grant type 1 and type 2 can be identical to Uu UL configured grant type 1 and type 2; or can use Uu UL configured grant type 1 and 2 as baseline but with potential enhancements.

TABLE 3

Sharing Status Indicator field in the activation DCI

| Bit field | Sharing Status Indicator |
| --- | --- |
| 00 | The activated resources are dedicated to the UE |
| 01 | The activated resources are shared with other configured grants on sidelink |
| 10 | The activated resources are shared with other configured grants on Uu |
| 11 | The activated resources are shared with other configured grants on Uu and sidelink |

When a UE is configured/indicated with dedicated configured grant, the UE can directly transmit on the configured CG resources when the UE has data to transmit. On the other hand, when a UE is configured/indicated with shared configured grant, the UE can apply the inter-UE collision handling solutions presented as follow when the UE has data to transmit on the configured grant resources.

In one alternative, gNB can send an indication, e.g., cancelation indicator, to indicate there can be potential inter-UE collision whenever it makes a scheduling where some of the resources are overlapped with the resources of a configured grant occasion e.g., configured grant occasion k. The indication can be a preempting indication, or a power reduction indicator, or a canceling indication as disclosed in the previous sections. Meanwhile, the UE configured with the configured grant can have data to transmit at the configured grant occasion k; or the UE cannot have data to transmit.

If any UE determines to transmit data on the configured grant occasion k, the UE can monitor and detect the indication sent by the gNB, e.g., before performing the sidelink transmission. Then the UE can determine it is preempted and use the procedures disclosed for inter-UE collision handling between dynamically scheduled Uu transmission and dynamically scheduled sidelink transmission to handle this problem for broadcast, groupcast and unicast. In general, the solutions presented for dynamically scheduled broadcast, groupcast and unicast can also apply here.

In one example, when the Tx UE is configured to transmit multiple repetitions of the same TB using the configured grant resources on the sidelink, and the Tx UE detects one or some of the repetitions are preempted by other transmission, e.g., by detecting and decoding the cancelation indicator, the Tx UE cannot transmit the preempted repetition(s) e.g., the repetition that overlaps with the canceled resources, while still transmitting the un-preempted repetition(s). Then the Tx UE can monitor the feedback from the Rx UE, e.g., ACK/NACK feedback, to determine if the transmission is successful. If the transmission is failed, the Tx UE can send an indication to gNB to request for a scheduling for retransmission e.g., the indication can be a NACK feedback.

Figure 23:
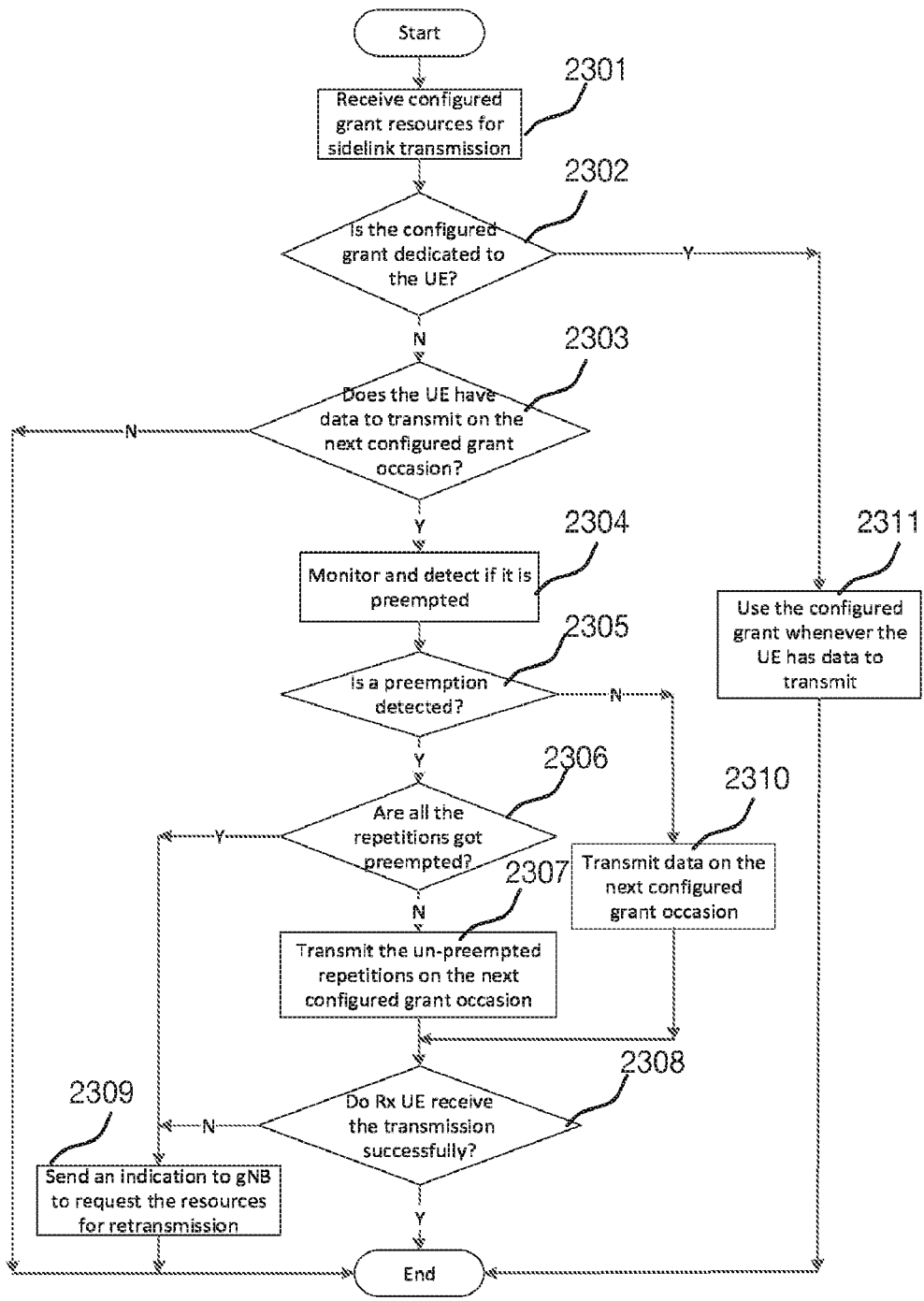
FIG. 23 shows a procedure for canceling indicator for a UE with configured grant sidelink that has inter-UE collision with a scheduled Uu transmission.

When all the repetitions are preempted, the UE can drop the transmission of all the repetitions and send an indication to gNB to request for a scheduling for retransmission. An example of the disclosed procedure is shown in FIG. 23. The UE receives information of configured grant resources for sidelink transmission (2301). The UE determines if the configured grant is dedicated to the UE (2302). If yes, the UE uses the configured grant when the UE has data to transmit (2311). If not, the UE determines if the UE has data to transmit on the next configured grant occasion (2303). If yes, the UE monitors and detects if it is preempted (2304). The UE monitors to detect a preemption (2304). The UE determines if preemption is detected (2305). If not, the UE transits data on the next configured grant occasion (2310). If a preemption was detected (2305), the UE determines if all the repetitions got preempted (2306). If yes, the UE sends an indication to the gNB to request the resources for transmission (2309). If not all the repetitions were preempted (2306), the UE transmits the un-preempted repetitions on the next configured grant occasion (2307). The UE determines if the Rx UE received transmission successfully (2308). If not, the Tx UE sends an indication to the gNB to request the resources for transmission (2309).

In another example, when the Tx UE detects at least one of the repetitions is preempted by other transmission, the Tx UE can drop the transmission of all the repetitions and can send an indication to gNB to request for a scheduling for retransmission.

Or the UE can monitor and detect there is no preemption on the configured grant occasion k. Then the UE can perform the sidelink transmission using the resources in the configured grant occasion k.

The indication, e.g., NACK feedback, sent to the gNB to request for the scheduling for retransmission on the sidelink can be transmitted on the PUCCH or PUSCH.

In order that the Rx UE can soft combine the repetitions of the same TB properly, the Tx UE can send an indication to Rx UE to indicate which repetition is preempted. Such indication can be carried by the PSCCH associated with the PSSCH configured in the configured grant. For example, a 1 bits bitmap can be transmitted using the preemption indication field in the CG-SCI, where 1 equals to number of the repetitions configured for the configured grant. If the ith bit, i=1, 2, . . . , 1, in the bitmap is indicated to be '0', the Rx UE can determine the ith repetition is transmitted and can soft combine it with other repetitions; if the ith bit in the bitmap is indicated to be '1', the Rx UE can determine the ith repetition is preempted and cannot soft combine it with other repetitions, and vice versa.

In yet another example, a Tx UE can be configured with multiple configured grants. When Tx the UE determines to transmit data on one configured grant, e.g., configured grant A, and the Tx UE detects it is preempted by other transmission, it can drop the transmission on configured grant A and perform the transmission on another configured grant, e.g., configured grant B. For example, the configured grant B can be the next available configured grant among all the configured CGs.

Or, when the Tx UE determines to transmit data on one configured grant, e.g., configured grant A, and the Tx UE detects it is preempted by other transmission, it cannot transmit the preempted repetition while still transmitting the un-preempted repetition. If the Tx UE detects the Rx doesn't receive the transmission, it can perform retransmission on another configured grant, e.g., configured grant B. For example, the configured grant B can be the next available configured grant among all the configured CGs. In order that the Rx UE can soft combine the repetitions of the same TB in different configured grants, the Tx UE can indicate the same HARQ process ID with NDI field not toggled for the transmissions in configured grant A and configured grant B. If no UE determines to transmit data on the configured grant occasion k, this indication can become an invalid message and no UE can monitor and detect it.

In this alternative, gNB is not aware of when a UE will transmit on the configured CG occasion, so the gNB also is not aware whether to schedule a retransmission for the preempted sidelink transmission.

In one case (e.g. when an Uu UL transmission preempts the sidelink transmission), gNB can monitor the received power level to determine if there is another transmission in the channel. When another transmission is detected by the gNB, although gNB cannot be able to decode it, gNB can determine there is inter-UE collision. Then gNB can schedule the retransmission for the configured grant UE. This solution can apply to the power based inter-UE collision handling solutions.

Figure 24:
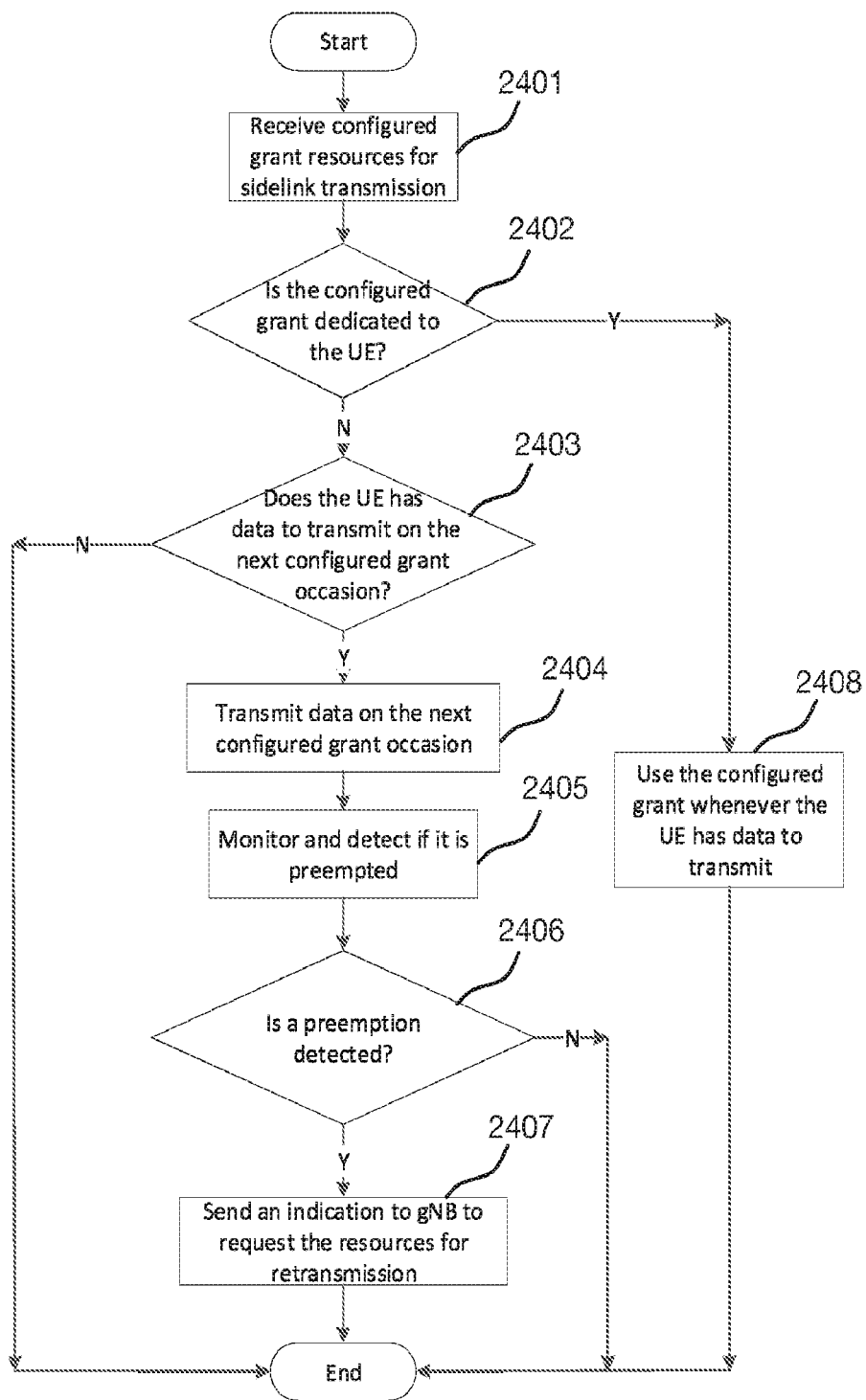
FIG. 24 shows a procedure for detecting the canceling indicator for a UE with configured grant sidelink that has inter-UE collision with a scheduled Uu transmission.

In another case, when a V2X Tx UE has data to transmit on the CG occasion and detects it is preempted, instead of waiting for the next CG occasion to do the retransmission, the UE can send an indication to gNB to request for a scheduling for retransmission, e.g., the indication can be an SR, or a BSR, or a NACK feedback, or a reference signal, or a preamble, or a sequence. An example of the disclosed procedure is shown in FIG. 24. The Tx UE receives configured grant resources for sidelink transmission (2401). The UE determines if the configured grant is dedicated to the UE (2402). If yes, the UE uses the configured grant whenever the UE has data to transmit (2408). If not, the UE determines if the UE ha data to transmit on the next configured grant occasion (2403). If yes, the UE transmits data on the next configured grant occasion (2404). The UE monitors to detect if it is preempted or receives a preemption indication (2405). The UE determines if it detected a preemption (2406). If yes, the UE sends an indication to gNB to request the resources for retransmission (2407).

In another alternative, when a UE determines to transmit data on a configured CG occasion, e.g., CG occasion k, the UE can send an indication to gNB informing the gNB that it has data to transmit. For example, the indication can be an SR, or a BSR, or a reference signal, or a preamble, or a sequence. The indication can be sent on a PUCCH resource that precedes the configured grant resource. The time offset between the PUCCH and the configured grant occasion can be fixed or can be configurable. Or the indication can be sent on a dedicated symbol(s), e.g. the first symbol in the configured grant or can be sent on some REs in the first symbol.

In this alternative, if the gNB desires to schedule an urgent transmission using the same resources, gNB knows there will be inter-UE collision. gNB can send an indication to indicate the inter-UE collision where the indication can be a preempting indication, or a power reduction indicator, or a canceling indication as disclosed in the previous sections.

If the UE determines to transmit data on the configured grant occasion k, the UE can monitor and detect if it is preempted. If the UE detects it is preempted, it can use the procedures disclosed for inter-UE collision handling between dynamically scheduled Uu transmission and dynamically scheduled sidelink transmission to handle this problem for broadcast, groupcast and unicast. In general, the solutions presented for dynamically scheduled broadcast, groupcast and unicast can also apply here. If the UE does not detect that it is preempted, the UE can transmit data on the CG occasion k, without waiting for a new scheduling.

Since the gNB is aware of the inter-UE collision, gNB can schedule the retransmission for the UE configured grant sidelink without receiving the feedback from the Tx UE. Or gNB can schedule the retransmission based on the feedback from Tx UE as it is disclosed in dynamically scheduled groupcast and unicast scenario.

Meanwhile, when a UE with configured grant, e.g., UE1, sends the indication to gNB to inform it has data to transmit, UE1 can also indicate the priority of the data to be transmitted. By doing this, gNB can determine if it will schedule another transmission on the same resources. For example, if UE1 indicates it has urgent data to send on the configured grant, the gNB cannot schedule another transmission on the same resources. Or if UE1 indicates it has regular data to send on the configured grant, the gNB can schedule another more urgent transmission on the same resources and send the indication of inter-UE collision to the UE1

Figure 25:
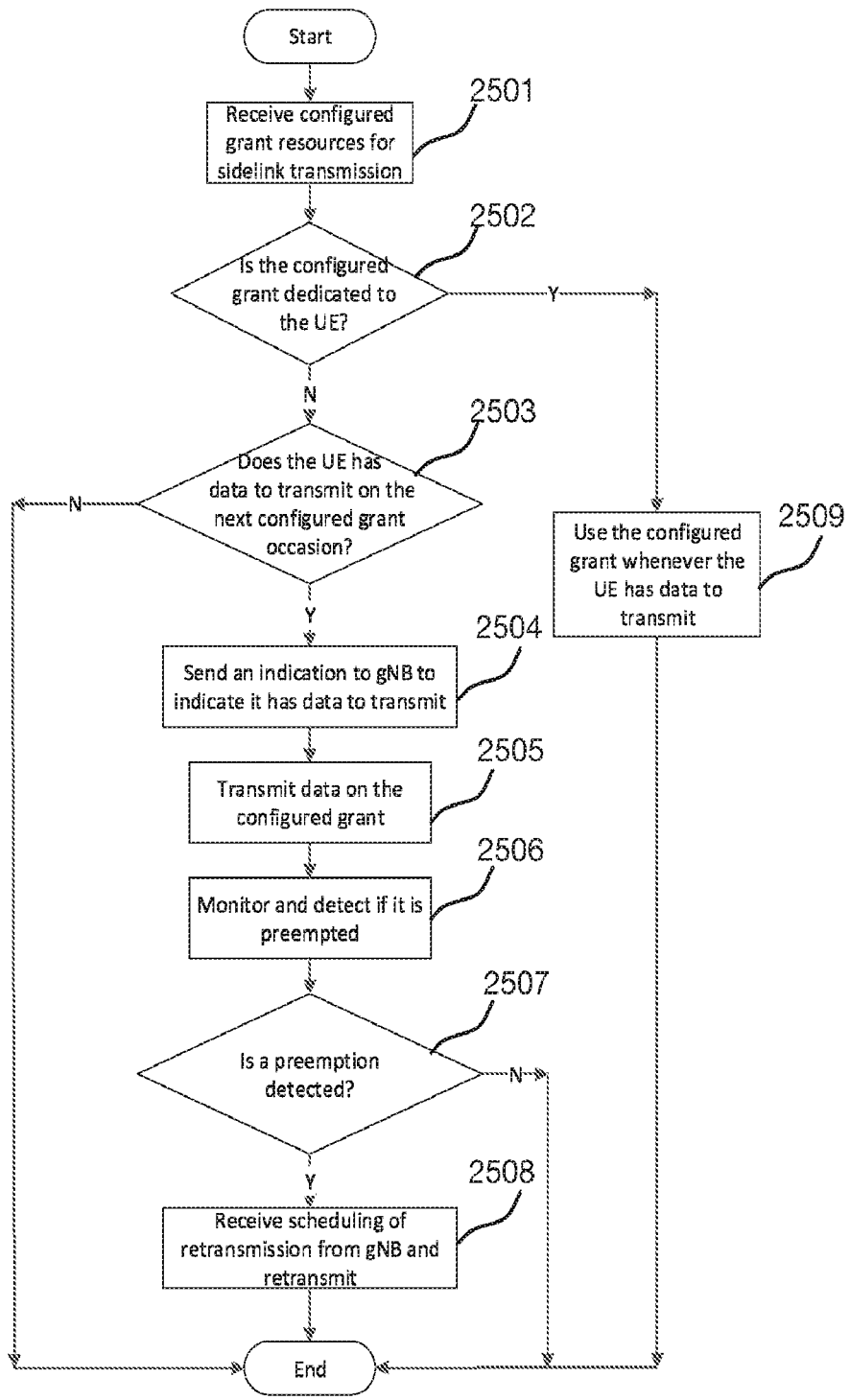
FIG. 25 shows an alternative procedure for detecting the preemption for UE with configured grant sidelink that has inter-UE collision with a scheduled Uu transmission.

An example of the disclosed procedure is shown in FIG. 25. The UE receives configured grant resources for sidelink transmission (2501). The UE determines if the configured grant is dedicated to the UE (2502). If yes, the UE uses the configured grant when the UE has data to transmit (2509). If yes, the UE determines if it has data to transmit on the next configured grant occasion (2503). If yes, the UE sends an indication to gNB to indicate that the UE has data to transmit (2504). The UE transmits data on the configured grant (2505). The UE monitors and detects if it is preempted (2506). The UE determines if it detected preemption (2507). If yes, the UE receives scheduling of retransmission from nGB and retransmits (2508).

The disclosed solutions can also apply to the collision scenario where UE1 and UE2 are engaged in sidelink communication and decision for Uu TX/RX grants and sidelink TX/RX grant are made by different entities.

The disclosed solutions can also apply to the collision between two Uu transmission, e.g., collision between two UL transmission on Uu interface.

Signaling of the Sidelink Cancellation Indicator

Sidelink Cancellation Indicator Monitoring

Since the gNB can determine to preempt a sidelink transmission, e.g., sidelink transmission scheduled by a dynamic grant or sidelink transmission performed on a configured grant resource, the Tx UE can need to monitor the cancellation indicator, e.g., SL-CI, after the Tx UE receives the scheduling grant from the gNB or when the Tx UE determines to perform sidelink transmission on a configured grant.

For a UE dynamically scheduled with a sidelink transmission, in one example, the UE can start to monitor the SL-CI from the next slot after the slot carrying the dynamic grant.

Or, in another example, the UE can be configured by the gNB to monitor the SL-CI starting from the slot which is $k_{offset,1}$ slots after the slot carrying the DCI which schedules the sidelink transmission. For example, the value of the $k_{offset,1}$ can be configured through RRC signaling. A UE can be configured with $k_{offset,1}$ through UE specific RRC configuration, e.g., through the RRC parameter SLCIMonitorOffset configured in the SearchSpace information element. Or, a UE can be configured with $k_{offset,1}$ through cell specific RRC configuration, e.g., through the RRC parameter SLCIMonitorOffset configured in the SIB, e.g., OSI.

Or, in yet another example, the UE can be configured by the gNB to monitor the SL-CI starting from the slot which is $k_{offset,2}$ slots ahead of the slot carrying the sidelink transmission scheduled by the dynamic grant. Similar to $k_{offset,1}$, $k_{offset,2}$ can be configured through RRC signaling, e.g., through UE specific RRC configuration, or through cell specific RRC configuration.

For a UE configured with the configured grant for sidelink transmission, in one example, the UE can be configured by the gNB to monitor the SL-CI starting from the slot which is $k_{offset,3}$ slots after the slot carrying the previous configured grant occasion. Or, in another example, the UE can be configured by the gNB to monitor the SL-CI starting from the slot which is $k_{offset,4}$ slots ahead of the slot carrying the next configured grant occasion. Or, in yet another example, the UE can start to monitor the SL-CI from the slot next to the slot carrying the previous configured grant occasion.

For both configured grant type 1 and configured type 2, the value of $k_{offset,3}$ or $k_{offset,4}$ can be configured by the RRC, e.g., though the RRC parameter SLCIMonitorOffset configured in the SLConfiguredGrantConfig information element.

For configured grant type 2, in another approach, a set of $k_{offset,3}$ or $k_{offset,4}$ values can be configured in the SLConfiguredGrantConfig information element. The activation DCI can carry a field, e.g., SL CI monitoring offset field, to indicate one out of the candidate values within the set to the UE.

For the UE scheduled by the dynamic grant and the UE configured with configured grant, in one example, the UE can stop the SL-CI monitoring $k_{stop}$ slots or symbols before the slot carrying the PSSCH, where $k_{stop}$ can be the minimum processing time for the SL-CI and the time for preparing the updated SCI, e.g., 2nd stage SCI.

Or, in another example, the UE can be configured with the time window, e.g., $k_{mw}$ slots, that the UE need to monitor the SL-CI through RRC. The UE can stop the SL-CI monitoring $k_{mw}$ slots after the slot starting the monitoring.

Determining the Time Region Referred by the SL-CI

After a UE detects a SL-CI, to understand the information carried by it, the UE need to figure out the time region and the frequency region referred by the SL-CI.

For example, to determine the starting of the time region, a UE can be indicated with the timing offset between the SL-CI and the referred time region. In one example, the timing offset can be configured through RRC, e.g., through RRC parameter SLCITimeRegionOffset. The timing offset can be in unit of symbols, or the timing offset can be in unit of slots. The solutions presented for configuring the RRC parameter SLCIMonitorOffset can be also applied here.

In another example, the timing offset can be indicated by the DCI carrying the SL-CI. For example, a set of timing offset values can be configured by the RRC; and the DCI carrying the SL-CI can carry a field, e.g., SL CI time offset field, to indicate one out of the candidate values within the set to the UE.

Besides the timing offset, the UE can also need to determine the duration of the time region. In one example, the time duration can be explicitly configured by the RRC, e.g., 1 slot or 2 slots or etc. through RRC parameter SLCITimeRegionDuration. The timing duration can be in unit of symbols, or the timing offset can be in unit of slots. The solutions presented for configuring the RRC parameter SLCIMonitorOffset can be also applied here.

In another example, the timing duration can be indicated by the DCI carrying the SL-CI. For example, a set of timing duration values can be configured by the RRC; and the DCI carrying the SL-CI can carry a field, e.g., SL CI time duration field, to indicate one out of the candidate values within the set to the UE. Or, the timing duration can be indicated by the DCI through starting and length indicator value (SLIV) field which indicate one out of the possible combinations of the start and duration values configured by the RRC. In the example above, the timing offset and the time duration are separately indicated. Or, the timing offset and the time duration can be jointly indicated, e.g., jointly indicated by the DCI carrying the SL-CI. For example, a set of combinations of timing offset value and timing duration value can be configured by the RRC; the DCI carrying the SL-CI can carry a field, e.g., SL CI time indication field, to indicate one out of the candidate combination within the set to the UE.

In some cases, the sidelink transmission and the Uu interface transmitting the SL-CI can have different subcarrier spacings (SCS). In one example, the SCS of the sidelink transmission can be used as the reference SCS to determine the time region, e.g., the timing offset and the time duration are indicated in number of slots or symbols on the sidelink. In another example, the SCS of the Uu interface can be used as the reference SCS to determine the time region, e.g., the timing offset and the time duration are indicated in number of slots or symbols on the Uu interface.

Determining the Frequency Region Referred by the SL-CI

In the same time, the UE also need to determine the frequency region referred by the SL-CI. In one example, the frequency region can be the implicitly indicated, e.g., the frequency region can be the whole sidelink BWP; or the frequency region can be the frequency bands shared by the Uu traffic and the sidelink traffic.

In another example, the frequency region can be explicitly indicated with respect to the sidelink BWP. For example, to determine the frequency region. a UE can be configured with the number of subchannel offset with respect to the lowest subchannel of the sidelink BWP, e.g., through RRC parameter SLCIFrequencyRegionOffset; and can be configured with the number of subchannels that the frequency region occupies, e.g., through RRC parameter SLCIFrequencyRegionRange. In this example, the granularity of the RRC parameter is in number of subchannels. The granularity of the RRC parameter can be also in number of PRBs.

In yet another example, the frequency region can be explicitly indicated with respect to the BWP on the Uu interface, e.g., the active UL BWP or the active DL BWP. For example, to determine the frequency region, a UE can be configured with the number of PRB offset with respect to the lowest PRB of the active UL BWP; and can be configured with the number of PRBs that the frequency region occupies.

Determining the Actual Canceled Time and Frequency Resource

Within the referred time region and frequency region, SL-CI can be used by the gNB to indicate the actual canceled time and frequency resource.

In one example, the canceled time resource and the canceled frequency resource can be separately indicated. E.g., the DCI carrying the SL-CI can contain two fields time resource cancellation indicator and frequency resource cancellation indicator to indicate the actual cancelled time and frequency resources, where the two fields can be a $b_T$-bits bitmap and a $b_F$-bits bitmap respectively. The sizes of the two bitmaps can be prespecified, or the value of $b_T$ and the value of $b_F$ can be configured by the gNB, e.g., through RRC parameters SLCITimePayloadSize and SLCIFrequencyPayloadSize respectively. The UE can evenly divide the referred time region and the referred frequency region into $b_T$ portions and $b_F$ portions respectively. For each portion, the UE can determine the transmission on it is canceled if the associated bit in the bitmap is set to '1'.

In another example, the canceled time resource and the canceled frequency resource can be jointly indicated. E.g., the DCI carrying the SL-CI can contain a field sidelink cancellation indicator to indicate the actual cancelled time and frequency resources, where the field can a $b_{TF}$-bits bitmap. The size of the bitmap can be prespecified, or the value of $b_{TF}$ can be configured by the gNB, e.g., through RRC parameter SLCIPayloadSize. The UE can evenly divide the referred time and frequency region into $b_{TF}$ portions, e.g., the UE can evenly divide the referred region into a $n_T$ by $n_F$ grid, where $n_T \times n_F = b_{TF}$. To determine how to divide the referred region, the UE need to know the one of the value of $n_T$ or the value of $n_F$.

A UE can be configured with the value of $n_T$, e.g., through RRC parameter SLCINumberofTimeProtion.

Or, a UE can be configured with the time duration of each portion, e.g., through RRC parameter SLCITimeDurationPerPortion. The UE can determine the value of $n_T$ by $$n_T = \frac{SLCITimeRegionDuration}{SLCITimeDurationPerProtion}.$$

Then the UE can determine the value of $n_F$ by $$n_F = \frac{b_{TF}}{n_T}.$$

For each portion in the grid, the UE can determine the transmission on it is canceled if the associated bit in the bitmap is set to '1'.

In the example above, the UE is indicated with the information of time granularity. Or the UE can be indicated with the information of frequency granularity and derive the value of $n_T$ from it where similar solution disclosed for signaling the time granularity can be also applied for signaling the frequency granularity.

Inter-UE Collision Handling for the Sidelink Transmission with Repetitions Scheduled by gNB in NR V2X Mode 1.

Figure 26:
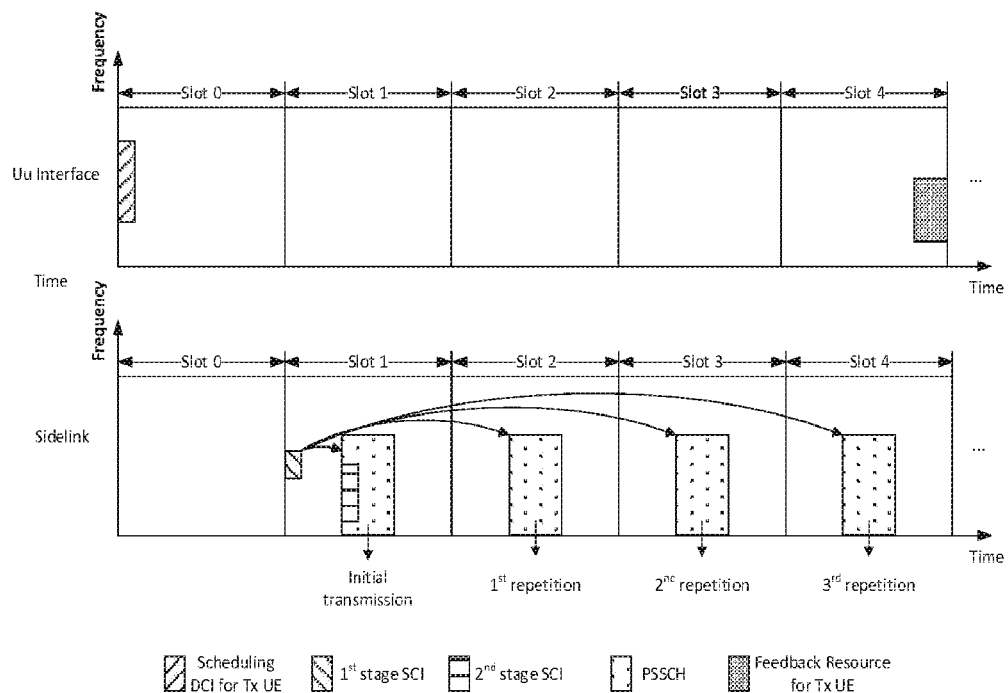
FIG. 26 shows an example of sidelink transmission with 3 repetitions scheduled by gNB in NR V2X mode 1.

For example, in V2X mode 1, a Tx UE can be scheduled by the gNB to transmit a sidelink transmission with multiple repetitions as shown in FIG. 26.

The initial transmission and the repetitions can be transmitted in adjacent slots as shown in the figure. Or the time gap between the initial transmission and the repetition can be several slots.

Note, FIG. 26 shows an example where the gNB schedules a sidelink transmission with multiple repetitions. The gNB can also schedule a sidelink transmission with multiple HARQ based retransmission. Or the gNB can schedule a periodic sidelink transmission. In the following content, we disclose solutions using a sidelink transmission with multiple repetitions as example. The disclosed solution can be also applied to a sidelink transmission with multiple HARQ based retransmission and a periodic sidelink transmission. For example, the disclosed solution can be also applied to a sidelink transmission with multiple HARQ based retransmission by replacing the repetition in the solution with HARQ based retransmission;

SL-CI Transmitted only Before the Initial Transmission

In one example, the UE can assume the SL-CI for the whole transmission (initial transmission and the repetitions) can only be signaled for one time before the initial transmission. The Tx UE can only monitor the SL-CI before the initial transmission.

If a SL-CI is detected and the Tx UE determines all of the initial transmission and the repetitions are canceled, the Tx UE can drop the transmission of the scheduled initial transmission and the scheduled repetitions. To indicate the Rx that the transmission has been canceled, the Tx UE can drop the transmission of both the 2nd stage SCI and the PSSCH; or the Tx UE can drop the transmission of the PSSCH while still transmitting the 2nd stage SCI with setting the preemption indication field to be '1' or '1111'; or the Tx UE can drop the transmission of both the 2nd stage SCI and the transmission of the associated PSSCH, while transmitting an indication using the resource supposed to transmit the 2nd stage SCI to indicate the transmission has been canceled.

If a SL-CI is detected and the Tx UE determines one or some of the initial transmission and the repetitions are canceled, in one case, the Tx UE can drop the transmission of all the scheduled initial transmission and repetitions. The Tx UE can send an indication to the Rx UE to indicate that all the scheduled transmissions are canceled using the solutions presented above.

In another case, when the Tx UE determines one or some of the initial transmission and the repetitions are canceled, the Tx UE can only drop the transmission that is overlapped with the canceled resources. The Tx UE can indicate the Rx UE the dropped transmission using the preemption indication field, which is a 4-bits bitmap supposing the case show in FIG. 26, in the 2nd stage SCI. For example, assume Tx UE detects a SL-CI and determines the 1st repetition and the 3rd repetition are overlapped the canceled resource. The Tx UE can drop the transmission of the transmission of the 1st repetition and the 3rd repetition, while still transmitting the initial transmission and the 2nd repetition. The Tx UE will also set the preemption indication field in the associated 2nd stage SCI to be '0101' and send it to the Rx UE.

When a Rx UE detects the indication transmitted by the Tx UE indicating the scheduled sidelink transmission is canceled, the Rx UE cannot try to decode the corresponding PSSCH and not soft combine it with other transmissions of the same TB.

Figure 27:
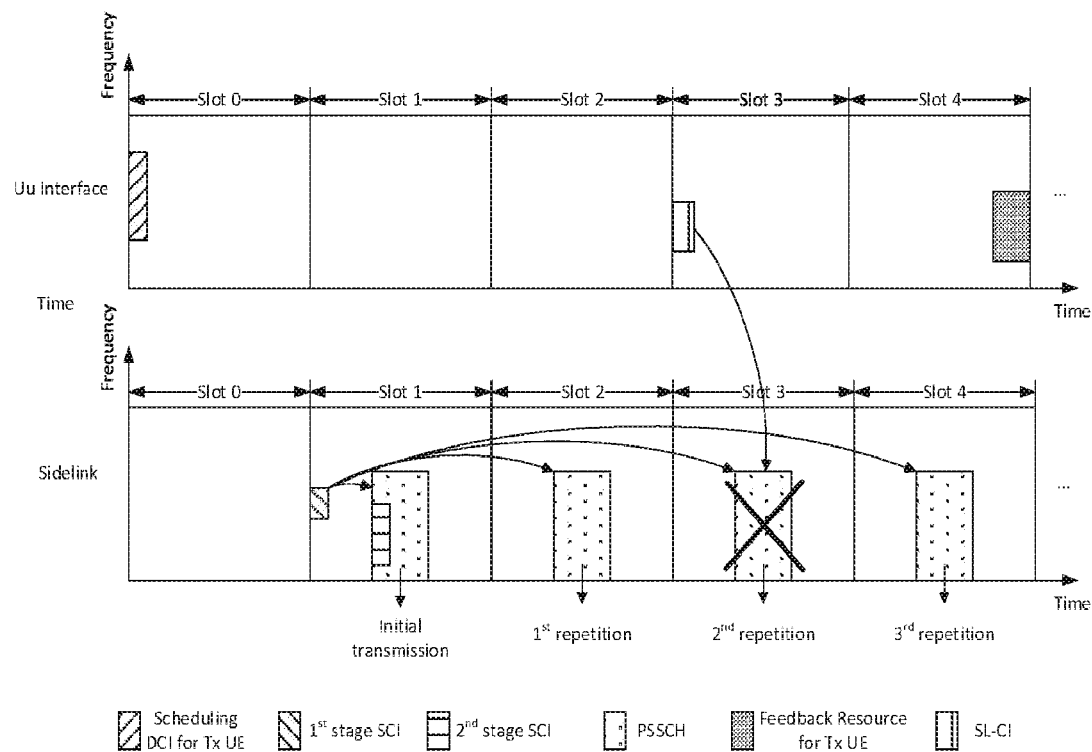
FIG. 27 shows an example of sidelink transmission preempted during the repetition.

SL-CI Transmitted Before the Initial Transmission and During the Repetition with Tx UE Indicating the Preemption Information in Each Repetition In another example, the SL-CI can be signaled by the gNB before the initial transmission and during the scheduled sidelink transmission (before the last repetition). The Tx UE can monitor the SL-CI before the initial transmission and continue the monitoring until it reaches the last repetition. An example is shown in FIG. 27, where a SL-CI is transmitted by the gNB between the 1st and 2nd repetition of the scheduled sidelink transmission and indicates that the 2nd repetition is canceled. It can also be possible that one SL-CI can indicate multiple repetitions are canceled.

In this example, the Tx UE can only drop the transmission, e.g., initial transmission or repetition, that is overlapped with the canceled resources. Since the cancellation can happen after the initial transmission, the Tx UE is not able to indicate the preemption to the Rx UE using the 2nd stage SCI associated with the initial transmission.

The Tx UE can send an indication in each repetition to indicate whether the sidelink transmission is preempted. The indication can be sent through a pre-configured reference signal, e.g., SL-DMRS, or through a pre-configured sequence, or through the control information.

For example, the Tx UE can transmit both the SCI, e.g., 2nd stage SCI, and the data in all the repetitions. An SCI field, e.g., preemption indication field, can be carried by the 2nd stage SCI associated with the PSSCH to indicate the whether the sidelink transmission is preempted.

The preemption indication field in the 2nd stage can be 1 bit, e.g., '0' indicating the associated PSSCH is not canceled; and '1' indicating the associated PSSCH is canceled. This field can be used to only indicates if the associated PSSCH transmission is preempted or not.

Using FIG. 27 as the example, the Tx UE will set the preemption indication field transmitted in the initial transmission, 1st repetition and 3rd repetition to be '0'; and the Tx UE will set the preemption indication field transmitted in the 2nd repetition to be.

The preemption indication field in the 2nd stage can be a bitmap, where the length of the bitmap equals to the total number of the initial transmission and repetition. This field can be used to indicate if the PSSCH transmission is preempted or not for all the initial transmission and repetitions, e.g., by setting the bit associated with the corresponding PSSCH to '1' in the bitmap. Based on the detected SL-CI, the Tx UE can set the bitmap transmitted in different repetitions to different values.

Using FIG. 27 as the example, the length of the bitmap is 4. Before transmitting the initial transmission and the 1st repetition, the Tx UE doesn't detect any PSSCH transmission has been preempted. So, the Tx UE will set the preemption indication field transmitted in the initial transmission and the 1st repetition to be '0000' and '0000' respectively. Before transmitting the 2nd repetition, the Tx UE detects the PSSCH in the 2nd repetition is preempted. The Tx UE will set the preemption indication field transmitted in the 2nd repetition to be '0010'. Before transmitting the 3rd repetition, the Tx UE doesn't detect any further preemption. Then the Tx UE will set the preemption indication field transmitted in the 2nd repetition to be '0010'.

SL-CI Transmitted Before the Initial Transmission and During the Repetition with Tx UE Indicating the Preemption Information Only in the Last Repetition Or, the Tx UE can send an indication only in the last repetition to indicate whether the sidelink transmission is preempted. The indication can be sent through a pre-configured reference signal, e.g., SL-DMRS, or through a pre-configured sequence, or through the control information.

For example, the Tx UE can transmit both the SCI, e.g., 2nd stage SCI, and the data in the last repetition. An SCI field, e.g., preemption indication field, can be carried by the 2nd stage SCI to indicate the whether the sidelink transmission is preempted.

Using FIG. 27 as the example, the preemption information transmitted in the last repetition can be a 4-bits.

In one approach, no dedicated SCI field can be introduced for sending the preemption information in the 2nd stage SCI. In the initial transmission, the Tx UE cannot indicate the preemption information in the 2nd stage SCI. In the last repetition, the Tx UE can reuse an existing field in the 2nd stage SCI to indicate the preemption information. For example, the Tx UE can reuse the first 4 bits of the MCS field carried by the 2nd stage SCI in the last repetition and set it to be '0010' to indicate the 2nd repetition is preempted while others are not preempted.

In another approach, dedicated SCI field can be introduced for sending the preemption information in the 2nd stage SCI, e.g., 4 bits SCI field preemption indication field. Such field can be carried by both the 2nd SCI transmitted in the initial transmission and in the last repetition. For example, before the initial transmission, the Tx UE doesn't detect any preemption. The Tx UE can set the preemption indication field in the initial transmission to be '0000'. Before the last repetition, the Tx UE detects the 2nd repetition is preempted. The Tx UE can set the preemption indication field in the last repetition to be '0010'.

Figure 28:
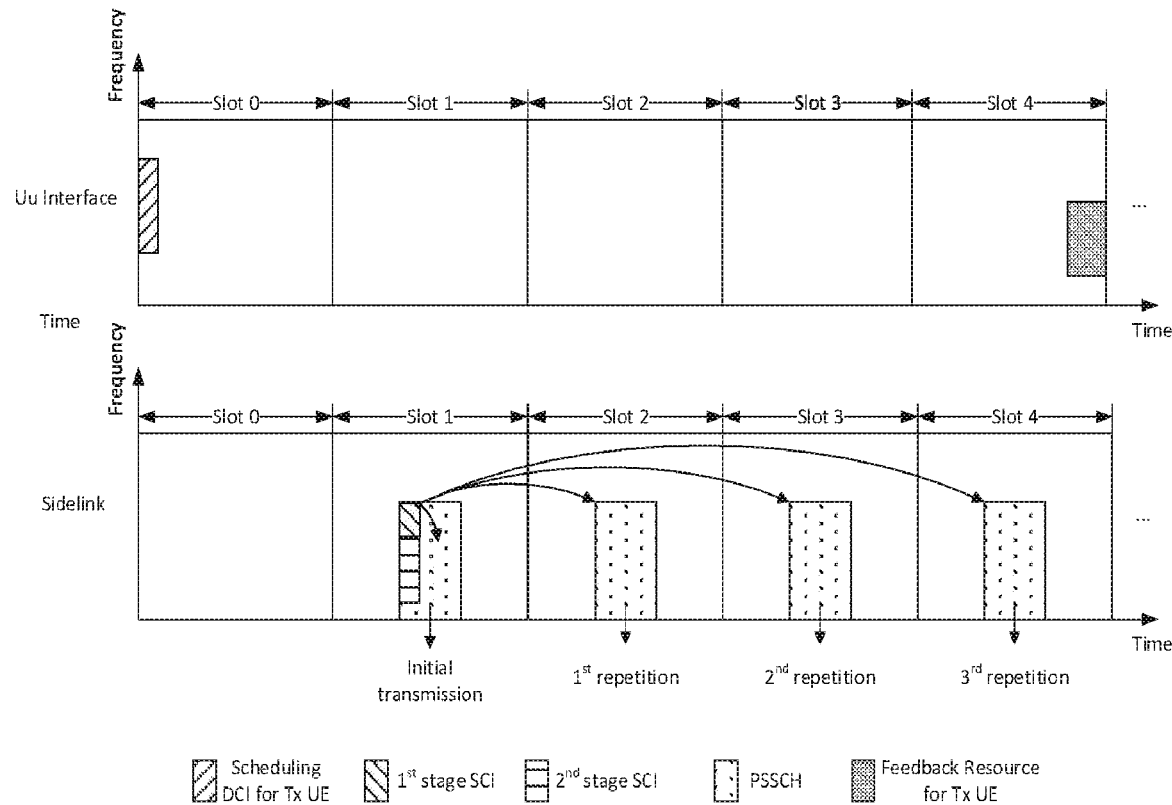
FIG. 28 shows an example of sidelink transmission with 1st stage SCI and 2nd stage SCI simultaneously transmitted.

The disclosed three solutions here use the case when there is a time gap between the transmission of the 1st stage SCI and the 2nd stage SCI as example. In another case, the disclosed three solutions can be also applied to the case when the 1st stage SCI and 2nd stage SCI can be transmitted without any time gap between them as shown in FIG. 28. In this case, the SL-CI sent by the gNB to Tx UE can be transmitted only before the initial transmission; or can be transmitted before the initial transmission and during the repetition. The SL-CI sent by the Tx UE to Rx UE to indicate the preemption information can be transmitted only in the initial transmission; or can be transmitted in both the initial transmission and all the repetitions; or can be transmitted in the initial transmission and only in the last repetition. The preemption information, e.g., the disclosed preemption indication field, can be carried by the 1st stage SCI, or can be carried by the 2nd stage SCI.

When the 1st stage SCI and 2nd stage SCI are transmitted without any time gap between them, the disclosed solutions can be applied to a sidelink transmission with multiple repetitions as shown in FIG. 28. The disclosed solutions can be applied to a sidelink transmission with multiple HARQ based retransmission; and can be applied to a periodic sidelink transmission.

Intra-UE Prioritization for Simultaneous Sidelink and Uplink Transmissions

In NR V2X, a UE can be scheduled to perform simultaneous sidelink and uplink transmissions, where the carrier for sidelink transmission and the carrier for uplink transmission can be different carriers or can be a shared carrier. In some scenario, e.g., the total transmit power exceed the maximum power $P_{CMAX}$, the UE need to do prioritization between them to adjust the transmit power or even drop the down-prioritized transmission. In this section, we disclose the mechanism for a UE to prioritize the simultaneous sidelink and uplink transmissions.

Prioritization Using the Indicated Priority Level Indicator

In one example, each transmission, e.g., sidelink transmission or uplink transmission can be indicated with a priority level. The value of the priority level can be explicitly signaled by the RRC, e.g., through RRC parameter TransmissionPriorityLevel, or pre-specified by the specification. For the sidelink transmission, the TransmissionPriorityLevel can be configured within the information element configuring the resource pool, e.g., SLResourcePoolConfig.

In one example, one priority level can be configured/pre-specified for the transmission of SL-PSCCH, SL-PSSCH and SL-PSFCH. For example, the SL-PSCCH, SL-PSSCH and SL-PSFCH can share the same resource pool. Within the resource pool configuration, one priority level is configured which applies to SL-PSCCH, SL-PSSCH and SL-PSFCH.

In another example, the SL-PSCCH, SL-PSSCH and SL-PSFCH can share the same resource pool. Different priority levels can be configured/pre-specified for the transmission of SL-PSCCH, SL-PSSCH and SL-PSFCH respectively. For example, within the resource pool configuration, a UE can be configured with RRC parameter SLPSCCHPriorityLevel, SLPSSCHPriorityLevel, SLPSFCHPriorityLevel separately.

In yet another example, dedicated resource pool can be configured/pre-specified for the SL-PSCCH, SL-PSSCH and SL-PSFCH separately where different priority levels can be configured respectively within the associated resource pool configuration.

The priority level can also be signaled by the DCI scheduling the sidelink transmission. For example, to indicate the priority level of the SL-PSSCH, a set of priority level values can be configured by the RRC or pre-specified; and the scheduling DCI can carry a field, e.g., PSCCH Priority, to indicate one out of the candidate values within the set to the UE.

The priority level can also be implicitly derived. For example, the priority level of the SL-PSFCH can be equal to the priority level indicated for the SL-PSSCH.

For PSCCH, same priority level can be indicated for the 1st stage SCI and 2nd stage SCI. Or different priority levels can be indicated for the 1st stage SCI and 2nd stage SCI separately, e.g., through two RRC configuration SL1stSCIPriorityLevel and SL2ndSCIPriorityLevel respectively.

For PSFCH, same priority level can be indicated for the HARQ-ACK feedback and CSI feedback. Or different priority levels can be indicated for the HARQ-ACK feedback and CSI feedback separately, e.g., through two RRC configuration SLHARQPriorityLevel and SLCSIPriorityLevel respectively. When a UE has simultaneous sidelink and uplink transmissions, the UE can prioritize the transmission with higher priority, e.g., the transmission with smaller priority level value can be prioritized.

When a sidelink transmission and an uplink transmission have the same priority level value, the sidelink transmission (except for the SL CSI feedback), e.g., SL-PSCCH, SL-PSSCH and SL HARQ feedback, can be prioritized.

When a SL CSI feedback and an uplink transmission have the same priority level value, the uplink transmission (except for the CSI feedback on the uplink), e.g., SR, HARQ feedback, PUSCH, can be prioritized.

When a SL CSI feedback and a CSI feedback on the uplink have the same priority level value, the SL CSI feedback can be prioritized.

Or, when a sidelink transmission and an uplink transmission have the same priority level value, the UE can prioritize the transmission based on some criteria, with some examples shown below:
  Channel condition: to ensure the performance, the UE can prioritize the transmission based on the channel condition. For example, the UE can prioritize the transmission that has better channel. Therefore, it can have a higher chance to be delivered.
  Package size: since the transmission with a high priority level can lead to preempting other transmissions. The UE can prioritize the transmission that requires less resource to reduce the potential preemption to other UEs.
  Remaining time before the UE has to drop the package: the two transmission can have different processing timeline, therefore can have different remaining time before the package has to be dropped. The UE can prioritize the transmission that has shorter remaining time to reduce the dropping rate.

Prioritization Without the Indicated Priority Level Indicator

In another example, the sidelink transmission can be categorized into URLLC SL transmission and eMBB SL transmission, where the UE can determine the category of the transmission based on, e.g., the QoS requirement, service type, etc. Similarly, the uplink transmission can be categorized into URLLC UL transmission and eMBB UL transmission.

The UE can prioritize the transmission based on the following prioritization rule:
  URLLC SL transmission (except for the SL CSI feedback)>URLLC UL transmission (except for the UL CSI feedback)>URLLC SL CSI feedback>URLLC UL CSI feedback>eMBB SL transmission (except for the SL CSI feedback)>eMBB UL transmission (except for the UL CSI feedback)>eMBB SL CSI feedback>eMBB UL CSI feedback.

where 'A>B' means the transmission of A is prioritized over the transmission of B.

Note: all the SL CSI feedbacks can be treated equally which have the same priority as eMBB SL CSI feedback; and all the UL CSI feedbacks can be treated equally which have the same priority as eMBB UL CSI feedback. Then the prioritization rule can become:
  URLLC SL transmission (except for the SL CSI feedback)>URLLC UL transmission (except for the UL CSI feedback)>eMBB SL transmission (except for the SL CSI feedback)>eMBB UL transmission (except for the UL CSI feedback)>SL CSI feedback>UL CSI feedback.

Figure 29:
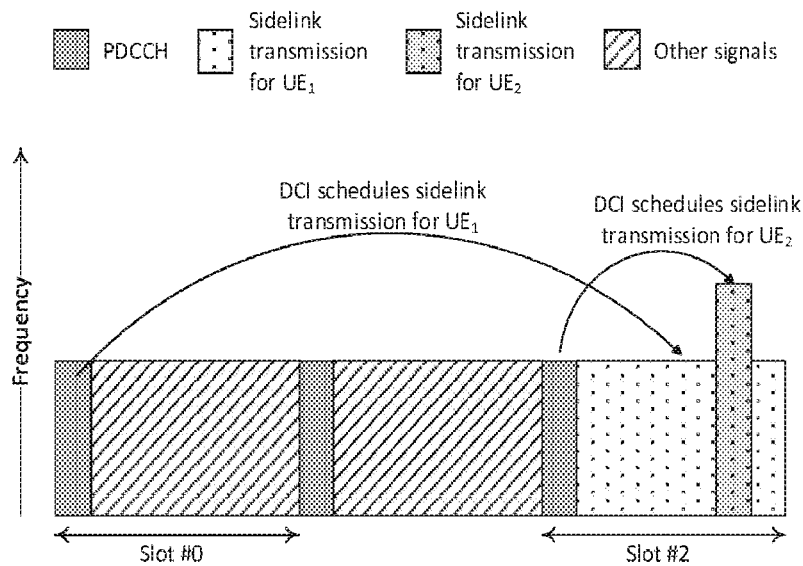
FIG. 29 shows inter-UE collision between two dynamically scheduled sidelink transmission.

Dynamically Scheduled Sidelink Transmission Preempts Another Sidelink Transmission In NR V2X model, two dynamically scheduled sidelink transmission can be allocated with overlapped resources as shown in FIG. 29. For example, UE1 is dynamically allocated with resources for sidelink transmission. Then, gNB can determine to allocate some overlapped resources to UE2 and preempt UE1's transmission, e.g., due to UE2 can have more urgent data to transmit. Therefore, inter-UE collision will happen. The inter-UE collision can happen on a shared carrier; or it can happen on the dedicated carrier. In this section, we disclose solutions for inter-UE collision handling for such scenario.

In one alternative, the inter-UE collision can be transparent to UE2, to indicate the inter-UE collision to UE1, gNB can send indication to UE1, where the indication can be a preempting indication, or a power reduction indicator, or a canceling indication as disclosed in the previous sections.

For UE1, it can monitor and detect if it is preempted from gNB. When the UE1 determines it is preempted, it can use the procedures disclosed for inter-UE collision handling between dynamically scheduled Uu transmission and dynamically scheduled sidelink transmission to handle this problem for broadcast, groupcast and unicast. In general, the solutions presented for dynamically scheduled broadcast, groupcast and unicast can also apply here.

In another alternative, gNB can indicate the inter-UE collision to UE2 and let UE2 know it is going to preempt other transmissions. For example, through the scheduling DCI with explicit bit field or can be implicitly signaled. Once UE2 figures out it is going to preempt other transmissions, UE2 can send indication to indicate the inter-UE collision, where the indication can be a preempting indication, or a power reduction indicator, or a canceling indication as disclosed in the previous sections. The indication can be a preamble, or a sequence, or a reference signal, or a broadcast SCI, or the broadcasted part of a two-stage SCI.

For UE1, it can monitor and detect if it is preempted from other V2X UEs. When the UE1 determines it is preempted, it can use the procedures disclosed for inter-UE collision handling between dynamically scheduled Uu transmission and dynamically scheduled sidelink transmission to handle this problem for broadcast, groupcast and unicast. In general, the solutions presented for dynamically scheduled broadcast, groupcast and unicast can also apply here.

Configured Grant Based Sidelink Transmission Preempted by the Dynamically Scheduled Sidelink Transmission.

Figure 30:
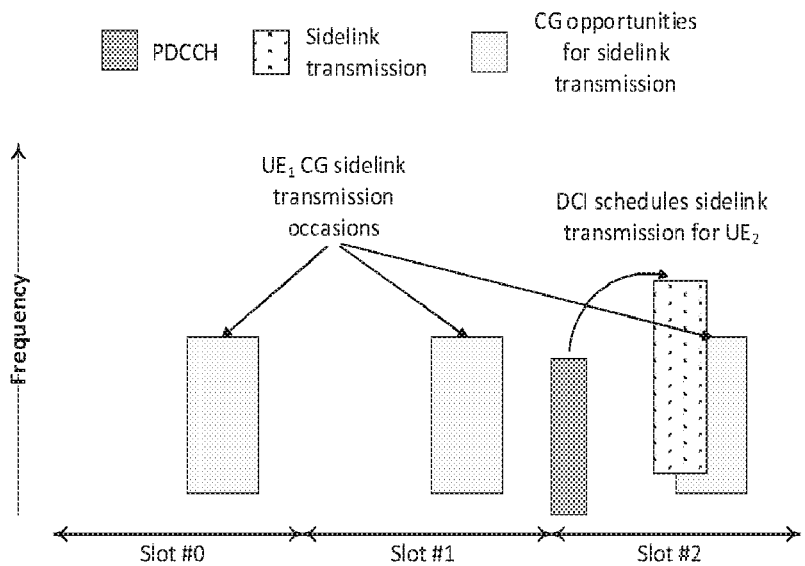
FIG. 30 shows inter-UE collision between dynamically scheduled sidelink transmission and configured grant based sidelink.

In NR V2X model, a UE can be allocated with configured grant resources for sidelink transmission. In the same time, gNB can dynamically allocate some overlapped resources to another UE as shown in FIG. 30. For example, UE1 is allocated with configured grant resources for sidelink transmission. Then, gNB can determine to allocate some overlapped resources to UE2 in slot #2. Meanwhile, if UE1 also has data to transmit in the configured CG occasions in slot #2, inter-UE collision will happen. The inter-UE collision can happen on a shared carrier; or it can happen on the dedicated carrier. In this section, we disclose solutions for inter-UE collision handling for such scenario.

Similar to the scenario that inter-UE collision between two dynamically scheduled sidelink transmission, the potential inter-UE collision can be transparent to UE2, or the potential inter-UE collision can be indicated to UE2.

On one hand, the potential inter-UE collision can be transparent to UE2. Then the problem will be similar as it is for the inter-UE collision between the configured grant sidelink and the dynamic Uu transmission. The solutions presented for handling the inter-UE collision between the configured grant sidelink and the dynamic Uu transmission can also apply here. Some examples are shown in FIG. 24 and FIG. 25.

On the other hand, the gNB can send an indication to indicate the potential inter-UE collision to UE2 with the following alternatives gNB Assumes Inter-UE Collision Will Occur In a first alternative, gNB can send the indication of the inter-UE collision to UE2 informing UE2 that other transmissions will be preempted. For example, through the scheduling DCI with explicit bit field or can be implicitly signaled. Once UE2 determines it is going to preempt other transmissions, UE2 can send indication to indicate the inter-UE collision, where the indication can be a preempting indication, or a power reduction indicator, or a canceling indication as disclosed in the previous sections. The indication can be a preamble, or a sequence, or a reference signal, or a broadcast SCI, or the broadcasted part of a two-stage SCI.

For UE1, when it determines to transmit data on the next configured grant occasion, it can monitor and detect if it is preempted from other V2X UEs. When the UE1 determines it is preempted, it can use the procedures disclosed for inter-UE collision handling between dynamically scheduled Uu transmission and dynamically scheduled sidelink transmission to handle this problem for broadcast, groupcast and unicast. In general, the solutions presented for dynamically scheduled broadcast, groupcast and unicast can also apply here.

In this alternative, gNB is not aware of when UE1 will transmit on the configured CG occasion, so the gNB doesn't know whether it needs to schedule a retransmission for the preempted sidelink transmission.

In one case, gNB can monitor the power level to figure out if there is another transmission in the channel. When another transmission is detected by the gNB, although gNB cannot be able to decode it, gNB can determine there is inter-UE collision. Then gNB can schedule the retransmission for the configured grant UE. This solution can apply to the power based inter-UE collision handling solutions.

In another case, when UE1 has data to transmit on the CG occasion and detects it is preempted, instead of waiting for the next CG occasion to do the retransmission, UE1 can send an indication to gNB to request for a scheduling for retransmission, e.g., the indication can be an SR, or a BSR, or a reference signal, or a preamble, or a sequence.

CG UE Sends Indication of Pending Transmission on Next CG Occasion

In a second alternative, when UE1 determines to transmit data on a configured CG occasion, e.g., CG occasion k, it can send an indication to gNB to inform it has data to transmit. For example, the indication can be an SR, or a BSR, or a reference signal, or a preamble, or a sequence.

In this alternative, if the gNB need to schedule some urgent transmission using the same resources for another UE, e.g., UE2, gNB knows there will be inter-UE collision. gNB can send the indication of the inter-UE collision to UE2 informing UE2 that other transmissions will be preempted. For example, through the scheduling DCI with explicit bit field or can be implicitly signaled. Once UE2 determines it is going to preempt other transmissions, UE2 can send indication to indicate the inter-UE collision, where the indication can be a preempting indication, or a power reduction indicator, or a canceling indication as disclosed in the previous sections. The indication can be a preamble, or a sequence, or a reference signal, or a broadcast SCI, or the broadcasted part of a two-stage SCI.

For UE1, it can monitor and detect if it is preempted on the CG occasion k. When the UE determines it is preempted, it can use the procedures disclosed for inter-UE collision handling between dynamically scheduled Uu transmission and dynamically scheduled sidelink transmission to handle this problem for broadcast, groupcast and unicast. In general, the solutions presented for dynamically scheduled broadcast, groupcast and unicast can also apply here. If UE1 does not detect that it is preempted, the UE can transmit data on the CG occasion k, without waiting for a new scheduling.

Since the gNB is aware of the inter-UE collision, gNB can schedule the retransmission for UE1 without receiving the feedback from UE1. Or gNB can schedule the retransmission based on the feedback from UE1 as it is disclosed in dynamically scheduled groupcast and unicast scenario.

Meanwhile, UE1 can also indicate the priority of the data to be transmitted when sending the indication to the gNB as it is disclosed for the case of inter-UE collision between configured grant sidelink and dynamic Uu transmission.

It will be understood that any of the methods and processes described herein can be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above can be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or can be acquired from practicing of the disclosure, without departing from the breadth or scope. Thus, although particular configurations have been discussed herein, other configurations can also be employed. Numerous modifications and other embodiments (e.g., combinations, rearrangements. etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features can sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B and C can be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. An apparatus comprising:
one or more processors configured to:
determine a first transmission associated with sidelink resources in a wireless communication network, wherein the first transmission corresponds to a Physical Sidelink Feedback Channel (PSFCH) transmission for providing feedback for a Physical Sidelink Shared Channel (PSSCH) transmission;
determine a second transmission associated with uplink resources in the wireless communication network;
determine at least a partial overlap in time of the first transmission and the second transmission;
determine a priority associated with the PSFCH transmission based on a priority associated with the PSSCH transmission;
determine a radio resource control (RRC) configured parameter associated with the second transmission associated with the uplink resources;
determine, based on comparing the priority associated with the PSFCH transmission and the RRC configured parameter associated with the second transmission, which of the first transmission or the second transmission is a higher priority transmission; and
transmit, based on the determined higher priority transmission, one of the first transmission associated with the sidelink resources or the second transmission associated with the uplink resources.

2. The apparatus of claim 1, wherein the priority associated with the PSSCH transmission is determined based on sidelink control information (SCI).

3. The apparatus of claim 2, wherein the priority associated with the PSSCH transmission is explicitly indicated via the SCI.

4. The apparatus of claim 1, wherein the PSSCH transmission is sent in a sidelink resource pool.

5. The apparatus of claim 1, wherein the feedback provided in the PSFCH transmission comprises acknowledgement (ACK) or non-acknowledgement (NACK).

6. The apparatus of claim 1, wherein the RRC configured parameter is configured for a specific sidelink resource pool.

7. A method comprising:
receiving an indication associated with a first transmission associated with sidelink resources in a wireless communication network, wherein the first transmission corresponds to a Physical Sidelink Feedback Channel (PSFCH) transmission for providing feedback for a Physical Sidelink Shared Channel (PSSCH) transmission;
receiving an indication associated with a second transmission associated with uplink resources in the wireless communication network;
receiving an indication of at least a partial overlap in time of the first transmission and the second transmission;
receiving an indication of a priority associated with the PSFCH transmission based on a priority associated with the PSSCH transmission;
receiving an indication of a radio resource control (RRC) configured parameter associated with the second transmission associated with the uplink resources;
receiving an indication of a higher priority transmission associated with one of the first transmission or the second transmission, the higher priority determined based on comparing the priority associated with the PSFCH transmission and the RRC configured parameter associated with the second transmission; and
receiving, based on the indication of the higher priority transmission, the second transmission associated with the uplink resources one of before or after the first transmission associated with the sidelink.

8. The method of claim 7, wherein the priority associated with the PSSCH transmission is determine based on sidelink control information (SCI).

9. The method of claim 8, wherein the priority associated with the PSSCH transmission is explicitly indicated via the SCI.

10. The method of claim 7, wherein the PSSCH transmission is sent in a sidelink resource pool.

11. The method of claim 7, wherein the feedback provided in the PSFCH transmission comprises acknowledgement (ACK) or non-acknowledgement (NACK).

12. The method of claim 7, wherein the RRC configured parameter is configured for a specific sidelink resource pool.

13. The apparatus of claim 1, wherein the one or more processors are configured to transmit Hybrid Automatic Repeat Request (HARQ) feedback over the PSFCH.

14. The method of claim 7, further comprising transmitting Hybrid Automatic Repeat Request (HARQ) feedback over the PSFCH.

* * * * *